(12) United States Patent
Sayed et al.

(10) Patent No.: US 12,012,550 B2
(45) Date of Patent: Jun. 18, 2024

(54) ATTENUATED ACID FORMULATIONS FOR ACID STIMULATION

(71) Applicant: Saudi Arabian Oil Company, Dhahran (SA)

(72) Inventors: Mohammed Sayed, Katy, TX (US); Rajesh Kumar Saini, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/548,752

(22) Filed: Dec. 13, 2021

(65) Prior Publication Data

US 2023/0183560 A1    Jun. 15, 2023

(51) Int. Cl.
C09K 8/72    (2006.01)
C09K 8/68    (2006.01)
C09K 8/70    (2006.01)

(52) U.S. Cl.
CPC .............. C09K 8/725 (2013.01); C09K 8/685 (2013.01); C09K 8/703 (2013.01)

(58) Field of Classification Search
CPC ....................................................... C09K 8/72
See application file for complete search history.

(56) References Cited

U.S. PATENT DOCUMENTS

| | | | |
|---|---|---|---|
| 701,154 A | 5/1902 | Cole | |
| 830,437 A | 9/1906 | Humphrey | |
| 1,912,452 A | 6/1933 | Hollander | |
| 1,941,442 A | 12/1933 | Moran et al. | |
| 1,978,277 A | 10/1934 | Noble | |
| 2,204,857 A | 6/1940 | Aladar | |
| 2,216,315 A | 10/1940 | Aladar | |
| 2,407,987 A | 9/1946 | Landberg | |
| 2,625,110 A | 1/1953 | Haentjens et al. | |
| 2,649,710 A | 8/1953 | Dale | |
| 2,706,406 A | 4/1955 | Vincent et al. | |
| 2,788,373 A | 4/1957 | Mills et al. | |
| 2,801,698 A | 8/1957 | Bond | |
| 2,900,269 A | 8/1959 | Bauman et al. | |
| 2,904,445 A | 9/1959 | Sellers | |
| 3,022,739 A | 2/1962 | Herrick et al. | |

(Continued)

FOREIGN PATENT DOCUMENTS

AU    2014278762    9/2015
CA    2322118    12/2007

(Continued)

OTHER PUBLICATIONS

Lohrasb et al. (Pore volumes to breakthrough estimation in carbonate acidizing with hydrochloric acid by using an analytical derivation method, 2019).*

(Continued)

*Primary Examiner* — William D Hutton, Jr.
*Assistant Examiner* — Avi T Skaist
(74) *Attorney, Agent, or Firm* — Fish & Richardson P.C.

(57) ABSTRACT

A method for acid treating a carbonate reservoir with an attenuated acid formulation is provided. The method includes mixing an acidic compound with a hygroscopic chemical to form the attenuated acid formulation, and injecting the attenuated acid formulation into a carbonate formation.

15 Claims, 10 Drawing Sheets

(56) References Cited

U.S. PATENT DOCUMENTS

| | | |
|---|---|---|
| 3,066,739 A | 12/1962 | Saurenman et al. |
| 3,171,355 A | 3/1965 | Harris et al. |
| 3,176,511 A | 4/1965 | Widmyer |
| 3,213,797 A | 10/1965 | McMahan |
| 3,229,642 A | 1/1966 | Lobanoff |
| 3,284,281 A | 11/1966 | Thomas |
| 3,316,965 A | 5/1967 | Watanabe |
| 3,402,770 A | 9/1968 | Messenger |
| 3,456,183 A | 7/1969 | Codrington et al. |
| 3,601,197 A | 8/1971 | Ayers et al. |
| 3,616,855 A | 11/1971 | Colgate |
| 3,690,622 A | 9/1972 | Brunner et al. |
| 3,716,387 A | 2/1973 | Simmons et al. |
| 3,789,217 A | 1/1974 | Youmans |
| 3,807,557 A | 4/1974 | Miller |
| 3,834,122 A | 9/1974 | Allison et al. |
| 3,858,655 A | 1/1975 | Engle |
| 3,875,606 A | 4/1975 | Landers |
| 3,912,330 A | 10/1975 | Carnahan et al. |
| 3,926,575 A | 12/1975 | Meyers |
| 3,937,283 A | 2/1976 | Blauer et al. |
| 3,938,594 A | 2/1976 | Rhudy et al. |
| 3,977,472 A | 8/1976 | Graham et al. |
| 3,980,136 A | 9/1976 | Plummer et al. |
| 3,981,626 A | 9/1976 | Onal |
| 3,996,062 A | 12/1976 | Frost |
| 4,043,599 A | 8/1977 | Lingane |
| 4,043,885 A | 8/1977 | Yen et al. |
| 4,044,833 A | 8/1977 | Volz |
| 4,047,988 A | 9/1977 | Weill |
| 4,135,579 A | 1/1979 | Rowland et al. |
| 4,137,182 A | 1/1979 | Golinkin |
| 4,193,451 A | 3/1980 | Dauphine |
| 4,195,010 A | 3/1980 | Russell et al. |
| 4,216,829 A | 8/1980 | Murphy |
| 4,220,550 A | 9/1980 | Frenier et al. |
| 4,223,726 A | 9/1980 | Cha |
| 4,252,189 A | 2/1981 | Bodine |
| RE30,738 E | 9/1981 | Bridges et al. |
| 4,289,639 A | 9/1981 | Buske |
| 4,324,560 A | 4/1982 | Fonseca |
| 4,345,650 A | 8/1982 | Wesley |
| 4,381,950 A | 5/1983 | Lawson |
| 4,389,461 A | 6/1983 | Scott |
| 4,389,878 A | 6/1983 | Manzie, Jr. |
| 4,444,058 A | 4/1984 | Ratigan |
| 4,452,076 A | 6/1984 | Gavignet et al. |
| 4,480,696 A | 11/1984 | Almond et al. |
| 4,485,071 A | 11/1984 | Larter |
| 4,485,869 A | 12/1984 | Sresty |
| 4,493,875 A | 1/1985 | Beck et al. |
| 4,519,455 A | 5/1985 | Holtmyer |
| 4,554,082 A | 11/1985 | Holtmyer |
| 4,587,739 A | 5/1986 | Holcomb |
| 4,594,170 A | 6/1986 | Brown et al. |
| 4,627,495 A | 12/1986 | Harris |
| 4,629,702 A | 12/1986 | Fan et al. |
| 4,640,692 A | 2/1987 | Audeh |
| 4,665,982 A | 5/1987 | Brown |
| 4,665,990 A | 5/1987 | Perlman |
| 4,681,914 A | 7/1987 | Olson et al. |
| 4,708,805 A | 11/1987 | D'Muhala |
| 4,718,489 A | 1/1988 | Hallam et al. |
| 4,725,372 A | 2/1988 | Teot et al. |
| 4,735,731 A | 4/1988 | Rose et al. |
| 4,745,139 A | 5/1988 | Haasl et al. |
| 4,749,038 A | 6/1988 | Shelley et al. |
| 4,780,223 A | 10/1988 | Baranet et al. |
| 4,787,456 A | 11/1988 | Jennings, Jr. et al. |
| 4,800,752 A | 1/1989 | Piers |
| 4,830,773 A | 5/1989 | Olson |
| 4,830,779 A | 5/1989 | Maeno et al. |
| 4,836,284 A | 6/1989 | Tinker |
| 4,846,277 A | 7/1989 | Khalil et al. |
| 4,864,472 A | 9/1989 | Yoshimura |
| 4,867,633 A | 9/1989 | Gravelle |
| 4,882,128 A | 11/1989 | Hukvari et al. |
| 4,887,670 A | 12/1989 | Lord et al. |
| 5,007,481 A | 4/1991 | Williams et al. |
| 5,023,551 A | 6/1991 | Kleinberg et al. |
| 5,031,700 A | 7/1991 | McDougall et al. |
| 5,069,283 A | 12/1991 | Mack |
| 5,082,056 A | 1/1992 | Tackett, Jr. |
| 5,180,556 A | 1/1993 | Nolte et al. |
| 5,193,396 A | 3/1993 | Gorski |
| 5,199,490 A | 4/1993 | Surles et al. |
| 5,201,848 A | 4/1993 | Powers |
| 5,203,413 A | 4/1993 | Zerhbouh |
| 5,213,705 A | 5/1993 | Olson |
| 5,224,543 A | 7/1993 | Watkins |
| 5,232,490 A | 8/1993 | Bender et al. |
| 5,238,067 A | 8/1993 | Jennings, Jr. |
| 5,246,336 A | 9/1993 | Furukawa |
| 5,251,286 A | 10/1993 | Wiener et al. |
| 5,256,315 A | 10/1993 | Lockhart |
| 5,271,465 A | 12/1993 | Schmidt et al. |
| 5,293,905 A | 3/1994 | Friedrich |
| 5,302,297 A | 4/1994 | Barthrope |
| 5,358,378 A | 10/1994 | Holscher |
| 5,384,064 A | 1/1995 | Peterson |
| 5,387,865 A | 2/1995 | Jerosch-Herold et al. |
| 5,390,529 A | 2/1995 | Ghiselli |
| 5,435,187 A | 7/1995 | Ewy |
| 5,478,802 A | 12/1995 | Moradi-Araghi |
| 5,486,762 A | 1/1996 | Freedman et al. |
| 5,529,123 A | 6/1996 | Carpenter et al. |
| 5,551,516 A | 9/1996 | Norman et al. |
| 5,586,027 A | 12/1996 | Carlson et al. |
| 5,604,184 A | 2/1997 | Ellis et al. |
| 5,613,555 A | 3/1997 | Sorem et al. |
| 5,620,048 A | 4/1997 | Beauquin |
| 5,661,237 A | 8/1997 | Dussan et al. |
| 5,757,473 A | 5/1998 | Kanduth et al. |
| 5,759,964 A | 6/1998 | Shuchart |
| 5,831,177 A | 11/1998 | Waid et al. |
| 5,869,750 A | 2/1999 | Onan |
| 5,912,219 A | 6/1999 | Carrie et al. |
| 5,944,104 A | 8/1999 | Riese |
| 5,964,295 A | 10/1999 | Brown et al. |
| 5,967,233 A | 10/1999 | Riese |
| 5,999,887 A | 12/1999 | Giannakopoulos et al. |
| 6,012,520 A | 1/2000 | Yu et al. |
| 6,035,936 A | 3/2000 | Whalen |
| 6,076,046 A | 6/2000 | Vassudevan |
| 6,095,679 A | 8/2000 | Hammiche et al. |
| 6,119,777 A | 9/2000 | Runia |
| 6,121,336 A | 9/2000 | Okoroafor et al. |
| 6,129,507 A | 10/2000 | Ganelin |
| 6,131,661 A | 10/2000 | Conner et al. |
| 6,138,760 A | 10/2000 | Lopez et al. |
| 6,140,816 A | 10/2000 | Heron et al. |
| 6,143,698 A | 11/2000 | Murphey et al. |
| 6,165,295 A | 12/2000 | Wagaman |
| 6,176,315 B1 | 1/2001 | Reddy et al. |
| 6,193,396 B1 | 2/2001 | Gorski |
| 6,207,620 B1 | 3/2001 | Gonzalez et al. |
| 6,227,295 B1 | 5/2001 | Mitchell et al. |
| 6,258,859 B1 | 7/2001 | Dahayanake et al. |
| 6,263,729 B1 | 7/2001 | Catala |
| 6,264,440 B1 | 7/2001 | Klein et al. |
| 6,306,800 B1 | 10/2001 | Samuel et al. |
| 6,349,595 B1 | 2/2002 | Lorenzo et al. |
| 6,399,546 B1 | 6/2002 | Chang et al. |
| 6,410,489 B1 | 6/2002 | Zhang et al. |
| 6,411,902 B1 | 6/2002 | Wiltshire |
| 6,435,277 B1 | 8/2002 | Qu et al. |
| 6,468,945 B1 | 10/2002 | Zhang |
| 6,478,971 B1 | 11/2002 | Koefod et al. |
| 6,482,866 B1 | 11/2002 | Dahayanake et al. |
| 6,488,091 B1 | 12/2002 | Weaver |
| 6,491,099 B1 | 12/2002 | Di Lullo Arias et al. |
| 6,491,425 B1 | 12/2002 | Hammiche et al. |
| 6,494,263 B2 | 12/2002 | Todd |
| 6,516,080 B1 | 2/2003 | Nur |

(56) References Cited

U.S. PATENT DOCUMENTS

| | | |
|---|---|---|
| 6,579,572 B2 | 6/2003 | Espin et al. |
| 6,605,570 B2 | 8/2003 | Miller et al. |
| 6,609,067 B2 | 8/2003 | Tare et al. |
| 6,613,720 B1 | 9/2003 | Feraud et al. |
| 6,652,682 B1 | 11/2003 | Fawls |
| 6,663,778 B1 | 12/2003 | Bader |
| 6,694,262 B2 | 2/2004 | Rozak |
| 6,705,398 B2 | 3/2004 | Weng |
| 6,715,553 B2 | 4/2004 | Reddy et al. |
| 6,729,409 B1 | 5/2004 | Gupta et al. |
| 6,747,270 B2 | 6/2004 | Pereira et al. |
| 6,749,022 B1 | 6/2004 | Fredd |
| 6,776,054 B1 | 8/2004 | Stephenson et al. |
| 6,776,235 B1 | 8/2004 | England |
| 6,831,108 B2 | 12/2004 | Dahanayake et al. |
| 6,832,158 B2 | 12/2004 | Mese et al. |
| 6,846,420 B2 | 1/2005 | Reddy et al. |
| 6,866,048 B2 | 3/2005 | Mattox |
| 6,875,728 B2 | 4/2005 | Gupta et al. |
| 6,881,709 B2 | 4/2005 | Nelson et al. |
| 6,884,760 B1 | 4/2005 | Brand et al. |
| 6,947,843 B2 | 9/2005 | Fisher et al. |
| 6,986,391 B2 | 1/2006 | Funkhouser et al. |
| 6,989,391 B2 | 1/2006 | Funkhouser |
| 7,001,872 B2 | 2/2006 | Pyecroft et al. |
| 7,007,752 B2 | 3/2006 | Reddy et al. |
| 7,011,154 B2 | 3/2006 | Maher et al. |
| 7,044,220 B2 | 5/2006 | Nguyen et al. |
| 7,052,901 B2 | 5/2006 | Crews |
| 7,063,150 B2 | 6/2006 | Slabaugh et al. |
| 7,077,199 B2 | 7/2006 | Vinegar et al. |
| 7,081,439 B2 | 7/2006 | Sullivan et al. |
| 7,086,484 B2 | 8/2006 | Smith |
| 7,091,719 B2 | 8/2006 | Freedman |
| 7,093,663 B1 | 8/2006 | Bader |
| 7,098,663 B1 | 8/2006 | Bader |
| 7,134,497 B1 | 11/2006 | Chatterji et al. |
| 7,148,184 B2 | 12/2006 | Francini et al. |
| 7,148,185 B2 | 12/2006 | Fu et al. |
| 7,198,722 B2 | 4/2007 | Hussain |
| 7,207,388 B2 | 4/2007 | Samuel et al. |
| 7,210,528 B1 | 5/2007 | Brannon et al. |
| 7,216,709 B2 | 5/2007 | McElfresh et al. |
| 7,252,146 B2 | 8/2007 | Slabaugh et al. |
| 7,255,169 B2 | 8/2007 | Van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,291,651 B2 | 11/2007 | Chen et al. |
| 7,299,874 B2 | 11/2007 | Welton et al. |
| 7,326,670 B2 | 2/2008 | DiLullo et al. |
| 7,334,635 B2 | 2/2008 | Nguyen |
| 7,334,636 B2 | 2/2008 | Nguyen |
| 7,341,980 B2 | 3/2008 | Lee et al. |
| 7,344,889 B2 | 3/2008 | Kelemen et al. |
| 7,369,980 B2 | 5/2008 | Deffenbaugh et al. |
| 7,373,977 B1 | 5/2008 | Berger et al. |
| 7,387,987 B2 | 6/2008 | Chen et al. |
| 7,424,911 B2 | 9/2008 | McCarthy et al. |
| 7,426,961 B2 | 9/2008 | Stephenson et al. |
| 7,451,812 B2 | 11/2008 | Cooper et al. |
| 7,472,748 B2 | 1/2009 | Gdanski et al. |
| 7,472,751 B2 | 1/2009 | Brannon et al. |
| 7,491,444 B2 | 2/2009 | Smith et al. |
| 7,500,517 B2 | 3/2009 | Looney et al. |
| 7,513,306 B2 | 4/2009 | Pfefferle et al. |
| 7,521,400 B2 | 4/2009 | Samuel |
| 7,526,418 B2 | 4/2009 | Pita et al. |
| 7,527,097 B2 | 5/2009 | Patel |
| 7,544,643 B2 | 6/2009 | Huang |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,595,284 B2 | 9/2009 | Crews |
| 7,610,962 B2 | 11/2009 | Fowler |
| 7,615,517 B2 | 11/2009 | Huang et al. |
| 7,621,173 B2 | 11/2009 | Hsu |
| 7,642,223 B2 | 1/2010 | Santra et al. |
| 7,645,724 B2 | 1/2010 | Crews |
| 7,645,883 B1 | 1/2010 | Hawkins et al. |
| 7,654,159 B2 | 2/2010 | Enoksson |
| 7,655,603 B2 | 2/2010 | Crews |
| 7,678,723 B2 | 3/2010 | Duenckel et al. |
| 7,703,531 B2 | 4/2010 | Huang |
| 7,767,628 B2 | 8/2010 | Kippie et al. |
| 7,770,647 B2 | 8/2010 | Watson et al. |
| 7,771,549 B1 | 8/2010 | Christe et al. |
| 7,775,763 B1 | 8/2010 | Johnson et al. |
| 7,789,164 B2 | 9/2010 | Looney et al. |
| 7,803,740 B2 | 9/2010 | Bicerano et al. |
| 7,803,744 B2 | 9/2010 | Chen et al. |
| 7,806,182 B2 | 10/2010 | Waters et al. |
| 7,823,656 B1 | 11/2010 | Williams et al. |
| 7,825,053 B2 | 11/2010 | Duenckel et al. |
| 7,828,057 B2 | 11/2010 | Kearl et al. |
| 7,845,409 B2 | 12/2010 | Shinbach et al. |
| 7,857,055 B2 | 12/2010 | Li |
| 7,867,613 B2 | 1/2011 | Smith et al. |
| 7,878,246 B2 | 2/2011 | Samuel et al. |
| 7,878,248 B2 | 2/2011 | Abad et al. |
| 7,886,826 B2 | 2/2011 | Robinson et al. |
| 7,887,918 B2 | 2/2011 | Smith et al. |
| 7,918,277 B2 | 4/2011 | Brannon et al. |
| 7,921,911 B2 | 4/2011 | Fuller et al. |
| 7,933,018 B2 | 4/2011 | Vannuffelen et al. |
| 7,983,845 B2 | 7/2011 | Minh |
| 7,997,342 B2 | 8/2011 | Welton et al. |
| 8,003,212 B2 | 8/2011 | Smith et al. |
| 8,003,577 B2 | 8/2011 | Li et al. |
| 8,006,760 B2 | 8/2011 | Fleming et al. |
| 8,012,358 B2 | 9/2011 | Salbaugh et al. |
| 8,013,660 B2 | 9/2011 | Fitzi |
| 8,016,545 B2 | 9/2011 | Oklejas et al. |
| 8,024,124 B2 | 9/2011 | Sayers |
| 8,047,288 B2 | 11/2011 | Skala et al. |
| 8,061,424 B2 | 11/2011 | Willberg et al. |
| 8,066,068 B2 | 11/2011 | Lesko et al. |
| 8,081,802 B2 | 12/2011 | Dvorkin et al. |
| 8,100,190 B2 | 1/2012 | Weaver |
| 8,104,536 B2 | 1/2012 | Looney et al. |
| 8,119,576 B2 | 2/2012 | Reyes et al. |
| 8,127,850 B2 | 3/2012 | Brannon et al. |
| 8,146,416 B2 | 4/2012 | Pisio et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,216,675 B2 | 7/2012 | Palamara et al. |
| 8,225,866 B2 | 7/2012 | Rouffignac et al. |
| 8,278,931 B2 | 10/2012 | Fang et al. |
| 8,309,498 B2 | 11/2012 | Funkhouser et al. |
| 8,337,142 B2 | 12/2012 | Eslinger et al. |
| 8,352,228 B2 | 1/2013 | Walters et al. |
| 8,380,437 B2 | 2/2013 | Abousleiman et al. |
| 8,408,305 B2 | 4/2013 | Brannon et al. |
| 8,450,252 B2 | 5/2013 | Funkhouser et al. |
| 8,473,213 B2 | 6/2013 | Zhu et al. |
| 8,490,700 B2 | 7/2013 | Lesko et al. |
| 8,568,081 B2 | 10/2013 | Song et al. |
| 8,573,302 B2 | 11/2013 | Robb et al. |
| 8,584,755 B2 | 11/2013 | Willberg et al. |
| 8,606,524 B2 | 12/2013 | Soliman et al. |
| 8,614,157 B2 | 12/2013 | Pope et al. |
| 8,614,573 B2 | 12/2013 | Minh |
| 8,616,294 B2 | 12/2013 | Zubrin et al. |
| 8,619,500 B2 | 12/2013 | Gray et al. |
| 8,636,065 B2 | 1/2014 | Lesko et al. |
| 8,646,524 B2 | 2/2014 | Al-Buriak |
| 8,653,011 B2 | 2/2014 | Samuel et al. |
| 8,701,760 B2 | 4/2014 | Parsche |
| 8,701,770 B2 | 4/2014 | Schultz |
| 8,701,788 B2 | 4/2014 | Wigand et al. |
| 8,729,903 B2 | 5/2014 | Srnka et al. |
| 8,731,889 B2 | 5/2014 | Du et al. |

(56) References Cited

U.S. PATENT DOCUMENTS

| | | |
|---|---|---|
| 8,757,259 B2 | 6/2014 | Lesko et al. |
| 8,763,699 B2 | 7/2014 | Medvedev et al. |
| 8,763,703 B2 | 7/2014 | Saini et al. |
| 8,778,852 B2 | 7/2014 | Huang |
| 8,796,187 B2 | 8/2014 | Reyes et al. |
| 8,815,096 B2 | 8/2014 | Zuback et al. |
| 8,821,806 B2 | 9/2014 | Hersherwitz et al. |
| 8,822,386 B2 | 9/2014 | Quintero et al. |
| 8,834,726 B2 | 9/2014 | Keister |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,877,041 B2 | 11/2014 | Parsche |
| 8,883,693 B2 | 11/2014 | Eldred et al. |
| 8,899,331 B2 | 12/2014 | Burnham et al. |
| 8,936,083 B2 | 1/2015 | Nguyen |
| 8,936,089 B2 | 1/2015 | Wigand |
| 8,967,249 B2 | 3/2015 | Akkurt et al. |
| 8,985,213 B2 | 3/2015 | Saini et al. |
| 9,006,151 B2 | 4/2015 | Amanullah et al. |
| 9,006,153 B2 | 4/2015 | Lin et al. |
| 9,033,033 B2 | 5/2015 | Thomas et al. |
| 9,033,043 B2 | 5/2015 | Hinkel |
| 9,034,802 B2 | 5/2015 | Ahrenst et al. |
| 9,046,509 B2 | 6/2015 | Dvorkin et al. |
| 9,057,797 B2 | 6/2015 | Omeragic et al. |
| 9,080,440 B2 | 7/2015 | Panga et al. |
| 9,085,477 B2 | 7/2015 | Banerjee et al. |
| 9,085,727 B2 | 7/2015 | Litvinets et al. |
| 9,097,818 B2 | 8/2015 | Hursan |
| 9,128,210 B2 | 9/2015 | Pomerantz |
| 9,133,398 B2 | 9/2015 | Wigand et al. |
| 9,152,745 B2 | 10/2015 | Glinsky |
| 9,181,789 B2 | 11/2015 | Nevison |
| 9,222,902 B2 | 12/2015 | Gruber et al. |
| 9,234,529 B2 | 1/2016 | Meuter |
| 9,266,754 B2 | 2/2016 | Fazrie et al. |
| 9,297,244 B2 | 3/2016 | Mahoney et al. |
| 9,341,052 B2 | 5/2016 | Gadberry et al. |
| 9,447,673 B2 | 9/2016 | Medvedev et al. |
| 9,453,156 B2 | 9/2016 | Wu |
| 9,523,268 B2 | 12/2016 | Potapenko et al. |
| 9,611,416 B2 | 4/2017 | Wang et al. |
| 9,644,137 B2 | 5/2017 | Dean et al. |
| 9,653,812 B2 | 5/2017 | Yan |
| 9,664,018 B2 | 5/2017 | Vandeponseele et al. |
| 9,670,764 B2 | 6/2017 | Lesko et al. |
| 9,677,560 B1 | 6/2017 | Davis et al. |
| 9,688,904 B2 | 6/2017 | Wang et al. |
| 9,696,270 B1 | 7/2017 | Roy et al. |
| 9,725,639 B2 | 8/2017 | Vo et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,845,670 B2 | 12/2017 | Surjaatmadja et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,896,919 B1 | 2/2018 | Chen |
| 9,902,898 B2 | 2/2018 | Nelson et al. |
| 9,909,404 B2 | 3/2018 | Hwang et al. |
| 9,927,344 B2 | 3/2018 | Chertov |
| 9,945,220 B2 | 4/2018 | Saini et al. |
| 9,995,125 B2 | 6/2018 | Madasu et al. |
| 9,995,220 B2 | 6/2018 | Hawie et al. |
| 10,001,769 B2 | 6/2018 | Huang et al. |
| 10,023,782 B2 | 7/2018 | Wang et al. |
| 10,030,495 B2 | 7/2018 | Litvinets et al. |
| 10,047,281 B2 | 8/2018 | Nguyen et al. |
| 10,066,149 B2 | 9/2018 | Li et al. |
| 10,077,396 B2 | 9/2018 | Nguyen et al. |
| 10,082,013 B2 | 9/2018 | Nguyen |
| 10,087,364 B2 | 10/2018 | Kaufman et al. |
| 10,100,245 B1 | 10/2018 | Bulekbay et al. |
| 10,113,396 B2 | 10/2018 | Nelson et al. |
| 10,113,406 B1 | 10/2018 | Gomaa et al. |
| 10,144,866 B2 | 12/2018 | Liang |
| 10,151,715 B2 | 12/2018 | Hull et al. |
| 10,180,054 B2 | 1/2019 | Chen |
| 10,202,827 B2 | 2/2019 | Delchambre |
| 10,208,239 B2 | 2/2019 | Ballard |
| 10,273,398 B2 | 4/2019 | Liu et al. |
| 10,309,202 B2 | 6/2019 | Soliman |
| 10,329,478 B2 | 6/2019 | Schnoor et al. |
| 10,345,764 B2 | 7/2019 | Early et al. |
| 10,351,758 B2 | 7/2019 | Hull et al. |
| 10,379,068 B2 | 8/2019 | Hull et al. |
| 10,415,367 B2 | 9/2019 | Galford |
| 10,417,561 B2 | 9/2019 | Mohaghegh |
| 10,421,897 B2 | 9/2019 | Skiba et al. |
| 10,428,262 B2 | 10/2019 | Chakraborty et al. |
| 10,442,980 B2 | 10/2019 | Li |
| 10,443,367 B2 | 10/2019 | Chen |
| 10,451,601 B2 | 10/2019 | Han et al. |
| 10,472,555 B2 | 11/2019 | Hutchins et al. |
| 10,479,927 B2 | 11/2019 | Hull et al. |
| 10,501,680 B2 | 12/2019 | Li et al. |
| 10,550,314 B2 | 2/2020 | Liang et al. |
| 10,571,384 B2 | 2/2020 | Liu et al. |
| 10,611,967 B2 | 4/2020 | Inan |
| 10,619,469 B2 | 4/2020 | Han et al. |
| 10,647,909 B2 | 5/2020 | Li et al. |
| 10,655,443 B2 | 5/2020 | Gomma et al. |
| 10,669,829 B2 | 6/2020 | Liang et al. |
| 10,711,606 B2 | 7/2020 | Hull et al. |
| 10,775,360 B2 | 9/2020 | Han et al. |
| 10,781,360 B2 | 9/2020 | Hull et al. |
| 10,836,956 B2 | 11/2020 | Bulekbay et al. |
| 10,837,279 B2 | 11/2020 | Han et al. |
| 10,844,701 B2 | 11/2020 | Xiao et al. |
| 10,858,578 B2 | 12/2020 | Bulekbay et al. |
| 10,865,342 B2 | 12/2020 | Li et al. |
| 10,871,060 B2 | 12/2020 | Han et al. |
| 10,871,061 B2 | 12/2020 | Hull |
| 10,883,042 B2 | 1/2021 | Bulekbay |
| 10,895,140 B2 | 1/2021 | Cairns et al. |
| 10,995,263 B2 | 5/2021 | Bulekbay et al. |
| 11,001,750 B2 | 5/2021 | Li et al. |
| 11,028,312 B2 | 6/2021 | Li et al. |
| 11,078,406 B2 | 8/2021 | Hull et al. |
| 11,098,564 B2 | 8/2021 | Li et al. |
| 11,131,177 B2 | 9/2021 | Lo Cascio et al. |
| 11,162,357 B2 | 11/2021 | Liu et al. |
| 11,248,446 B2 | 2/2022 | Liang et al. |
| 2001/0032055 A1 | 10/2001 | Omar |
| 2002/0003115 A1 | 1/2002 | Conaway et al. |
| 2002/0023752 A1 | 2/2002 | Qu |
| 2002/0147114 A1 | 10/2002 | Dobson, Sr. et al. |
| 2003/0209248 A1 | 11/2003 | Ward |
| 2003/0212465 A1 | 11/2003 | Howard et al. |
| 2003/0216263 A1 | 11/2003 | Tibbles et al. |
| 2003/0221831 A1 | 12/2003 | Reddy |
| 2004/0033905 A1 | 2/2004 | Shinbach et al. |
| 2004/0101457 A1 | 5/2004 | Pahlman et al. |
| 2004/0152601 A1 | 8/2004 | Still et al. |
| 2004/0173244 A1 | 9/2004 | Strothoff et al. |
| 2004/0211567 A1 | 10/2004 | Aud |
| 2004/0211568 A1 | 10/2004 | Funkhouser et al. |
| 2005/0016732 A1 | 1/2005 | Brannon |
| 2005/0039919 A1 | 2/2005 | Harris et al. |
| 2005/0059558 A1 | 3/2005 | Blauch et al. |
| 2005/0060130 A1 | 3/2005 | Shapiro et al. |
| 2005/0103118 A1 | 5/2005 | Workman |
| 2005/0137094 A1 | 6/2005 | Weaver et al. |
| 2005/0194147 A1 | 9/2005 | Metcalf et al. |
| 2005/0197257 A1 | 9/2005 | Bouwmeester |

(56) References Cited

U.S. PATENT DOCUMENTS

| | | |
|---|---|---|
| 2005/0200210 A1 | 9/2005 | Kotsonis et al. |
| 2005/0274523 A1 | 12/2005 | Brannon et al. |
| 2006/0025321 A1 | 2/2006 | Treybig |
| 2006/0030632 A1 | 2/2006 | Krueger |
| 2006/0035808 A1 | 2/2006 | Ahmed et al. |
| 2006/0041411 A1 | 2/2006 | Yong et al. |
| 2006/0047489 A1 | 3/2006 | Scheidt et al. |
| 2006/0073980 A1 | 4/2006 | Brannon et al. |
| 2006/0084579 A1 | 4/2006 | Berger et al. |
| 2006/0092766 A1 | 5/2006 | Shelley et al. |
| 2006/0234871 A1 | 10/2006 | Dalrymple et al. |
| 2006/0265204 A1 | 11/2006 | Wallis et al. |
| 2007/0012437 A1 | 1/2007 | Clingman et al. |
| 2007/0054054 A1 | 3/2007 | Svoboda et al. |
| 2007/0087940 A1 | 4/2007 | Qu et al. |
| 2007/0137858 A1 | 6/2007 | Considine |
| 2007/0203677 A1 | 8/2007 | Awwiller |
| 2007/0212238 A1 | 9/2007 | Jacobsen et al. |
| 2007/0235181 A1 | 10/2007 | Lecampion et al. |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2008/0093073 A1 | 4/2008 | Bustos et al. |
| 2008/0103068 A1 | 5/2008 | Parris |
| 2008/0115930 A1 | 5/2008 | Peters |
| 2008/0135242 A1 | 6/2008 | Lesko |
| 2008/0149329 A1 | 6/2008 | Cooper |
| 2008/0153718 A1 | 6/2008 | Heidenfelder et al. |
| 2008/0187434 A1 | 8/2008 | Neiszer |
| 2008/0217012 A1 | 9/2008 | Delorey |
| 2008/0234147 A1 | 9/2008 | Li et al. |
| 2009/0032252 A1 | 2/2009 | Boney et al. |
| 2009/0044945 A1 | 2/2009 | Wilberg et al. |
| 2009/0071239 A1 | 3/2009 | Rojas et al. |
| 2009/0087912 A1 | 4/2009 | Ramos et al. |
| 2009/0095469 A1 | 4/2009 | Dozier |
| 2009/0132218 A1 | 5/2009 | Ledgerwood, III |
| 2009/0143252 A1 | 6/2009 | Lehmann |
| 2009/0145607 A1 | 6/2009 | Li et al. |
| 2009/0151944 A1 | 6/2009 | Fuller et al. |
| 2009/0193881 A1 | 8/2009 | Finnberg |
| 2009/0203557 A1 | 8/2009 | Barnes et al. |
| 2009/0205817 A1 | 8/2009 | Gustafson |
| 2009/0242196 A1 | 10/2009 | Pao |
| 2009/0248309 A1 | 10/2009 | Nelville et al. |
| 2009/0253595 A1 | 10/2009 | Qu |
| 2009/0277634 A1 | 11/2009 | Case |
| 2009/0283257 A1 | 11/2009 | Becker |
| 2009/0298720 A1 | 12/2009 | Nguyen et al. |
| 2009/0313772 A1 | 12/2009 | Talley |
| 2010/0010106 A1 | 1/2010 | Crews |
| 2010/0030527 A1 | 2/2010 | Prasad et al. |
| 2010/0040492 A1 | 2/2010 | Eslinger et al. |
| 2010/0043823 A1 | 2/2010 | Lee |
| 2010/0044049 A1 | 2/2010 | Leshchyshyn |
| 2010/0048430 A1 | 2/2010 | Funkhouser et al. |
| 2010/0049625 A1 | 2/2010 | Biebesheimer et al. |
| 2010/0051511 A1 | 3/2010 | Faerman |
| 2010/0121623 A1 | 5/2010 | Yogeswaren |
| 2010/0126936 A1 | 5/2010 | Jones |
| 2010/0128982 A1 | 5/2010 | Dvorkin et al. |
| 2010/0154514 A1 | 6/2010 | Algive |
| 2010/0186520 A1 | 7/2010 | Wheeler |
| 2010/0213579 A1 | 8/2010 | Henry |
| 2010/0216672 A1 | 8/2010 | Todd |
| 2010/0224365 A1 | 9/2010 | Abad |
| 2010/0243242 A1 | 9/2010 | Boney et al. |
| 2010/0243248 A1 | 9/2010 | Golomb |
| 2010/0258265 A1 | 10/2010 | Karanikas et al. |
| 2010/0263867 A1 | 10/2010 | Horton et al. |
| 2010/0276142 A1 | 11/2010 | Skildum et al. |
| 2010/0279136 A1 | 11/2010 | Bonucci |
| 2010/0282468 A1 | 11/2010 | Willberg et al. |
| 2010/0294500 A1 | 11/2010 | Lesko |
| 2010/0314113 A1 | 12/2010 | Huang |
| 2010/0323933 A1 | 12/2010 | Fuller et al. |
| 2011/0005969 A1 | 1/2011 | Giffin |
| 2011/0065612 A1 | 3/2011 | Stokes et al. |
| 2011/0083849 A1 | 4/2011 | Medvedev |
| 2011/0105369 A1 | 5/2011 | Reddy |
| 2011/0108277 A1 | 5/2011 | Dudley et al. |
| 2011/0251111 A1 | 10/2011 | Lin et al. |
| 2011/0257944 A1 | 10/2011 | Du et al. |
| 2011/0259588 A1 | 10/2011 | Ali |
| 2012/0006551 A1 | 1/2012 | Carman et al. |
| 2012/0018143 A1 | 1/2012 | Lembcke |
| 2012/0018159 A1 | 1/2012 | Gulta et al. |
| 2012/0026037 A1 | 2/2012 | Thomson et al. |
| 2012/0061081 A1 | 3/2012 | Sultenfuss et al. |
| 2012/0085534 A1 | 4/2012 | MorVan et al. |
| 2012/0097392 A1 | 4/2012 | Reyes et al. |
| 2012/0125618 A1 | 5/2012 | Willberg |
| 2012/0129737 A1 | 5/2012 | Lesko et al. |
| 2012/0152547 A1 | 6/2012 | Hinkel |
| 2012/0160486 A1 | 6/2012 | Wigand |
| 2012/0179444 A1 | 7/2012 | Ganguly et al. |
| 2012/0193578 A1 | 8/2012 | Pan et al. |
| 2012/0205313 A1 | 8/2012 | Sathrugnan et al. |
| 2012/0214714 A1 | 8/2012 | Whitwell |
| 2012/0247764 A1 | 10/2012 | Panga |
| 2012/0247774 A1 | 10/2012 | Li et al. |
| 2012/0261129 A1 | 10/2012 | Becker |
| 2012/0261617 A1 | 10/2012 | Pan et al. |
| 2012/0267102 A1 | 10/2012 | Huang et al. |
| 2012/0273193 A1 | 11/2012 | Sen et al. |
| 2012/0305247 A1 | 12/2012 | Chen et al. |
| 2012/0318498 A1 | 12/2012 | Parsche |
| 2013/0013209 A1 | 1/2013 | Zhu et al. |
| 2013/0025867 A1 | 1/2013 | Sun et al. |
| 2013/0031971 A1 | 2/2013 | Freese et al. |
| 2013/0048562 A1 | 2/2013 | Keister |
| 2013/0056213 A1 | 3/2013 | Medvedev et al. |
| 2013/0084643 A1 | 4/2013 | Commarieu et al. |
| 2013/0090270 A1 | 4/2013 | Crews et al. |
| 2013/0118740 A1 | 5/2013 | Sherman et al. |
| 2013/0118744 A1 | 5/2013 | Gamage |
| 2013/0126169 A1 | 5/2013 | Al-Nakhli et al. |
| 2013/0137610 A1 | 5/2013 | Huang et al. |
| 2013/0160994 A1 | 6/2013 | Alsop et al. |
| 2013/0161002 A1 | 6/2013 | Wigand |
| 2013/0161003 A1 | 6/2013 | Mikhailovich et al. |
| 2013/0161008 A1 | 6/2013 | Klingler |
| 2013/0192839 A1 | 8/2013 | Brown et al. |
| 2013/0213120 A1 | 8/2013 | Lebedev |
| 2013/0213638 A1 | 8/2013 | Keller |
| 2013/0228019 A1 | 9/2013 | Meadows |
| 2013/0231908 A1 | 9/2013 | Williams et al. |
| 2013/0233536 A1 | 9/2013 | Alqam |
| 2013/0238304 A1 | 9/2013 | Glinsky |
| 2013/0260649 A1 | 10/2013 | Thomson |
| 2013/0264121 A1 | 10/2013 | Young |
| 2013/0269933 A1 | 10/2013 | Pomerantz et al. |
| 2013/0274149 A1 | 10/2013 | Lafitte et al. |
| 2013/0275099 A1 | 10/2013 | Frydman |
| 2013/0282386 A1 | 10/2013 | Vilermo et al. |
| 2013/0290064 A1 | 10/2013 | Altamirano et al. |
| 2013/0306321 A1 | 11/2013 | Lanctot-Downs et al. |
| 2013/0310492 A1 | 11/2013 | Morgan |
| 2013/0333892 A1 | 12/2013 | McClung, IV |
| 2013/0341028 A1 | 12/2013 | Christian et al. |
| 2014/0000899 A1 | 1/2014 | Nevison |
| 2014/0008305 A1 | 1/2014 | Nichols et al. |
| 2014/0014327 A1 | 1/2014 | Badri et al. |
| 2014/0027109 A1 | 1/2014 | Al-Baraik |
| 2014/0037422 A1 | 2/2014 | Gilarranz |
| 2014/0045732 A1 | 2/2014 | Mazyar |
| 2014/0048694 A1 | 2/2014 | Pomerantz |
| 2014/0090850 A1 | 4/2014 | Benicewicz |
| 2014/0096964 A1 | 4/2014 | Chakraborty et al. |
| 2014/0116710 A1 | 5/2014 | Naser-El-Din et al. |
| 2014/0131040 A9 | 5/2014 | Panga |
| 2014/0144633 A1 | 5/2014 | Nguyen |

(56) References Cited

U.S. PATENT DOCUMENTS

| | | |
|---|---|---|
| 2014/0144634 A1 | 5/2014 | Nguyen |
| 2014/0144635 A1 | 5/2014 | Nguyen |
| 2014/0158632 A1 | 6/2014 | Govind et al. |
| 2014/0221257 A1 | 8/2014 | Roddy |
| 2014/0224472 A1 | 8/2014 | Parsche |
| 2014/0225607 A1 | 8/2014 | Edwards |
| 2014/0231077 A1 | 8/2014 | Rivero et al. |
| 2014/0239956 A1 | 8/2014 | Hoversten |
| 2014/0243246 A1 | 8/2014 | Hendrickson |
| 2014/0246244 A1 | 9/2014 | Shen |
| 2014/0247997 A1 | 9/2014 | Nishyama |
| 2014/0251605 A1 | 9/2014 | Hera |
| 2014/0260694 A1 | 9/2014 | Szlendak |
| 2014/0262289 A1* | 9/2014 | Reyes .................. C09K 8/74 |
| | | 507/241 |
| 2014/0271321 A1 | 9/2014 | Maderud |
| 2014/0290943 A1 | 10/2014 | Ladva |
| 2014/0296113 A1 | 10/2014 | Reyes |
| 2014/0352954 A1 | 12/2014 | Lakhtychkin et al. |
| 2014/0353042 A1 | 12/2014 | Karale et al. |
| 2014/0364343 A1 | 12/2014 | Nelson et al. |
| 2014/0367100 A1 | 12/2014 | Oliveria et al. |
| 2014/0367111 A1 | 12/2014 | Gamage |
| 2014/0374104 A1 | 12/2014 | Kushal |
| 2015/0019183 A1 | 1/2015 | Suzuki |
| 2015/0039919 A1 | 2/2015 | Lim et al. |
| 2015/0041136 A1 | 2/2015 | Martin |
| 2015/0055438 A1 | 2/2015 | Yan et al. |
| 2015/0057097 A1 | 2/2015 | Cho |
| 2015/0057196 A1 | 2/2015 | Debord et al. |
| 2015/0065398 A1 | 3/2015 | Gartland et al. |
| 2015/0068749 A1 | 3/2015 | Wernimont |
| 2015/0071750 A1 | 3/2015 | Foster |
| 2015/0072902 A1 | 3/2015 | Lafitte et al. |
| 2015/0075782 A1 | 3/2015 | Sharma |
| 2015/0075797 A1 | 3/2015 | Li |
| 2015/0080271 A1 | 3/2015 | De Wolf et al. |
| 2015/0083405 A1 | 3/2015 | Dobroskok |
| 2015/0083420 A1 | 3/2015 | Gupta et al. |
| 2015/0083669 A1 | 3/2015 | Matherly et al. |
| 2015/0101808 A1 | 4/2015 | Saini et al. |
| 2015/0103624 A1 | 4/2015 | Thompson |
| 2015/0112488 A1 | 4/2015 | Hoehn et al. |
| 2015/0152724 A1 | 6/2015 | Amendt |
| 2015/0167439 A1 | 6/2015 | Kasevich et al. |
| 2015/0167440 A1 | 6/2015 | Kasevich |
| 2015/0192005 A1 | 7/2015 | Saeedfar |
| 2015/0211346 A1 | 7/2015 | Potapenko |
| 2015/0218439 A1 | 8/2015 | Dean et al. |
| 2015/0259593 A1 | 9/2015 | Kaufman et al. |
| 2015/0275644 A1 | 10/2015 | Chen et al. |
| 2015/0284625 A1 | 10/2015 | Silveira |
| 2015/0293256 A1 | 10/2015 | Dusterhoft |
| 2015/0300140 A1 | 10/2015 | Eoff et al. |
| 2015/0300968 A1 | 10/2015 | Bae et al. |
| 2015/0322759 A1 | 11/2015 | Okoniewski |
| 2015/0344771 A1 | 12/2015 | Jiang et al. |
| 2015/0368541 A1 | 12/2015 | Monclin et al. |
| 2015/0369028 A1 | 12/2015 | Potapenko |
| 2016/0017202 A1 | 1/2016 | Yang et al. |
| 2016/0024367 A1 | 1/2016 | Zha |
| 2016/0060504 A1 | 3/2016 | Dawson et al. |
| 2016/0061017 A1 | 3/2016 | Nguyen et al. |
| 2016/0103047 A1 | 4/2016 | Liu |
| 2016/0103049 A1 | 4/2016 | Liu |
| 2016/0130496 A1 | 5/2016 | Holtsclaw et al. |
| 2016/0137904 A1 | 5/2016 | Drake |
| 2016/0153273 A1 | 6/2016 | Nguyen |
| 2016/0153274 A1 | 6/2016 | Hull et al. |
| 2016/0154133 A1 | 6/2016 | Donderici et al. |
| 2016/0170067 A1 | 6/2016 | Heaton |
| 2016/0177674 A1 | 6/2016 | Shetty et al. |
| 2016/0194551 A1 | 7/2016 | Waters et al. |
| 2016/0203239 A1 | 7/2016 | Samuel et al. |
| 2016/0208591 A1 | 7/2016 | Weaver et al. |
| 2016/0208602 A1 | 7/2016 | Donderici et al. |
| 2016/0215202 A1 | 7/2016 | Weaver et al. |
| 2016/0215205 A1 | 7/2016 | Nguyen |
| 2016/0215604 A1 | 7/2016 | Potapenko et al. |
| 2016/0230549 A1 | 8/2016 | Minh et al. |
| 2016/0237338 A1 | 8/2016 | Bianchi |
| 2016/0251567 A1 | 9/2016 | Lin et al. |
| 2016/0256583 A1 | 9/2016 | Yamada |
| 2016/0265331 A1 | 9/2016 | Weng et al. |
| 2016/0289543 A1 | 10/2016 | Chang et al. |
| 2016/0319187 A1 | 11/2016 | Lawrence et al. |
| 2016/0319189 A1 | 11/2016 | Dusterhoft |
| 2016/0341019 A1 | 11/2016 | Qiu et al. |
| 2016/0341020 A1 | 11/2016 | Al-Buriak |
| 2016/0347994 A1 | 12/2016 | Purdy et al. |
| 2016/0362965 A1 | 12/2016 | Parlar et al. |
| 2016/0376494 A1 | 12/2016 | Li et al. |
| 2016/0379356 A1 | 12/2016 | Louis |
| 2017/0015895 A1 | 1/2017 | Cox |
| 2017/0031048 A1 | 2/2017 | Hilpert et al. |
| 2017/0032078 A1 | 2/2017 | Stelzer et al. |
| 2017/0051598 A1 | 2/2017 | Ouenes |
| 2017/0066959 A1 | 3/2017 | Hull et al. |
| 2017/0066962 A1 | 3/2017 | Ravi et al. |
| 2017/0067836 A1 | 3/2017 | Hull et al. |
| 2017/0121593 A1 | 5/2017 | Pantsurkin |
| 2017/0137703 A1 | 5/2017 | Leverson et al. |
| 2017/0138190 A1 | 5/2017 | Elkatatny et al. |
| 2017/0145303 A1 | 5/2017 | Fontenelle et al. |
| 2017/0145793 A1 | 5/2017 | Ouenes |
| 2017/0154135 A1 | 6/2017 | Huang et al. |
| 2017/0175505 A1 | 6/2017 | Curlett |
| 2017/0175752 A1 | 6/2017 | Hofer et al. |
| 2017/0176639 A1 | 6/2017 | Mosse et al. |
| 2017/0183942 A1 | 6/2017 | Veland |
| 2017/0187177 A1 | 6/2017 | Mangum |
| 2017/0194831 A1 | 7/2017 | Marvel |
| 2017/0197853 A1 | 7/2017 | Chudasama et al. |
| 2017/0198207 A1 | 7/2017 | Li et al. |
| 2017/0247997 A1 | 8/2017 | Kovalevsky |
| 2017/0248011 A1 | 8/2017 | Craddock et al. |
| 2017/0275525 A1 | 9/2017 | Koep et al. |
| 2017/0235181 A1 | 10/2017 | Lecampion et al. |
| 2017/0321711 A1 | 11/2017 | Collins et al. |
| 2017/0328179 A1 | 11/2017 | Dykatra et al. |
| 2017/0336528 A1 | 11/2017 | Badri et al. |
| 2017/0341979 A1 | 11/2017 | Hall et al. |
| 2017/0370197 A1 | 12/2017 | Han et al. |
| 2017/0370895 A1 | 12/2017 | Han |
| 2018/0037810 A1 | 2/2018 | Han et al. |
| 2018/0112126 A1 | 4/2018 | Yang et al. |
| 2018/0120213 A1 | 5/2018 | Dyshlyuk |
| 2018/0155602 A1 | 6/2018 | Zhang |
| 2018/0155615 A1 | 6/2018 | Rahy et al. |
| 2018/0195982 A1 | 7/2018 | Hull et al. |
| 2018/0202278 A1 | 7/2018 | Nelson et al. |
| 2018/0244981 A1 | 8/2018 | Panga et al. |
| 2018/0282616 A1 | 10/2018 | Debord et al. |
| 2018/0305208 A1 | 10/2018 | Mason |
| 2018/0319708 A1 | 11/2018 | Haque et al. |
| 2018/0321416 A1 | 11/2018 | Freedman |
| 2018/0334612 A1 | 11/2018 | Bulekbay et al. |
| 2018/0348111 A1 | 12/2018 | Hannon |
| 2018/0355707 A1 | 12/2018 | Herrera et al. |
| 2019/0010385 A1* | 1/2019 | Sayed .................. E21B 37/08 |
| 2019/0010795 A1 | 1/2019 | Cascio et al. |
| 2019/0017203 A1 | 1/2019 | Andoh et al. |
| 2019/0062619 A1 | 2/2019 | Li et al. |
| 2019/0078424 A1 | 3/2019 | Copeland et al. |
| 2019/0112912 A1 | 4/2019 | Thompson et al. |
| 2019/0211658 A1 | 7/2019 | Hull et al. |
| 2019/0226970 A1 | 7/2019 | Dusterhoft et al. |
| 2019/0249066 A1 | 8/2019 | Monclin et al. |
| 2019/0264095 A1 | 8/2019 | Qu et al. |
| 2019/0292436 A1 | 9/2019 | Mason et al. |
| 2019/0309611 A1 | 10/2019 | Liang et al. |
| 2019/0345377 A1 | 11/2019 | Haque et al. |
| 2019/0368346 A1 | 12/2019 | Liu et al. |
| 2020/0032636 A1 | 1/2020 | Chen et al. |

(56) References Cited

U.S. PATENT DOCUMENTS

| | | |
|---|---|---|
| 2020/0048531 A1 | 2/2020 | Hull et al. |
| 2020/0048532 A1 | 2/2020 | Vigderman et al. |
| 2020/0056464 A1 | 2/2020 | Li et al. |
| 2020/0157413 A1* | 5/2020 | Beuterbaugh ....... E21B 43/2405 |
| 2020/0248538 A1 | 8/2020 | Xiao et al. |
| 2020/0248695 A1 | 8/2020 | Xiao et al. |
| 2020/0339871 A1 | 10/2020 | Obot et al. |
| 2021/0024808 A1 | 1/2021 | Schipper et al. |
| 2021/0024814 A1 | 1/2021 | Schipper et al. |
| 2021/0040826 A1 | 2/2021 | Xiao et al. |
| 2021/0062071 A1 | 3/2021 | Li |
| 2021/0087915 A1 | 3/2021 | Han et al. |
| 2021/0124809 A1 | 4/2021 | Han et al. |
| 2021/0198553 A1 | 7/2021 | Hull et al. |
| 2021/0198558 A1 | 7/2021 | Hull et al. |
| 2021/0198559 A1 | 7/2021 | Hull et al. |
| 2021/0277762 A1 | 9/2021 | Liu et al. |
| 2021/0355372 A1 | 11/2021 | Haque et al. |
| 2022/0017813 A1 | 1/2022 | Malik et al. |

FOREIGN PATENT DOCUMENTS

| | | |
|---|---|---|
| CA | 2635868 | 12/2008 |
| CN | 2168104 | 6/1994 |
| CN | 1425846 | 6/2003 |
| CN | 101644151 | 2/2010 |
| CN | 101819111 | 12/2011 |
| CN | 1621803 | 5/2012 |
| CN | 102737137 | 10/2012 |
| CN | 103387827 | 11/2013 |
| CN | 203420906 | 2/2014 |
| CN | 102183410 | 5/2014 |
| CN | 104346498 | 2/2015 |
| CN | 104533797 | 4/2015 |
| CN | 104712288 | 6/2015 |
| CN | 104727799 | 6/2015 |
| CN | 105041288 | 11/2015 |
| CN | 105445440 | 3/2016 |
| CN | 105567213 | 5/2016 |
| CN | 105693947 | 6/2016 |
| CN | 105131934 | 12/2018 |
| EP | 0247669 | 12/1987 |
| EP | 0278540 | 8/1988 |
| EP | 0306546 | 3/1989 |
| EP | 0460927 | 12/1991 |
| EP | 0805260 | 11/1997 |
| EP | 02480625 | 4/2013 |
| EP | 02480626 | 4/2013 |
| EP | 03527830 | 8/2019 |
| FR | 2920435 | 8/2007 |
| GB | 670206 | 4/1952 |
| GB | 2063840 | 6/1981 |
| GB | 2163790 | 3/1986 |
| GB | 2161269 | 8/1988 |
| GB | 2332223 | 6/1999 |
| JP | 2014196444 | 10/2014 |
| JP | 2020534460 | 11/2020 |
| RU | 2076204 | 3/1997 |
| WO | WO 1997028098 | 8/1997 |
| WO | WO 1999027256 | 6/1999 |
| WO | WO 2000040667 | 7/2000 |
| WO | WO 2000060379 | 10/2000 |
| WO | WO 2001094749 | 12/2001 |
| WO | WO 2002064702 | 8/2002 |
| WO | WO 2003025340 | 3/2003 |
| WO | WO 2004005435 | 1/2004 |
| WO | WO 2004061046 | 7/2004 |
| WO | WO 2005080012 | 9/2005 |
| WO | WO 2006108161 | 10/2006 |
| WO | WO 2016108161 | 10/2006 |
| WO | WO 2008001218 | 1/2008 |
| WO | WO 2008018966 | 2/2008 |
| WO | WO 2008035253 | 3/2008 |
| WO | WO 2010026553 | 3/2010 |
| WO | WO 2010041025 | 4/2010 |
| WO | WO 2010138914 | 12/2010 |
| WO | WO 2011035292 | 3/2011 |
| WO | WO 2011035294 | 3/2011 |
| WO | WO 2011133620 | 10/2011 |
| WO | WO 2012051647 | 4/2012 |
| WO | WO 2012057910 | 5/2012 |
| WO | WO 2012087887 | 6/2012 |
| WO | WO 2012087898 | 6/2012 |
| WO | WO 2012088476 | 6/2012 |
| WO | WO 2012104582 | 8/2012 |
| WO | WO 2012122505 | 9/2012 |
| WO | WO 2012171857 | 12/2012 |
| WO | WO 2013041633 | 3/2013 |
| WO | WO 2013052359 | 4/2013 |
| WO | WO 2013112114 | 8/2013 |
| WO | WO 2013149122 | 10/2013 |
| WO | WO 2013154926 | 10/2013 |
| WO | WO 2013155061 | 10/2013 |
| WO | WO 2014008496 | 1/2014 |
| WO | WO 2014008598 | 1/2014 |
| WO | WO 2014116305 | 7/2014 |
| WO | WO 2014123672 | 8/2014 |
| WO | WO 2014178504 | 11/2014 |
| WO | WO 2014190226 | 11/2014 |
| WO | WO 2014200611 | 12/2014 |
| WO | WO 2015012818 | 1/2015 |
| WO | WO 2015034478 | 3/2015 |
| WO | WO 2015041664 | 3/2015 |
| WO | WO 2015041669 | 3/2015 |
| WO | WO 2015071750 | 5/2015 |
| WO | WO 2015097116 | 7/2015 |
| WO | WO 2015103096 | 7/2015 |
| WO | WO 2015113302 | 8/2015 |
| WO | WO 2015126082 | 8/2015 |
| WO | WO 2015163858 | 10/2015 |
| WO | WO 2015181028 | 12/2015 |
| WO | WO 2015200060 | 12/2015 |
| WO | WO 2016032578 | 3/2016 |
| WO | WO 2016077671 | 5/2016 |
| WO | WO 2016089813 | 6/2016 |
| WO | WO 2016094153 | 6/2016 |
| WO | WO 2016160016 | 10/2016 |
| WO | WO 2016163983 | 10/2016 |
| WO | WO 2016182553 | 11/2016 |
| WO | WO 2017035371 | 3/2017 |
| WO | WO 2017040553 | 3/2017 |
| WO | WO 2017040824 | 3/2017 |
| WO | WO 2017040834 | 3/2017 |
| WO | WO 2017049039 | 3/2017 |
| WO | WO 2017065331 | 4/2017 |
| WO | WO 2017078674 | 5/2017 |
| WO | WO 2017086975 | 5/2017 |
| WO | WO 2017096055 | 6/2017 |
| WO | WO 2017106513 | 6/2017 |
| WO | WO 2017136641 | 8/2017 |
| WO | WO 2017161157 | 9/2017 |
| WO | WO 2018017482 | 1/2018 |
| WO | WO 2018025010 | 2/2018 |
| WO | WO 2018045290 | 3/2018 |
| WO | WO 2018081477 | 5/2018 |
| WO | WO 2018118024 | 6/2018 |
| WO | WO 2018170065 | 9/2018 |
| WO | WO 2018187565 | 10/2018 |
| WO | WO 2019140058 | 7/2019 |
| WO | WO 2020106272 | 5/2020 |

OTHER PUBLICATIONS

U.S. Appl. No. 63/160,244, filed Mar. 12, 2021.
U.S. Appl. No. 15/243,312, Chen, filed Aug. 22, 2016.
U.S. Appl. No. 17/394,547, Schipper, filed Aug. 5, 2021.
U.S. Appl. No. 17/452,913, Shanmugam, filed Oct. 29, 2021.
U.S. Appl. No. 63/160,244, Cairns, filed Mar. 12, 2021.
"Hydraulic Fracturing Fluid Product Component Information Disclosure," Jan. 2012, 2 pages.
Abad et al., "Evaluation of the Material Properties of the Multilayered Oxides formed on HCM12A using New and Novel Techniques,"

(56) References Cited

OTHER PUBLICATIONS

Manuscript Draft, Manuscript No. OXID-D-15-00019, 2015, 44 pages.
Abass et al., "Wellbore Instability of Shale Formation, Zuluf Field, Saudi Arabia," Society of Petroleum Engineers (SPE), presented at the SPE Technical Symposium on Saudi Arabia Section, Dhahran, Saudi Arabia, May 21-23, 2006, 10 pages.
Abdelmalek et al., "Gas permeability measurements from pressure pulse decay laboratory data using pseudo-pressure and pseudo-time transformations." Journal of Petroleum Exploration and Production Technology 8.3, Jul. 2017, 839-847, 9 pages.
Abousleiman et al., "A Micromechanically Consistent Poroviscoelasticity Theory for Rock Mechanics Applications," Int. J. Rock Mech. Min. Sci. & Geomech. Abstr., 1993, 30:7 (1177-1180), 4 pages.
Abousleiman et al., "Anisotropic Porothermoelastic Solution and Hydro-Thermal Effects on Fracture Width in Hydraulic Fracturing," International Journal for Numerical and Analytical Methods in Geomechanics, 2013, 25 pages.
Abousleiman et al., "GeoGenome Industry Consortium (G2IC)," JIP, 2004-2006, 6 pages.
Abousleiman et al., "Geomechanics Field and Laboratory Characterization of Woodford Shale: The Next Gas Play," SPE 110120, Society of Petroleum Engineers (SPE), presented at the 2007 SPE Annual Technical Conference and Exhibition on Nov. 11-14, 2007, 14 pages.
Abousleiman et al., "GeoMechanics Field Characterization of the Two Prolific U.S. Mid-West Gas Plays with Advanced Wire-Line Logging Tools," SPE 124428, Society of Petroleum Engineers (SPE), presented at the 2009 SPE Annual Technical Conference and Exhibition, Oct. 4-7, 2009, 19 pages.
Abousleiman et al., "Geomechanics Field Characterization of Woodford Shale and Barnett Shale with Advanced Logging Tools and Nano-indentation on Drill Cuttings," The Leading Edge, Special Section: Borehole Geophysics, Jun. 2010, 6 pages.
Abousleiman et al., "Mandel's Problem Revisited," Geotechnique, 1996, 46:2 (187-195), 9 pages.
Abousleiman et al., "Mechanical Characterization of Small Shale Samples subjected to Fluid Exposure using the Inclined Direct Shear Testing Device," International Journal of Rock Mechanics and Mining Sciences, 2010, 47:3 (355-367), 13 pages.
Abousleiman et al., "Modeling Real-Time Wellbore Stability within the Theory of Poromechanics," AADE-03-NTCE-11, American Association of Drilling Engineers (AADE), presented at the AADE 2003 National Technology Conference, Practical Solutions for Drilling Challenges, Texas, Apr. 1-3, 2003, 14 pages.
Abousleiman et al., "Poroelastic Solutions in Transversely Isotropic Media for Wellbore and Cylinder," Int. J. Solids Structures, 1998, 35:34-35 (4905-4929), 25 pages.
Abousleiman et al., "Poromechanics response of an inclined borehole subject to in-situ stress and finite length fluid discharge," Journal of Mechanics of Materials and Structures, Apr. 2010, 5(1):47-66.
Abousleiman et al., "Poroviscoelastic Analysis of Borehole and Cylinder Problems," ACTA Mechanica, 1996, 119: 199-219, 21 pages.
Abousleiman et al., "The Granular and Polymer Nature of Kerogen Rich Shale," Acta Geotechnica 2016, 11:3 (573-594), 24 pages.
Abousleiman et al., "Time-Dependent wellbore (in)stability predictions: theory and case study," IADC/SPE 62796, International Association of Drilling Contractors (IADC), Society of Petroleum Engineers (SPE), presented at the 2000 IADC/SPE Asia Pacific Drilling Technology held in Kuala Lumur, Malaysia, Sep. 11-13, 2000, 8 pages.
Agenet et al., "Fluorescent Nanobeads: a First Step Toward Intelligent Water Tracers," SPE 157019, Society of Petroleum Engineers (SPE), SPE International Oilfield Nanotechnology Conference, Jun. 12-14, 2012, 13 pages.
Agilent Technologies, "Field-Deployable Solution for Nanoporosity Measurements in Mud Logging Operations and a Novel Method for Fracability Analysis Using Mud Cuttings," Gulf Coast Conference, Agilent Restricted, Oct. 2013, 44 pages.

Ahmed et al., "7.2.2 Information Required to Move to a Pilot Project," Unconventional Resources Exploitation and Development, 2016, 1 page.
Alda, "Laser and Gaussian Beam Propagation and Transformation," Encyclopedia of Optical Engineering, Marcel Dekker, Inc., 2003, 15 pages.
Alduailej et al., "CO 2 Emulsified Fracturing Fluid for Unconventional Applications," SPE-177405, Society of Petroleum Engineers, Abu Dhabi International Petroleum Exhibition and Conference held in Abu Dhabi, UAE, Nov. 9-12, 2015, 12 pages.
Al-Ghamdi et al., "Impact of Acid Additives on the Rheological Properties of Viscoelastic Surfactants and Their Influence on Field Application" SPE-89418-MS, Society of Petroleum Engineers, Presented at the SPE/DOE Symposium on Improved Oil Recovery, Tulsa, Apr. 17-21, 2004, 13 pages.
Alharbi, "Experimental Evaluation of the Effect of Carbonate Heterogeneity on Oil Recovery to Water and Gas Injections," University of Calgary, Sep. 9, 2013, 258 pages.
Allan et al., "A Multiscale Methodology for the Analysis of Velocity Anisotropy in Organic-Rich Shale," Geophysics, Jul.-Aug. 2015, 80:4 (C73-C88), 16 pages.
Alleman et al., "The Development and Successful Field Use of Viscoelastic Surfactant-based Diverting Agents for Acid Stimulation" SPE-80222-MS, Society of Petroleum Engineers, Presented at the International Symposium on Oilfield Chemistry, Houston, Feb. 5-7, 2004, 10 pages.
Al-Muntasheri, "A Critical Review of Hydraulic-Fracturing Fluids for Moderate- to Ultralow-Permeability Formations Over the Last Decade," SPE-169552-PA, Society of Petroleum Engineers, SPE Prod & Oper 29, Nov. 2014, (4):243-260, 18 pages.
Al-Munthasheri, "A Critical Review of Hydraulic Fracturing Fluids over the Last Decade," SPE 169552, Society of Petroleum Engineers (SPE), presented at the SPE Western North American and Rocky Mountain Joint Regional Meeting, Apr. 16-18, 2014, 25 pages.
Alnoaimi and Kovscek, "Experimental and Numerical Analysis of Gas Transport in Shale including the Role of Sorption," SPE-166375, Society of Petroleum Engineers (SPE), presented at the SPE Annual Technical Conference and Exhibition, Sep. 30-Oct. 2, 2013, 16 pages.
Althaus et al., "Permeability Estimation of a Middle-East Tight Gas Sand with NMR Logs," URTec: 2669857, Unconventional Resources Technology Conference (URTeC), proceedings of the 5th Unconventional Resources Technology Conference, Jul. 24, 2017, 7 pages.
Altowairqi, "Shale elastic property relationships as a function of total organic carbon content using synthetic samples," Journal of Petroleum Science and Engineering, Sep. 2015, 133: 392-400, 9 pages.
Al-Yami et al., "Engineered Fit-for-Purpose Cement System to Withstand Life-of-the-Well Pressure and Temperature Cycling," SPE-188488-MS, Society of Petroleum Engineers (SPE), presented at the Abu Dhabi International Petroleum Exhibition & Conference, Nov. 2017, 14 pages.
Amabeoku et al., "Calibration of Permeability Derived from NMR Lobs in Carbonate Reservoirs," SPE 68085, Society of Petroleum Engineers (SPE), presented at the 2001 SPE Middle East Oil Show, Mar. 17-20, 2001, 11 pages.
An et al., "A new study of magnetic nanoparticle transport and quantifying magnetization analysis in fractured shale reservoir using numerical modeling," Journal of Natural Gas Science and Engineering, 28:502-521, Jan. 2016, 21 pages.
Ananthan et al., "Influence of Strain Softening on the Fracture of Plain Concrete Beams," International Journal of Fracture, 1990, 45: 195-219, 25 pages.
Anisimov, "The Use of Tracers for Reservoir Characterization," SPE 118862, Society of Petroleum Engineers (SPE), presented at SPE Middle East Oil and Gas Show and Conference, Mar. 15-18, 2009, 8 pages.
APMonitor.com [online], "Proportional integral derivative (PID)," Sep. 2020, retrieved Oct. 13, 2021 from URL<https://apmonitor.com/pdc/index.php/Main/ProportionalIntegralDerivative>, 3 pages.
Arias et al., "New Viscoelastic Surfactant Fracturing Fluids Now Compatible with CO2 Drastically Improve Gas Production in

(56) References Cited

OTHER PUBLICATIONS

Rockies," SPE-111431-MS, Presented at the SPE International Symposium and Exhibition on Formation Damage Control, Lafayette, Louisiana, Feb. 13-15, 2008, 5 pages.
Arns et al., "Computation of linear elastic properties from microtomographic images: Methodology and agreement between theory and experiment," Geophysics, Sep. 1, 2002, 67:5 (1396-1405), 10 pages.
Aslan et al., "Fluorescent Core-Shell AG@$SiO_2$ Nanocomposites for Metal-Enhanced Fluorescence and Single Nanoparticle Sensing Platforms," American Chemical Society (ACS), J. Am. Chem. Soc., JACS Communications, Jan. 19, 2007, 129: 1524-1525, 2 pages.
Atarita et al., "Predicting Distribution of Total Organic Carbon (TOC) and S2 with Δ Log Resistivity and Acoustic Impedance Inversion on Talang Akar Formation, Cipunegara Sub Basin, West Java," Procedia Engineering, 2017, 170: 390-397, 8 pages.
Ballice, "Solvent Swelling Studies of Goynuk (Kerogen Type-I) and Beypazari Oil Shales (Kerogen Type-II)," Science Direct, 2003, Fuel 82: 1317-1321, 5 pages.
Bandyopadhyay et al., "Effect of Silica Colloids on the Rheology of Viscoelastic Gels Formed by the Surfactant Cetyl Trimethylammonium Tosylate," J. Colloid Interf. Sci., 2005, 283(2):585-591, 7 pages.
Barati and Liang, "A Review of Fracturing Fluid Systems Used for Hydraulic Fracturing of Oil and Gas Wells," Journal of Applied Polymer Science, Aug. 15, 2014, 131:16, 11 pages.
Barenblatt et al., "Basic Concepts in the Theory of Seepage of Homogeneous Liquids in Fissured Rocks (Strata)," PMM 1960, 24:5 (852-864), 18 pages.
Barree et al., "Realistic Assessment of Proppant Pack Conductivity for Material Selection," Presented at the Annual Technical Conference, Denver, Colorado, SPE-84306-MS, Oct. 5-8, 2003, 12 pages.
Barton et al., "In-situ stress orientation and magnitude at the Fenton Geothermal Site, New Mexico, determined from wellbore breakouts," Geophysical Research Letters, May 1988, 15(5):467-470.
Basu et al., "Best Practices for Shale Core Handling: Transportation, Sampling and Storage for Conduction of Analyses," Journal of Marine Science and Engineering, Feb. 2020, 8(2):136, 17 pages.
Batarseh et al., "Well Perforation using High Power Laser," SPE 84418, SPE Annual Technical Conference and Exhibition, in Denver, Colorado, Oct. 5-8, 2003, 10 pages.
Bazant et al., "Deformation of Progressively Cracking Reinforced Concrete Beams," ACI Materials Journal, Technical Paper, Title No. 81-26, May-Jun. 1984, 81:3, 11 pages.
Bazant et al., "Size Effect in Brazilian Split-Cylinder Tests: Measurements and Fracture Analysis," ACI Materials Journal, Technical Paper, Title No. 88-M40, May 31, 1991, 88:3 (325-332), 8 pages.
Bazant et al., "Strain-Softening Bar and Beam: Exact Non-Local Solution," Int. J. Solids Structures, 1988, 24:7 (659-673), 15 pages.
Bell et al., "Strong Lewis Acid-Lewis Base Interactions between Supercritical Carbon Dioxide and Carboxylic Acids: Effects on Self-Association," Industrial & Engineering Chemistry Research, Sep. 2003, 42(25):6280-6289.
Bell, "Perforating Underbalance—Evolving Techniques," SPE 13413, Distinguished Author Series, Journal of Petroleum Technology, 36:10, Oct. 1984, 14 pages.
Bennett et al., "Instrumented Nanoindentation and 3D Mechanistic Modeling of a Shale at Multiple Scales," Acta Geotechnica, 10:21, Jan. 9, 2015, 14 pages.
Berger et al., "Effect of eccentricity, voids, cement channels, and pore pressure decline on collapse resistance of casing," SPE-90045-MS, Society of Petroleum Engineers (SPE), presented at the SPE Annual Technical Conference and Exhibition, Jan. 2004, 8 pages.
Bernheim-Groswasser et al., "Micellar Growth, Network Formation, and Criticality in Aqueous Solutions of the Nonionic Surfactant C12E5," Langmuir, Apr. 2000, 16(9):4131-4140, 10 pages.
Berryman, "Extension of Poroelastic Analysis to Double-Porosity Materials: New Technique in Microgeomechanics," Journal of Engineering Mechanics, 128:8 (840), Aug. 2002, 8 pages.

Bhandari et al., "Permeability Behavior and the Effective Stress Law for a Partially Fractured Eagle Ford Shale Sample," Poromechanics VI. 2017, 3 pages.
Bhandari et al., "Two-Dimensional DEM Analysis of Behavior of Geogrid-Reinforced Uniform Granular Bases under a Vertical Cyclic Load," Acta Geotechnica, Research Paper, 2015, 10: 469-480, 12 pages.
Biot et al., "Temperature analysis in hydraulic fracturing," Journal of Petroleum Technology, 39:11, Nov. 1987, 9 pages.
Biot, "General Theory of Three-Dimensional Consolidation," the Ernest Kempton Adams Fund for Physical Research of Columbia University, Reprint Series, Journal of Applied Physics, 12:2 (155-164), Feb. 1941, 11 pages.
Bisnovat et al., "Mechanical and petrophysical behavior of organic-rich chalk from the Judea Plains, Israel," Marine and Petroleum Geology, 64: 152-164, Jun. 2015, 13 pages.
Blanz et al., "Nuclear Magnetic Resonance Logging While Drilling (NMR-LWD): From an Experiment to a Day-to-Day Service for the Oil Industry," Diffusion Fundamentals, 2010, 14(2), 5 pages.
Bobko et al., "The Nanogranular Origin of Friction and Cohesion in Shale—A Strength Homogenization Approach to Interpretation of Nanoindentation Results," International Journal for Numerical and Analytical Methods in Geomechanics, 2010, 23 pages.
Boskey et al., "Perspective—Collagen and Bone Strength," Journal of Bone and Mineral Research, 14:3, Nov. 3, 1999, 6 pages.
Bourbie and Walls, "Pulse decay permeability: analytical solution and experimental test," SPE Journal, 22:5, Oct. 1982, 11 pages.
Bourbie and Zinszner, "Hydraulic and Acoustic Properties as a Function of Porosity in Fontainebleau Sandstone," Journal of Geophysical Research, 90(B13):11,524-11,532, Nov. 1985, 9 pages.
Brace et al., "Permeability of granite under high pressure," Journal of Geophysics Res. 73:6, Mar. 15, 1968, 12 pages.
Bratton et al., "The Nature of Naturally Fractured Reservoirs," Oilfield Review, Jun. 2006, 21 pages.
Brezovski and Cui, "Laboratory permeability measurements of unconventional reservoirs: useless or full of information? A montney example from the western Canadian sedimentary basin," Society of Petroleum Engineers, presented at the SPE Unconventional Resources Conference and Exhibition-Asia Pacific, Nov. 11-13, 2013, 12 pages.
Bristow et al, "Solubility Analysis of Drug Compounds in Supercritical Carbon Dioxide Using Static and Dynamic Extraction Systems," Industrial & Engineering Chemistry Research, Mar. 2001, 40(7):1732-1739.
Brochard et al., "Fracture Properties of Kerogen and Importance for Organic-Rich Shales," Annual World Conference on Carbon (Carbon 2013), Jul. 2013, 5 pages.
Brown et al., "Use of a Viscoelastic Carrier Fluid in Frack-Pack Applications," SPE-31114-MS, Society of Petroleum Engineers, Presented at the SPE Formation Damage Control Symposium, Lafayette, Louisiana, Feb. 14-15, 1996, 10 pages.
Bunzil et al., "Taking Advantage of Luminescent Lanthanide Ions," Chemical Society Reviews (CSR), Critical Review, 34: 1048-1077, Dec. 2005, 30 pages.
Bustos et al., "Case Study: Application of a Viscoelastic Surfactant-Based CO2 Compatible Fracturing Fluid in the Frontier Formation, Big Horn Basin, Wyoming," SPE-107966-MS, Society of Petroleum Engineers, Presented at the Rocky Mountain Oil & Gas Technology Symposium, Denver, Apr. 16-18, 2007, 11 pages.
Caenn et al., "Chapter 9: Wellbore Stability," p. 359, in Composition and Properties of Drilling and Completion Fluids, 7th Edition: Gulf Professional Publishing, 2016, 1 page.
Cahill et al., "Nanoscale Thermal Transport II," Applied Physics Reviews 1.1:011305, 2014, 46 pages.
Cahill et al., "Nanoscale Thermal Transport," Journal of Applied Physics 93:2, Jan. 15, 2003, 28 pages.
California Council on Science and Technology Lawrence Berkeley National Laboratory Pacific Institute, "Advanced Well Stimulation Technologies in California: An Independent Review of Scientific and Technical Information," CCST, Jul. 2016, 400 pages.
Carcione and Avseth, "Rock-physics templates for clay-rich source rocks," Geophysics 80:5 (D481-D500), Sep. 2015, 21 pages.

(56) References Cited

OTHER PUBLICATIONS

Carcione et al., "Theory of borehole stability when drilling through salt formations," Geophysics, 71:3, May-Jun. 2006, 17 pages.

Carter and Hanson, "Fake Moon Dirt, HOOD Solar System Science," UT Dallas Magazine, 6:2, Spring 2016, 1 page.

Cates, "Nonlinear Viscoelasticity of Wormlike Micelles (and Other Reversibly Breakable Polymers)," J. Phys. Chem., 1990, 94(1):371-375, 5 pages.

Cates, "Statics and Dynamics of Worm-Like Surfactant Micelles," J. Phys-Condens., 1990, Mat. 2(33):6869-6892, 25 pages.

Chang et al., "A Novel Self-Diverting-Acid Developed for Matrix Stimulation of Carbonate Reservoirs," SPE-65033-MS, Society of Petroleum Engineers, Presented at the SPE International Symposium on Oilfield Chemistry, Houston, Feb. 13-16, 2001, 6 pages.

Chang et al., "Experience in Acid Diversion in High Permeability Deep Water Formations Using Visco-Elastic-Surfactant," SPE-68919-MS, Society of Petroleum Engineers, Presented at the SPE European Formation Damage Conference, the Hague, the Netherlands, 21-22 May 21-22, 2001, 5 pages.

Chang et al., "Magnetic SERS Composite Nanoparticles for Microfluidic Detection," abstract to 251st ACE National Meeting, Mar. 13-17, 2016, 1 page (abstract).

Chang, "In-Situ Formation of Proppant and Highly Permeable Blocks for Hydraulic Fracturing," SPE-173328-MS, Society of Petroleum Engineers (SPE), SPE Hydraulic Fracturing Technology Conference Feb. 3-5, 2015, 11 pages.

Chatterji et al., "Applications of Water-Soluble Polymers in the Oil Field," SPE-9288-PA, J Pet Technol, Nov. 1981, 33(11): 2042-2056,.

Chen et al., "Assessing Tensile Strength of Unconventional Tight Rocks Using Microwaving," URTec: 2154488, Unconventional Resources Technology Conference (URTeC), presented at the Unconventional Resources Technology Conference, Jul. 20-22, 2015, San Antonio, Texas, USA, 12 pages.

Chen et al., "Dependence of gas shale fracture permeability on effective stress and reservoir pressure: Model match and insights," Fuel, 2015, 139:383-392.

Chen et al., "Fracturing Tight Rocks by Elevated Pore-Water Pressure Using Microwaving and its Applications," SPWLA 56th Annual Logging Symposium, Jul. 18-22, 2015, Long Beach, California, USA, 13 pages.

Chen et al., "Novel CO2-Emulsified Viscoelastic Surfactant Fracturing Fluid System," SPE-94603-MS, Society of Petroleum Engineers, Presented at the SPE European Formation Damage Conference, Scheveningen, the Netherlands, May 25-27, 2005, 6 pages.

Chen et al., "Optimization of NMR Permeability Transform and Application to Middle East Tight Sands," Society of Petrophysicists and Well-Log Analysts, SPWLA 58th Annual Logging Symposium, Jun. 17-21, 2017, 11 pages.

Chen et al., "Size Effect in Micro-Scale Cantilever Beam Bending," Acta Mech., 219: 291-307, 2011, 17 pages.

Chen et al., "Three-dimensional analytical poromechanical solutions for an arbitrarily inclined borehole subjected to fluid injection," Proceedings of the Royal Society A: Mathematical, Physical and Engineering Sciences, Jan. 2019, 475(2221):20180658.

Chen et al., "FITC functionalized magnetic core-shell $Fe_3O_4/Ag$ hybrid nanoparticle for selective determination of molecular biothiols," Sensors and Actuators B: Chemical, 193: 857-863, Dec. 2013, 7 pages.

Cheng et al., "Cotton aerogels and cotton-cellulose aerogels from environmental waste for oil spillage cleanup," Materials & Design, Elsevier, May 28, 2017, 130:452-458, 7 pages.

Chern et al., "Deformation of Progressively Cracking Partially Prestressed Concrete Beams," PCI Journal, 37:1 (74-84), 1992, 11 pages.

Cheshomi et al., "Determination of uniaxial compressive strength of microcystalline limestone using single particles load test," Journal of Petroleum Science and Engineering, 111: 121-126, 2013, 6 pages.

Chevalier et al., "Micellar Properties of Zwitterionic Phosphobetaine Amphiphiles in Aqueous Solution: Influence of the Intercharge Distance," Colloid Polym. Sci., 1988, 266(5):441-448, 8 pages.

Chevalier et al., "Structure of Zwitterionic Surfactant Micelles: Micellar Size and Intermicellar Interactions," J. Phys. Chem., Jun. 1992, 96(21):8614-8619, 6 pages.

Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.

Chuanliang et al., "Wellbore stability analysis and its application in the Fergana basin, central Asia." Journal of Geophysics and Engineering 11.1, Feb. 2014, 9 pages.

Chupin et al., "Finite Strain Analysis of Nonuniform Deformation Inside Shear Bands in Sands," International Journal for Numerical and Analytical Methods in Geomechanics, 36: 1651-1666, 2012, 16 pages.

Civan, et al., "Comparison of shale permeability to gas determined by pressure-pulse transmission testing of core plugs and crushed samples," Unconventional Resources Technology Conference, Jul. 2015.

Clarkson et al., "Use of pressure- and rate-transient techniques for analyzing core permeability tests for unconventional reservoirs: Part 2," SPE Unconventional Resources Conference, Nov. 2013.

Clough et al., "Characterization of Kerogen and Source Rock Maturation Using Solid-State NMR Spectroscopy," Energy & Fuels, 2015, 29(10): 6370-6382, 42 pages.

Cooper et al., "The effect of cracks on the thermal expansion of rocks," Earth and Planetary Science Letters, Oct. 1, 1977, 36(3):404-12, 9 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Couillet et al., "Synergistic Effects in Aqueous Solutions of Mixed Wormlike Micelles and Hydrophobically Modified Polymers," Macromolecules, American Chemical Society, 2005, 38(12):5271-5282, 12 pages.

Crews et al., "Internal Breakers for Viscoelastic Surfactant Fracturing Fluids," SPE-106216-MS, Society of Petroleum Engineers (SPE), Presented at the International Symposium on Oilfield Chemistry, Houston, Feb. 28-Mar. 2, 2007, 8 pages.

Crews et al., "Internal Phase Breaker Technology for Viscoelastic Surfactant Gelled Fluids," SPE-93449-MS, Society of Petroleum Engineers (SPE), Presented at the SPE International Symposium on Oilfield Chemistry, Houston, 2-4 Feb. 2-4, 2005, 11 pages.

Crews et al., "New Remediation Technology Enables Removal of Residual Polymer in Hydraulic Fractures," SPE-135199-MS, Society of Petroleum Engineers (SPE), Presented at the SPE Annual Technical Conference and Exhibition, Florence, Italy, Sep. 19-22, 2010.

Crews et al., "New Technology Improves Performance of Viscoelastic Surfactant Fluids" SPE-103118-PA, Society of Petroleum Engineers (SPE), SPE Drill & Compl, SPE Annual Technical Conference and Exhibition, San Antonio, Texas, Sep. 24-27, 2008, 23(1):41-47, 7 pages.

Crews et al., "Performance Enhancements of Viscoelastic Surfactant Stimulation Fluids with Nanoparticles," SPE-113533-MS, Society of Petroleum Engineers (SPE), Presented at the Europec/EAGE Annual Conference and Exhibition, Rome, Jun. 9-12, 2008, 10 pages.

Crews et al., "The Future of Fracturing-Fluid Technology and Rates of Hydrocarbon Recovery," SPE-115475-MS, Society of Petroleum Engineers (SPE), Presented at the SPE Annual Technical Conference and Exhibition, Denver, Sep. 21-24, 2008, 13 pages.

Cronin, "Core-scale heterogeneity and dual-permeability pore structures in the Barnett Shale," Thesis for Degree of Master of Science in Geological Sciences at the University of Texas at Austin, Dec. 2014, 174 pages.

Cubillos et al., "The Value of Inter-well and Single Well Tracer Technology for De-Risking and Optimizing a CEOR Process—

(56) References Cited

OTHER PUBLICATIONS

Caracara Field Case," SPE 174394-MS, Society of Petroleum Engineers (SPE), presented at EUROPEC 2015, Jun. 1-4, 2015, 19 pages.

Cui et al., "Measurements of gas permeability and diffusivity of tight reservoir rocks: different approaches and their applications," Geofluids, 9:3, Aug. 2009, presented at the AAPG Convention, Jun. 7-10, 2009, 18 pages.

Cui et al., "Poroelastic solution for an inclined borehole," Transactions of the ASME, Journal of Applied Mechanics, 64, Mar. 1997, 7 pages.

Custelcean et al., "Aqueous Sulfate Separation by Crystallization of Sulfate-Water Clusters," Angewandte Chemie, International Edition, 2015, 54: 10525-10529, 5 pages.

Dagan, "Models of Groundwater Flow in Statistically Homogeneous Porous Formations," Water Resource Search 15:1, Feb. 1979, 17 pages.

Dall'Acqua et al., "Burst and collapse responses of production casing in thermal applications." SPE Drilling & Completion 28.01, Mar. 2013, 93-104, 12 pages.

Daneshy, "Hydraulic Fracturing to Improve Production," Tech 101, the Way Ahead, 6:3, Oct. 2010, 4 pages.

Daniel et al., "New Visco-Elastic Surfactant Formulations Extend Simultaneous Gravel-Packing and Cake-Cleanup Technique to Higher-Pressure and Higher-Temperature Horizontal Open-Hole Completions: Laboratory Development and a Field Case History From the North Sea," SPE-73770-MS, Society of Petroleum Engineers, Presented at the SPE International Symposium and Exhibition on Formation Damage, Lafayette, Louisiana, Feb. 20-21, 2002, 10 pages.

Darabi et al., "Gas flow in ultra-tight shale strata," Journal of Fluid Mechanics, 710, Nov. 10, 2012, 20 pages.

Das et al., "Molecular Fluorescence, Phosphorescence, and Chemiluminescence Spectrometry," American Chemical Society Publications (ACS), Analytical Chemistry, 84: 597-625, Nov. 3, 2011, 29 pages.

De Block et al., "A New Solution for the Characterization of Unconventional Shale Resources Based on Analysis or Drill Cutting," SPE-177601-MS, Society of Petroleum Engineers (SPE), presented at the Abu Dhabi International Petroleum Exhibition and Conference, Nov. 9-12, 2015, 6 pages.

De Rocha et al., "Concentrated CO2-in-Water Emulsions with Nonionic Polymeric Surfactants," Journal of Colloid and Interface Science, 2001, 239:1 (241-253), 13 pages.

Deans, "Using Chemical Tracers to Measure Fractional Flow and Saturation In-Situ," SPE 7076, Society of Petroleum Engineers (SPE) of AIME, presented at Fifth Symposium on Improved Methods for Oil Recovery of the Society of Petroleum Engineers of AIME, Apr. 16-19, 1978, 10 pages.

Deirieh et al., "Nanochemomechanical Assessment of Shale: A Coupled WDS-Indentation Analysis," Acta Geotechnica, Research Paper, Sep. 2012, 25 pages.

Delafargue and Ulm, "Explicit approximations of the indentation modulus of elastically orthotropic solids for conical indenters," International Journal of Solids and Structures 41:26 (7351-7360), Dec. 2004, 10 pages.

Detournay and Cheng, "Poroelastic Response of a Borehole in a Non-Hydrostatic Stress Field," International Journal of Rock Mechanics, Min. Science and Geomech. Abstracts, 25:3, 1988, 12 pages.

Devarapalli et al., "Micro-CT and FIB-SEM imaging and pour structure characterization of dolomite rock at multiple scales," Arabian Journal of Geosciences 10:361, Aug. 2017, 9 pages.

Di Lullo et al., "Toward Zero Damage: New Fluid Points the Way," SPE-69453-MS, Society of Petroleum Engineers, Presented at the SPE Latin American and Caribbean Petroleum Engineering Conference, Buenos Aires, Argentina, Mar. 25-28, 2001, 8 pages.

Dicker and Smits, "A practical approach for determining permeability from laboratory pressure-pulse decay measurements," SPE-17578, Society of Petroleum Engineers (SPE), presented at the SPE international Meeting on Petroleum Engineering, Nov. 1-4, 1988, 8 pages.

Dobroskok et al., "Estimating Maximum Horizontal Stress from Multi-Arm Caliper Data in Vertical Wells in Oman," Abu Dhabi International Petroleum Exhibition & Conference, Nov. 2016.

Dong et al., "A comparative experimental study of shale indentation fragmentation mechanism at the macroscale and mesoscale," Advances in Mechanical Engineering, Aug. 2017, 9(8): 1-11, 11 pages.

Dou et al., "Effect of joint parameters on fracturing behavior of shale in notched three-point-bending test based on discrete element model." Engineering Fracture Mechanics 205 Nov. 2019, 40-56, 17 pages.

Drdlova et al., "Effect of Nanoparticle Modification on Static and Dynamic Behavior of Foam Based Blast Energy Absorbers," Cellular Polymers, 35:3, May 2016, 16 pages.

Dreiss, "Wormlike Micelles: Where Do We Stand? Recent Developments, Linear Rheology, and Scattering Techniques," The Royal Society of Chemistry, Soft Matter, 2007, 3(8):956-970, 15 pages.

Dropek et al., "Pressure-temperature creep testing as applied to a commercial rock salt," Union Carbide, Office of Waste Isolation, prepared for the U.S. Energy Research and Development Administration, Jun. 1976, 54 pages.

Du et al., "Interwell Tracer Tests: Lessons Learned from past Field Studies," SPE 93140, Society of Petroleum Engineers (SPE), presented at SPE Asia Pacific Oil and Gas Conference and Exhibition, Apr. 5-7, 2005, 9 pages.

Ducros, "Source Rocks of the Middle East," Source Rock Kinetics: Goal and Perspectives. AAPG Geosciences Technology Workshop, Jul. 2016, 30 pages.

Dvorkin, "Kozeny-Carman Equation Revisited," 2009, 16 pages.

Eastoe et al., "Water-in-CO2 Microemulsions Studied by Small-Angle Neutron Scattering," Langmuir 1997, 13:26 (6980-6984), 5 pages.

Economides et al., Reservoir Stimulation, 2nd ed., Prentice Hall, Englewood Cliffs, New Jersey, 1989, 408 pages.

Egermann et al., "A fast and direct method of permeability measurements on drill cuttings," Society of Petroleum Engineers (SPE), SPE Reservoir Evaluation and Engineering, 8:4, Aug. 2005, 7 pages.

Ehlig-Economides and Economides, "Water as Proppant," SPE-147603, Society of Petroleum Engineers (SPE), presented at the SPE Annual Technical Conference and Exhibition, Oct. 30-Nov. 2, 2011, 8 pages.

Ekbote et al., "Porochemoelastic Solution for an Inclined Borehole in a Transversely Isotropic Formation," Journal of Engineering Mechanics, ASCE, Jul. 2006, 10 pages.

El-Aneed et al., "Mass Spectrometry, Review of the Basics: Electrospray, MALDI, and Commonly Used Mass Analyzers," Applied Spectroscopy Reviews 44:3 (210-230), Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Eliyahu et al., "Mechanical Properties of organic matter in shales mapped at the nanometer scale," Marine and Petroleum Geology, 59:294-304, Sep. 18, 2014, 11 pages.

Elsemongy et al., "Thermodynamics of Hydrochloric Acid in Ethylene Glycol + Water Mixtures from Electromotive Force Measurements," Chemistry Department, Faculty of Science, Mansoura University, Egypt, Feb. 1982, 129(2): 185-196, 12 pages.

Ertas et al., "Petroleum Expulsion Part 1. Theory of Kerogen Swelling in Multicomponent Solvents," Energy & Fuels, 20: 295-300, 2006, 6 pages.

Eseme et al., "Review of mechanical properties of oil shales: implications for exploitation and basin modeling," Oil Shale 24:2 (159-174), Jan. 2007, 16 pages.

Esfahani et al., "Quantitative nanoscale mapping of three-phase thermal conductivities in filled skutterudites via scanning thermal microscopy," Nature Science Review 5:1, Feb. 2017, 31 pages.

Ewy, "Shale Swelling/Shrinkage and Water Content Change due to Imposed Suction and Due to Direct Brine Contact," Acta Geotechnica, 9: 869-886, 2014, 18 pages.

(56) References Cited

OTHER PUBLICATIONS

Ewy, "Wellbore-Stability Predictions by Use of a Modified Lade Criterion," SPE Drill and Completion, 14:2, Jun. 1999, 7 pages.
Fakoya et al., "Rheological Properties of Surfactant-Based and Polymeric Nano-Fluids," SPE-163921-MS, Society of Petroleum Engineers, Presented at the SPE/ICoTA Coiled Tubing and Well Intervention Conference and Exhibition, the Woodlands, Texas, Mar. 26-27, 2013, 17 pages.
Fatahi, "Simulation of Shale Mechanical Properties in PFC2d and Calibration of Them Against Lab Results for Tensile, Uni-axial and Confined Compression Tests," Society of Petroleum Engineers, Oct. 2014, 1-12.
fekete.com [online], "Dual Porosity," retrieved from URL <www.fekete.com/SAN/WebHelp/FeketeHarmony/Harmony_WebHelp/Content/HTML_Files/Reference_Material/General_Concepts/Dual_Porosity.htm>, available on or before 2014, retrieved on Nov. 11, 2019, 6 pages.
Finney, "Random packings and the structure of simple liquids I. The geometry of random close packing," Proc. Roy. Soc. Lond. 319, 479-493, May 1970, 15 pages.
Finsterle and Persoff, "Determining permeability of tight rock samples using inverse modeling," Water Resources Research, 33:8, Aug. 1997, 9 pages.
Fjaer et al., "Stresses around Boreholes. Borehole Failure Criteria," in Petroleum Related Rock Mechanics, 2nd Edition, 2008, 156, 1 page.
Fontana et al., "Successful Application of a High Temperature Viscoelastic Surfactant (VES) Fracturing Fluids Under Extreme Conditions in Patagonian Wells, San Jorge Basin," SPE-107277-MS, Society of Petroleum Engineers, Presented at the EUROPEC/EAGE Annual Conference and Exhibition, London, Jun. 11-14, 2007, 15 pages.
Forni et al., "Conditioning Pre-existing Old Vertical Wells to Stimulate and Test Vaca Muerta Shale Productivity through the Application of Pinpoint Completion Techniques," SPE-172724-MS, Society of Petroleum Engineers (SPE), presented at the SPE Middle East Oil and Gas Show, Mar. 8-11, 2015, 28 pages.
Frazer et al., "Localized Mechanical Property Assessment of SiC/SiC Composite Materials," Science Direct, Composites: Part A, 70: 93-101, 2015, 9 pages.
Fredd et al., "Polymer-Free Fracturing Fluid Exhibits Improved Cleanup for Unconventional Natural Gas Well Applications" SPE-91433-MS, Society of Petroleum Engineers, Presented at the SPE Eastern Regional Meeting, Charleston, West Virginia, Sep. 15-17, 2004, 15 pages.
Funkhouser and Norman, "Synthetic Polymer Fracturing Fluid for High-Temperature Application," International Symposium on Oilfield Chemistry, Society of Petroleum Engineers, SPE 80236, Feb. 5-7, 2003, 6 pages.
Gahan et al., "Determination of Energy Required to Remove Rock," SPE 71466, presented at the 2001 SPE Annual Technical Conference and Exhibition, in New Orleans, Louisiana, Sep. 30-Oct. 3, 2001, 11 pages.
Gaillard et al., "Novel Associative Acrylamide-based Polymers for Proppant Transport in Hydraulic Fracturing Fluids", SPE 164072, Society of Petroleum Engineers (SPE), SPE International Symposium on Oilfield Chemistry, Apr. 8-10, 2013, 11 pages.
Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.
Gandossi and Estorff, "An overview of hydraulic fracturing and other formation stimulation technologies for shale gas production," JRC Science for Policy Report, European Commission, EUR 26347 EN, Jan. 2013, 62 pages.
Ganesh et al., "A Generalized Thermal Modeling for Laser Drilling Process—I. Mathematical Modeling and Numerical Methodology," International Journal of Heat and Mass Transfer, vol. 40, Issue 14, Sep. 1997, 10 pages.
Ganjdanesh et al., "Treatment of Condensate and Water Blocks in Hydraulic-Fractured Shale-Gas/Condensate Reservoirs," SPE-175145, Society of Petroleum Engineers (SPE), presented at the SPE Annual Technical Conference and Exhibition, Sep. 28-30, 2015, SPE Journal, Apr. 2016, 10 pages.
Gao et al., "Materials Become Insensitive to Flaws at Nanoscale: Lessons from Nature," PNAS, 100:10, May 13, 2003, 4 pages.
Gardiner et al., "Chapter 1: Introduction to Raman Scattering," in Practical Raman Spectroscopy, Springer-Verlag, 1989, 9 pages.
Garnero, "The Contribution of Collagen Crosslinks to Bone Strength," Int. Bone & Mineral Society, BoneKEy Reports 1:182, Sep. 2012, 8 pages.
George et al., "Approximate relationship between frequency-dependent skin depth resolved from geoelectronnagnetic pedotransfer function and depth of investigation resolved from geoelectrical measurements: A case study of coastal formation, southern Nigeria," Journal of Earth Syst. Sci, 125:7 (1379-1390), Oct. 2016, 12 pages.
Georgi et al., "Physics and Chemistry in Nanoscale Rocks," Society of Petroleum Engineers (SPE), SPE Forum Series, Frontiers of Technology, Mar. 22-26, 2015, 4 pages.
Gholami et al., "A methodology for wellbore stability analysis of drilling into presalt formations: A case study from southern Iran." Journal of Petroleum Science and Engineering 167, Aug. 2018, 249-261, 28 pages.
Gillard et al., "A New Approach to Generating Fracture Conductivity," presented at the SPE Annual Technical Conference and Exhibition held in Florence, Italy, SPE-135034-MS, Sep. 20-22, 2010, 14 pages.
Glossary.oilfield.slb.com [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.
Glover et al., "The Use of Measurements Made on Drill Cuttings to Construct and Apply Geomechanical Well Profiles," ARMA 16-0737, American Rock Mechanics Association (ARMA), presentation at the 50th US Rock Mechanics/Geomechanics Symposium, Jun. 26-29, 2016, 11 pages.
Godbole et al., "Axial Thrust in Centrifugal Pumps—Experimental Analysis," Paper Ref: 2977, 15th International Conference on Experimental Mechanics, Jul. 22-27, 2012, 14 pages.
Godwin et al., "Simultaneous Gravel Packing and Filter-Cake Cleanup with Shunt Tubes in Openhole Completions: A Case History From the Gulf of Mexico," SPE-78806, Society of Petroleum Engineers, SPE Drill & Compl, Sep. 2002, 17(3):174-178, 5 pages.
Golomb et al., "Macroemulsion of liquid and supercritical CO2-in-water and water-in-liquid CO2 stabilized with fine particles," American Chemical Society (ACS), Ind. Eng. Chem. Res. 2006, 45:8 (2728-2733), 6 pages.
Gomaa et al., "Acid Fracturing: The Effect of Formation Strength on Fracture Conductivity," Paper SPE 119623 presented at the SPE Hydraulic Fracturing Technology Conference, Jan. 2009, 18 pages.
Gomaa et al., "Computational Fluid Dynamics Applied to Investigate Development and Optimization of Highly Conductive Channels within the Fracture Geometry," presented at the SPE Hydraulic Fracturing Technology Conference, Texas, SPE-179143-MS, Feb. 9-11, 2016, 18 pages.
Gomaa et al., "Improving Fracture Conductivity by Developing and Optimizing a Channels Within the Fracture Geometry: CFD Study," SPE-178982-MS, Society of Petroleum Engineers (SPE), presented at the SPE International conference on Formation Damage Control in Layfayette, Feb. 24-26, 2016, 25 pages.
Gomaa et al., "New Insights Into the Viscosity of Polymer-Based In-Situ-Gelled Acids," SPE-121728-PA, Society of Petroleum Engineers (SPE), SPE Prod & Oper, Aug. 2010, 25(3):367-375, 9 pages.
Gomaa et al., "Viscoelastic Behavior and Proppant Transport Properties of a New Associative Polymer-Based Fracturing Fluid," SPE-168113-MS, Society of Petroleum Engineers, Presented at the SPE International Symposium and Exhibition on Formation Damage Control, Lafayette, Louisiana, Feb. 26-28, 2014, 17 pages.
Gomaa et al., "Viscoelastic Behavior and Proppant Transport Properties of a New High-Temperature Viscoelastic Surfactant-Based

(56) References Cited

OTHER PUBLICATIONS

Fracturing Fluid," SPE-173745-MS, Society of Petroleum Engineers (SPE), Presented at the SPE International Symposium on Oilfield Chemistry, the Woodlands, Texas, Apr. 13-15, 2015, 25 pages.

Gomaa et al., "Viscoelastic Evaluation of a Surfactant Gel for Hydraulic Fracturing," SPE-143450-MS, Society of Petroleum Engineers (SPE), Presented at the SPE European Formation Damage Conference, Noordwijk, the Netherlands, Jun. 7-10, 2011, 18 pages.

Goodman, "Chapter 3: Rock Strength and Failure Criteria," in Introduction to Rock Mechanics, John Wiley & Sons, 1989, 21 pages.

Graves and O'Brien, "StarWars Laser Technology Applied to Drilling and Completing Gas Wells," SPE 49259, SPE Annual Technical Conference and Exhibition, Society of Petroleum Engineers, Sep. 27-30, 1998, 10 pages.

Gravsholt, "Viscoelasticity in Highly Dilute Aqueous Solutions of Pure Cationic Detergents," Journal of Colloid and Interface Science, Dec. 1976, 57(3):575-577, 3 pages.

Greenwood et al., "Evaluation and Application of Real-Time Image and Caliper Data as Part of a Wellbore Stability Monitoring Provision," OADCS Conference, Feb. 2006.

Gregorowicz et al., "Solubilities of Lactic Acid and 2-Hydroxyhexanoic Acid in Supercritical CO2," Fluid Phase Equilibria, Dec. 1999, 166(1):39-46.

Gu and Mohanty, "Effect of Foam Quality on Effectiveness of Hydraulic Fracturing in Shales," International Journal of Rock Mechanics and Mining Sciences, 70: 273-285, 2014, 13 pages.

Guan et al., "Effect of Acetic Acid+acetonitrile and Ethanol+acetonitrile Mixed Cosolvents on the Solubility of Stearic Acid in Supercritical CO2," Fluid Phase Equilibria, Aug. 1998, 149(1-2):277-286.

Gupta and Carman, "Fracturing Fluid for Extreme Temperature Conditions is Just as Easy as the Rest," SPE Hydraulic Fracturing Technology Conference, Society of Petroleum Engineers, SPE 140176-MS, Jan. 24-26, 2011, 5 pages.

Gupta et al., "Frac-Fluid Recycling and Water Conservation: A Case History," SPE-119478-PA, Society of Petroleum Engineers (SPE), SPE Prod & Oper, Feb. 2010, 25(1):65-69, 5 pages.

Gupta et al., "Surfactant Gel Foam/Emulsion: History and Field Application in the Western Canadian Sedimentary Basin," SPE-97211-MS, Society of Petroleum Engineers, Presented at the SPE Annual Technical Conference and Exhibition, Dallas, Oct. 9-12, 2005, 7 pages.

Gupta et al., "Unconventional Fracturing Fluids for Tight Gas Reservoirs," SPE-119424-MS, Society of Petroleum Engineers, Presented at the SPE Hydraulic Fracturing Technology Conference, the Woodlands, Texas, Jan. 19-21, 2009, 9 pages.

Gurav et al., "Silica Aerogel: Synthesis and Applications," Journal of Nanomaterials, Hindawi Publishing Corporation, 2010:409310, Jan. 1, 2010, 11 pages.

Gurluk et al., "Enhancing the Performance of Viscoelastic Surfactant Fluids Using Nanoparticles," SPE-164900-MS, Society of Petroleum Engineers, Presented at the EAGE Annual Conference and Exhibition, London, Jun. 10-13, 2013, 15 pages.

Haimson et al., "Initiation and extension of hydraulic fractures in rocks," Society of Petroleum Engineers Journal, Sep. 1967, 7(03):310-318.

Halleck and Behrmann, "Penetration of Shaped Charges in Stressed Rock," the 31st US Symposium on Rock Mechanics (USRMS), American Rock Mechanics Association, Jun. 18-20, 1990, 8 pages.

Hamley, "Introduction to Soft Matter: Synthetic and Biological Self-Assembling Materials," Hoboken, New Jersey: John Wiley & Sons, 2007.

Han et al., "Impact of Depletion on Integrity of Sand Screen in Depleted Unconsolidated Sandstone Formation," ARMA-2015-301, in 49th US Rock Mechanics/Geomechanics Symposium. American Rock Mechanics Association, 2015, 9 pages.

Han et al., "LBM-DEM modeling of fluid-solid interaction in porous media," International Journal for Numerical and Analytical Methods in Geomechanics 37.10, Jul. 2013, 1391-1407, 17 pages.

Han et al., "Numerical and Experimental Studies of Kerogen Rich Shales on Millimeter-Scale Single-Edge Notched Beam," ARMA-19-211, American Rock Mechanics Association (ARMA), prepared for presentation at the 53rd US Rock Mechanics and Geomechanics Symposium in New York, Jun. 23-26, 2019, 8 pages.

Han et al., "Numerical Modeling of Elastic Spherical Contact for Mohr-Coulomb Type Failures in Micro-Geomaterials," Experimental Mechanics, 57: 1091-1105, Jun. 16, 2017, 15 pages.

Han et al., "Numerical Modeling of Thermal-Mechanical Interaction Process in Laser Heating," SPE 183836-MS, presented at the SPE Middle East Oil and Gas Show and Conference, in Manama, Kingdom of Bahrain, Mar. 6-9, 2017, 12 pages.

Han et al., "Research on the mechanical behaviour of shale based on multiscale analysis," R. Soc. Open Sci., Oct. 2018, 5: 181039, 17 pages.

Han et al., "Application of Silver-Coated Magnetic Microspheres to a SERS-Based Optofluidic Sensor," American Chemical Society Publications (ACS), the Journal of Physical Chemistry C (JPCC), 115: 6290-6296, Mar. 7, 2011, 7 pages.

Harrison et al., "Water-in-Carbon Dioxide Microemulsions with a Fluorocarbon-Hydrocarbon Hybrid Surfactant," Langmuir 1994, 10:10 (3536-3541), 6 pages.

He et al., "Hydrolysis Effect on the Properties of a New Class of Viscoelastic Surfactant-Based Acid and Damage Caused by the Hydrolysis Products," SPE-165161-MS, Society of Petroleum Engineers, Presented at the SPE European Formation Damage Conference & Exhibition, Noordwijk, the Netherlands, Jun. 5-7, 2013, 17 pages.

Helgeson et al., "Formation and Rheology of Viscoelastic "Double Networks" in Wormlike Micelle-Nanoparticle Mixtures," American Chemical Society, Langmuir, 2010, 26(11):8049-8060, 12 pages.

Heller et al., "Experimental investigation of matric permeability of gas shale," AAPG Bulletin, vol. 98, No. 5, May 2014, 21 pages.

Hiramatsu and Oka, "Stress around a shaft or level excavated in ground with a three-dimensional stress state," Mem. Fra. Eng. Kyotu Univ. 24, 1962, 2 pages (Abstract).

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, 112: 044907, Aug. 30, 2012, 16 pages.

Hoek and Brown, "Empirical Strength Criterion for Rock Masses," Journal of the Geotechnical Engineering Division, Sep. 1980, 20 pages.

Hornby et al., "Anisotropic Effective-Medium Modeling of the Elastic Properties of Shales," Geophysics, 59:10 (1570-1583), Oct. 1994, 14 pages.

Hosemann et al., "An Exploratory Study to Determine Applicability of Nano-Hardness and Micro-compression Measurements for Yield Stress Estimation," Science Direct, Journal of Nuclear Materials, 375: 135-143, 2008, 9 pages.

Hosemann et al., "Mechanical Characteristics of SiC Coating Layer in TRISO Fuel Particles," Journal of Nuclear Materials, 442: 133-142, 2013, 10 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, 4:7204, Nov. 27, 2014, 10 pages.

Huang et al., "A theoretical study of the critical external pressure for casing collapse" Journal of Natural Gas Science and Engineering, Nov. 2015, 27(1), 8 pages.

Huang et al., "Collapse strength analysis of casing design using finite element method," International Journal of Pressure Vessels and Piping 2000, 77:359-367, 8 pages.

Huang et al., "Do Viscoelastic-Surfactant Diverting Fluids for Acid Treatments Need Internal Breakers?" SPE-112484-MS, Society of Petroleum Engineers (SPE), presented at the SPE International Symposium and Exhibition on Formation Damage Control, Lafayette, Louisiana, Feb. 13-15, 2008, 8 pages.

(56) References Cited

OTHER PUBLICATIONS

Huang et al., "Field Case Study on Formation Fines Control with Nanoparticles in Offshore Wells," SPE-135088-MS, Society of Petroleum Engineers (SPE), presented at the SPE Annual Technical Conference and Exhibition, Florence, Italy, Sep. 19-22, 2010, 8 pages.

Huang et al., "Fluid-Loss Control Improves Performance of Viscoelastic Surfactant Fluids," SPE-106227-PA, Society of Petroleum Engineers (SPE), SPE Production and Operations, Feb. 2009, 24:1 (60-65), 6 pages.

Huang et al., "Improving Fracture Fluid Performance and Controlling Formation Fines Migration with the Same Agent: Is It Achievable?" IPTC-17044-MS, International Petroleum Technology Conference, Presented at the International Petroleum Technology Conference, Beijing, Mar. 26-28, 2013, 8 pages.

Huang et al., "Nanoparticle Pseudocrosslinked Micellar Fluids: Optimal Solution for Fluid-Loss Control With Internal Breaking," SPE-128067-MS, Society of Petroleum Engineers (SPE), presented at the SPE International Symposium and Exhibition on Formation Damage Control, Lafayette, Louisiana, Feb. 10-12, 2010, 8 pages.

Huang et al., "Nanotechnology Applications in Viscoelastic-Surfactant Stimulation Fluids," SPE-107728-PA, Society of Petroleum Engineers (SPE), SPE Production and Operations, Nov. 2008, 23:4 (512-517), 6 pages.

Hubbert et al., "Mechanics of hydraulic fracturing," Transactions of the AIME, Dec. 1957, 210(01):153-168.

Hull and Abousleiman, "Chapter 10: Insights of the Rev of Source Shale from Nano- and Micromechanics," in New Frontiers in Oil and Gas Exploration, Springer International Publishing Switzerland, 2016, 29 pages.

Hull et al., "Bromate Oxidation of Ammonium Salts: In Situ Acid Formation for Reservoir Stimulation," Inorganic Chemistry, 2019, 58, 3007-3014, 8 pages.

Hull et al., "Nanomechanical Characterization of the Tensile Modulus of Rupture of Kerogen-Rich Shale," SPE 177628, Society of Petroleum Engineers (SPE), presented at the Abu Dhabi International Petroleum Exhibition and Conference, Nov. 9-12, 2015, SPE Journal 2017, 22:4 (1024-1033), 10 pages.

Hull et al., "New Insights on the Mechanical Characterization of Kerogen-Rich Shale, KRS," SPE-177628-MS, Society of Petroleum Engineers (SPE), presented at the Abu Dhabi International Petroleum Exhibition and Conference held in Abu Dhabi, Nov. 9-12, 2015, UAE, 12 pages.

Hull et al., "Oxidative Kerogen Degradation: A Potential Approach to Hydraulic Fracturing in Unconventionals," Energy Fuels 2019, 33:6 (4758-4766), 9 pages.

Hull et al., "Recent Advances in Viscoelastic Surfactants for improved Production from Hydrocarbon Reservoirs," SPE 173776, Society of Petroleum Engineers (SPE), presented at the SPE International Symposium on Oilfield Chemistry, Apr. 13-15, 2015, SPE Journal, 2016, 18 pages.

Hunt et al., "Kinetics of the gelation of colloidal silica at geothermal conditions and implications for reservoir modification and management," SGP-TR-198, proceedings of the Thirty-Eighth Workshop on Geothermal Reservoir Engineering, Jan. 2013, 10 pages.

Huseby et al., "High Quality Flow Information from Tracer Data," SPE-169183-MS, Society of Petroleum Engineers (SPE), presented at the SPE Bergen One Day Seminar, Apr. 2, 2014, 9 pages.

Hutchins et al., "Aqueous Tracers for Oilfield Applications," SPE-21049, Society of Petroleum Engineers (SPE), presented at SPE International Symposium on Oilfield Chemistry, Feb. 20-22, 1991, 9 pages.

Imanishi et al., "Wormlike Micelles of Polyoxyethylene Alkyl Ether Mixtures C10E5 + C14E5 and C14E5 + C14E7: Hydrophobic and Hydrophilic Chain Length Dependence of the Micellar Characteristics," Journal of Physical Chemistry B, 2007, 111:1 (62-73), 12 pages.

Infante and Chenevert, "Stability of boreholes drilled through salt formations displaying plastic behaviour," SPE Drilling Engineering, 4:1, Mar. 1989, 9 pages.

Iqbal et al., "In situ micro-cantilver tests to study fracture properties of NiAl single crystals," Acta Materialia, 60(3):1193-1200, Feb. 2012, 8 pages.

Israelachvili et al., "Theory of Self-Assembly of Hydrocarbon Amphiphiles into Micelles and Bilayers," Journal of Chemical Society, Faraday Transactions, 1976, 2:72 (1525-1567), 44 pages.

Itasca, "Fast Lagrangian Analysis of Continua," Version 7.0. Minneapolis, Minnesota, 2011, 22 pages.

itascacg.com [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.

itascacg.com [online], "Three-dimensional Fast Lagrangian Analysis of Continua (FLAC3D)," available on or before 2012, [retrieved on Jun. 7, 2018], retrieved from URL: < https://www.itascacg.com/software/flac3d>, 4 pages.

Iyengar et al., "Analysis of Crack Propagation in Strain-Softening Beams," Engineering Fracture Mechanics 69: 761-778, 2002, 18 pages.

Jaeger et al., "Fundamentals of Rock Mechanics," 4th Edition, Wiley, 2007, 486 pages.

Jerath et al., "Improved assessment of in-situ fluid saturation with multi-dimensional NMR measurements and conventional well logs," SPWLA 53rd Annual Logging Symposium, Jun. 16-20, 2012, 16 pages.

Jerke et al., "Flexibility of Charged and Uncharged Polymer-Like Micelles," Langmuir 1998, 14:21 (6013-6024), 12 pages.

Jia et al., "Highly Efficient Extraction of Sulfate Ions with a Tripodal Hexaurea Receptor," Angew. Chem. Int. Ed., 2011, 50: 486-490, 5 pages.

Jianhong et al., "Estimation of the Tensile Elastic Modulus using Brazilian disc by Applying Diametrically Opposed Concentrated Loads," International Journal of Rock Mechanics & Mining Sciences 46:3 (568-576), 2009, 9 pages.

Jiantaol and Bingcheng, "Development of Silica Aerogel and Hollow Glass Microspheres Based Heat-Insulating Coatings," Paint & Coatings Industry, Jul. 1, 2013, 1 page, abstract only.

Jin et al., "Permeability Measurement of Organic-Rich Shale—Comparison of Various Unsteady-State Methods" SPE-175105-MS, Society of Petroleum Engineers, Sep. 2015, 14 pages.

Jin et al., "Solubilities of Benzoic Acid in Supercritical CO2 with Mixed Cosolvent," Fluid Phase Equilibria, Dec. 2004, 226:9-13.

Johnston et al., "Water-in-Carbon Dioxide Microemulsions: An Environment for Hydrophiles Including Proteins," Science, 271:5249 (624-626), Feb. 2, 1996, 3 pages.

Jones et al., "HF Etchant Solutions in Supercritical Carbon Dioxide for "Dry" Etch Processing of Microelectronic Devices," Chemistry of Materials, Jun. 2003, 15(15):2867-2869.

Jones, "A Technique for Faster Pulse-Decay Permeability Measurements in Tight Rocks," presented at the 1994 SPE Annual Technical Conference and Exhibition, Sep. 25-28, 1994, SPE Formation Evaluation, Mar. 1997, 7 pages.

Jose et al., "Continuous multi cycle nanoindentation studies on compositionally graded Ti1—xAlN multilayer thin films," Materials Science and Engineering A, 528:21 (6438-6444), Apr. 20, 2011, 7 pages.

Jun et al., "Multifunctional Silver-Embedded Magnetic Nanoparticles as SERS Nanoprobes and Their Applications," Nano Micro Small, Multifunctional Nanoparticles, 6:1 (119-125), Jan. 4, 2010, 7 pages.

Kang et al., "An experimental study on oxidizer treatment used to improve the seepage capacity of coal reservoirs," Natural Gas Industry B, 6: 129-137, Sep. 25, 2018, 9 pages.

Keivani et al., "Synergistic Toughening in Ternary Silica/Hallow Glass Spheres/Epoxy Nanocomposites," Polymer-Plastics Technology and Engineering, Dec. 10, 2014, 54:6 (581-593), 14 pages.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels 20: 310-308, 2006, 8 pages.

Kenyon, "Petrophysical Principles of Applications of NMR Logging," Society of Petrophyicists and Well-Log Analysts, 38:2, Mar. 1997, 23 pages.

(56) References Cited

OTHER PUBLICATIONS

Kern et al., "Propping Fractures with Aluminum Particles," Journal of Petroleum Technology, vol. 13, Issue 6, pp. 583-589, SPE-1573-G-PA, Jun. 1961, 7 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences, 76: 127-137, 2015, 11 pages.

King, "Thirty Years of Gas Shale Fracturing: What Have We Learned?" SPE-133456, Society of Petroleum Engineers (SPE), presented at the SPE Annual Technical Conference and Exhibition, Sep. 19-22, 2010, 50 pages.

Klapetek, "Chapter 11: Thermal Measurements," in Quantitative Data Processing in Scanning Probe Microscopy: SPM Applications for Nanometrology, 2018, 26 pages.

Kneipp et al., "Single Molecule Detection Using Surface-Enhanced Raman Scattering (SERS)," Physical Review Letters, American Physical Society 78:9, Mar. 3, 1997, 4 pages.

Kolymbas, "Kinematics of Shear Bands," Acta Geotechnica, 4: 315-318, 2009, 4 pages.

Kotai et al., "Beliefs and Facts in Permanganate Chemistry—An Overview on the Synthesis and the Reactivity of Simple and Complex Permanganates," Trends in Inorganic Chemistry, 2009, 11.

Kreh, "Viscoelastic Surfactant-Based Systems in the Niagaran Formation," SPE-125754-MS, Society of Petroleum Engineers (SPE), presented at the SPE Eastern Regional Meeting, Charleston, West Virginia, Sep. 23-25, 2009, 7 pages.

Kumar et al., "Nano to Macro Mechanical Characterization of Shale," SPE 159804, Society of Petroleum Engineers (SPE), presented at the SPE Annual Technical Conference and Exhibition, Oct. 8-10, 2012, 23 pages.

Kuperkar et al., "Viscoelastic Micellar Water/CTAB/NaNO3 Solutions: Rheology, SANS and Cryo-TEM Analysis," Journal of Colloid and Interface Science, 2008, 323:2 (403-409), 7 pages.

Lai et al., "Experimental Investigation on Brazilian Tensile Strength of Organic-rich Gas Shale," SPE-177644-MS, Society of Petroleum Engineers (SPE), presented at the Abu Dhabi International Petroleum Exhibition and Conference, Nov. 9-12, 2015, 24 pages.

Lam et al., "Experiments and Theory in Strain Gradient Elasticity," Journal of Mechanics and Physics of Solids, 51: 1477-1508, 2003, 32 pages.

Larsen et al., "Changes in the Cross-Link Density of Paris Basin Toarcian Kerogen During Maturation," Organic Geochemistry 33: 1143-1152, 2002, 10 pages.

Lee et al., "An Analytical Study on Casing Design for Stabilization of Geothermal Well," Korean J. Air-Conditioning and Ref. Eng., 2012, 11:24 (11), 16 pages (English Abstract).

Lee et al., "Water-in carbon dioxide emulsions: Formation and stability," Langmuir, 1999, 15:20 (6781-6791), 11 pages.

Leitzell, "Viscoelastic Surfactants: A New Horizon in Fracturing Fluids for Pennsylvania," SPE-111182-MS, Society of Petroleum Engineers (SPE), presented at the Eastern Regional Meeting, Lexington, Kentucky, Oct. 17-19, 2007, 6 pages.

Lewan, "Evaluation of petroleum generation by hydrous pyrolysis experimentation," Phil. Trans. R. Soc. Lond. A, 1985, 315: 123-134, 13 pages.

Lewan, "Experiments on the role of water in petroleum formation," Geochimica et Cosmochimica Acta, Pergamon, 1997, 61:17 (3691-3723), 33 pages.

Li et al., "A review of crosslinked fracturing fluids prepared with produced water," KeAi Advanced Research Evolving Science, Southwest Petroleum University, Petroleum 2, 2:4 (313-323), Dec. 2016, 11 pages.

Li et al., "Differentiating Open Natural Fractures from Healed Fractures Using the New, High-Definition Oil-Based Mud Microelectrical Imager-Case Studies from Organic Rich Shales," SPE-174923-MS, Society of Petroleum Engineers (SPE), presented at the SPE Annual Technical Conference and Exhibition, Sep. 28-30, 2015, 16 pages.

Li et al., "High-Temperature Fracturing Fluids Using Produced Water with Extremely High TDS and Hardness," IPTC-17797-MS, International Petroleum Technology Conference (IPTC), presented at the International Petroleum Technology Conference, Dec. 10-12, 2014, 13 pages.

Li et al., "Maximum Horizontal Stress and Wellbore Stability While Drilling: Modeling and Case Study," SPE Latin American & Caribbean Petroleum Engineering Conference, Dec. 2010.

Li et al., "Mechanical Characterization of Micro/Nanoscale Structures for MEMS/NEMS Applications using Nanoindentation Techniques," Science Direct, Ultramicroscopy, 97: 481-494, 2003, 14 pages.

Li et al., "The Brazilian Disc Test for Rock Mechanics Applications: Review and New Insights," Rock Mech Rock Eng, 2013, 46: 269-287, 19 pages.

Li et al., "Well Treatment Fluids Prepared With Oilfield Produced Water: Part II," SPE-133379-MS, Society of Petroleum Engineers (SPE), presented at the SPE Annual Technical Conference and Exhibition, Sep. 19-22, 2010, 7 pages.

Liang et al., "An Experimental Study on Interactions between Imbibed Fracturing Fluid and Organic-Rich Tight Carbonate Source Rocks" SPE-188338-MS, Paper presented at the Abu Dhabi International Petroleum Exhibition & Conference, Nov. 2017, 14 pages.

Liu and Abousleiman, "Multiporosity/Multipermeability Inclined-Wellbore Solutions with Mudcake Effects," Society of Petroleum Engineers (SPE), SPE Journal 23:5, Oct. 2018, 25 pages.

Liu and Abousleiman, "N-Porosity and N-Permeability generalized wellbore stability analytical solutions and applications," ARMA 16-417, America Rock Mechanics Association (ARMA), presented at the 50th US Rock Mechanics/Geomechanics Symposium held in Houston, Texas, Jun. 26-29, 2016, 10 pages.

Liu et al., "Applications of nano-indentation methods to estimate nanoscale mechanical properties of shale reservoir rocks," Journal of Natural Gas Science and Engineering, 35: 1310-1319, Sep. 29, 2016, 10 pages.

Liu et al., "Dimension effect on mechanical behavior of silicon micro-cantilver beams," Measurement, 41:8 (885-895), Oct. 2008, 11 pages.

Liu et al., "Elastic Constants Determination and Deformation Observation Using Brazilian Disk Geometry," Experimental Mechanics, 2010, 50: 1025-1039, 15 pages.

Liu et al., "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu et al., "Micro-cantilver Testing to Evaluate the Mechanical Properties of Thermal Barrier Coatings," presented at the 19th European Conference on Fracture (ECF19): Fracture Mechanics for Durability, Reliability and Safety, Conference Proceedings, Aug. 26-31, 2012, 7 pages.

Liu et al., "Microstructural and geomechanical analysis of Bakken shale at nanoscale," Journal of Petroleum Science and Engineering, 153: 138-144, Mar. 23, 2017, 12 pages.

Liu et al., "Numerical modelling of the heterogeneous rock fracture process using various test techniques." Rock mechanics and rock engineering 40.2, Jun. 2006, 107-144, 38 pages.

Liu et al., "Poroelastic Dual-Porosity/Dual-Permeability After-Closure Pressure-Curves Analysis in Hydraulic Fracturing," SPE 181748, Society of Petroleum Engineers (SPE), SPE Journal 2016, 21 pages.

Liu et al., "Safe Drilling in Chemically Active and Naturally Fractured Source Rocks: Analytical Solution and Case Study," IADC/SPE-189658-MS, Society of Petroleum Engineers (SPE), IADC, presented at the IADC/SPE Drilling Conference and Exhibition, Mar. 6-8, 2018, 13 pages.

Liu et al., "Graphene Lubricant," Applied Materials Today, 20, Sep. 2020, 100662, 31 pages.

Long et al., "Chapter 2: Advanced Well Stimulation Technologies," in an Independent Scientific Assessment of Well Stimulation in

(56) References Cited

OTHER PUBLICATIONS

California, vol. I, Well Stimulation Technologies and their Past, Present and Potential Future Use in California, Jan. 2015, 62 pages.
Low, "Advances in Ceramics Matrix Composites," Processing. Properties and applications of SiC1/SiC, 10-19, Nanoceramic Matric Composites, 30-41, 2014, 11 pages.
Low, "Ceramic-Matrix Composites: Microstructure, Properties and Applications," Woodhead Publishing Limited, 11-19, 30-40, 2006, 11 pages.
Lu et al., "Fabrication and characterization of ceramic coatings with alumina-silica sol-incorporated a-alumina powder coated on woven quartz fiber fabrics," Ceramics International 39:6 (6041-6050), Aug. 2013, 10 pages.
Lu et al., "Quantitative prediction of seismic rock physics of hybrid tight oil reservoirs of the Permian Lucaogou Formation, Junggar Basin, Northwest China," Journal of Asian Earth Sciences, 2019, 178: 216-223, 8 pages.
Luan et al., "Creation of synthetic samples for physical modelling of natural shale," European Association of Geoscientists and Engineers (EAGE), Geophysical Prospecting 64: 898-914, Jul. 2016, 17 pages.
Luffel et al., "Matrix permeability measurement of gas productive shales," SPE-26633-MS, Society of Petroleum Engineers (SPE), presented at the 66th Annual Technical Conference and Exhibition, Oct. 3-6, 1993, 10 pages.
Lungwitz et al., "Diversion and Cleanup Studies of Viscoelastic Surfactant-Based Self-Diverting Acid," SPE-86504-PA, Society of Petroleum Engineers (SPE), SPE Production and Operations, 2007, 22:1 (121-127), 7 pages.
Luo et al., "Rheological Behavior and Microstructure of an Anionic Surfactant Micelle Solution with Pyroelectric Nanoparticle," Colloid and Surface A: Physiochemical English Aspects, Feb. 5, 2012, 395: 267-275, 9 pages.
Lyngra et al., "Heavy Oil Characterization: Lessons Learned During Placement of a Horizontal Injector at a Tar/Oil Interface," SPE-172673-MS, Society of Petroleum Engineers (SPE), presented at the SPE Middle East Oil & Gas Show and Conference, Mar. 8-11, 2015, 20 pages.
Lynn et al., "A Core Based Comparison of the Reaction Characteristics of Emulsified and In-Situ Gelled Acids in Low Permeability, High Temperature, Gas Bearing Carbonates," SPE-65386-MS, Society of Petroleum Engineers (SPE), presented at the SPE International Symposium on Oilfield Chemistry, Houston, Feb. 13-16, 2001, 16 pages.
Magryta, "Effect of Aerogel on the Properties of Acrylonitrile-butadiene rubber (NBR) Vulcanizates," Polimer, 57:2, Feb. 1, 2012, 7 pages, English summary.
Mahabadi et al., "A novel approach for micro-scale characterization and modeling of geomaterials incorporating actual material heterogeneity," (XP002689941) Geophysical Research Letters 39:1 (L01303), Jan. 1, 2012, 6 pages.
Mahabadi et al., "Development of a new fully-parallel finite-discrete element code: Irazu," ARMA-2016-516, American Rock Mechanics Association (ARMA), presented at the 50th US Rock Mechanics/Geomechanics Symposium, Jun. 26-29, 2016, 9 pages.
Mahmoud et al., "Removal of Pyrite and Different Types of Iron Sulfide Scales in Oil and Gas Wells without H2S Generation," IPTC-18279-MS, International Petroleum Technology Conferences (IPTC), presented at the International Petroleum Technology Conference, Dec. 6-9, 2015, 8 pages.
Maia et al., "Triaxial creep tests in salt applied in drilling through thick salt layers in Campos basin-Brazil," SPE/IADC Drilling Conference. OnePetro, Feb. 2005, 9 pages.
Maio et al., "Measuring Fracture Toughness of Coatings using Focused-ion-beam-machined Microbeams," J. Mater. Res., 20:2, Feb. 2005, 4 pages.
Maleki et al., "An overview on silica aerogels synthesis and different mechanical reinforcing strategies," Journal of Non-Crystalline Solids, 385: 55-74, Feb. 1, 2014, 20 pages.

Mao et al., "Chemical and nanometer-scale structure of kerogen and its change during thermal maturation investigated by advanced solid-state 13C NMR spectroscopy," Geochimica et Cosmochimica Acta, 2010, 74(7): 2110-2127, 18 pages.
Marchetti et al., "Fluorous affinity chromatography for enrichment and determination of perfluoroalkyl substances," American Chemical Society (ACS), Annual Review of Analytical Chemistry 84: 7138-7145, Jul. 19, 2012, 8 pages.
MatWeb, "Chlorinated Polyethylene Data Sheet," 2021, 1 page.
Maurer, "Novel Drilling Techniques," New York: Pergamon Press, V114, 1968, 130 pages.
Maxwell, "Microseismic hydraulic fracture imaging: The path toward optimizing shale gas production," The Leading Edge, Special Section: Shales, Mar. 2011, 6 pages.
Mayerhofer et al., "Proppants? We Don't Need No Proppants", Presented at the SPE Annual Technical Conference and Exhibition, San Antonio TX; Society of Petroleum Engineers, Inc, pp. 457-464, Paper SPE-38611, Oct. 5, 1997, 8 pages.
McElfresh et al., "A Single Additive Non-Ionic System for Frac Packing Offers Operators a Small Equipment Footprint and High Compatibility with Brines and Crude Oils," SPE-82245-MS, Society of Petroleum Engineers (SPE), presented at the SPE European Formation Damage Conference, the Hague, the Netherlands, May 13-14, 2003, 11 pages.
McMahon et al., "First 100% Reuse of Bakken Produced Water in Hybrid Treatments Using Inexpensive Polysaccharide Gelling Agents," SPE-173783-MS, Apr. 2015, 9 pages.
Mehrabian and Abousleiman, "Generalized Biot's Theory an Mandel's Problem of Multiple Porosity and Multiple-Permeability Poroelasticity," American Geophysical Union (AGU), Journal of Geological Research: Solid Earth, 119:4 (2745-2763), 2014, 19 pages.
Mesa, "Spherical and rounded cone nano indenters," Micro Star Technologies Inc., available on or before Jan. 23, 2018, 24 pages.
metarocklab.com [online], "Pumps," 2019, retrieved Oct. 13, 2021 from URL<https://www.metarocklab.com/product-page/pressure-generators>, 2 pages.
Meyer et al., "Identification of Source Rocks on Wireline Logs by Density/Resistivity and Sonic Transit Time/Resistivity Crossplots," AAPG Bulletin, 1984, 68(2): 121-129, 9 pages.
Meyer et al., "Theoretical Foundation and Design Formulae for Channel and Pillar Type Propped Fractures—A Method to Increase Fracture Conductivity," presented at SPE Annual Technical Conference and Exhibition, Amsterdam, the Netherlands, SPE-170781-MS, Oct. 27-29, 2014, 25 pages.
Meyers et al., "Point load testing of drill cuttings from the determination of rock strength," ARMA-05-712, presented at the 40th U.S. Symposium on Rock Mechanics (USRMS), Alaska Rocks 2005, American Rock Mechanics Association, Jun. 25-29, 2005, 2 pages, (Abstract).
Middleton et al., "Shale gas and non-aqueous fracturing fluids: Opportunities and challenges for supercritical CO 2," Applied Energy, 147: 500-509, 2015, 10 pages.
Mitchell et al., "Chapter 7: Casing and Tubing Design," Properties of Casing and Tubing, Petroleum well construction, 1998, 40 pages.
Mohammed et al., "Casing structural integrity and failure modes in a range of well types—A review," Journal of Natural Gas Science and Engineering, 2019, 68: 102898, 25 pages.
Mohammed et al., "Successful Application of Foamed Viscoelastic Surfactant-Based Acid," SPE-95006-MS, Society of Petroleum Engineers (SPE), presented at the SPE European Formation Damage Conference, Sheveningen, the Netherlands, May 25-27, 2005, 7 pages.
Montgomery and Smith, "Hydraulic Fracturing: History of Enduring Technology," Journal of Petroleum Technology, Dec. 2010, 7 pages.
Montgomery, "Chapter 1: Fracturing Fluids," in Effective and Sustainable Hydraulic Fracturing, Intech, the proceedings of the International Conference for Effective and Sustainable Hydraulic Fracturing (HF2103) on May 20-22, 2013, 23 pages.
Montgomery, "Chapter 2: Fracturing Fluid Components," in Effective and Sustainable Hydraulic Fracturing, Intech, 2013, 21 pages.

(56) References Cited

OTHER PUBLICATIONS

Moyer, "A Case for Molecular Recognition in Nuclear Separations: Sulfate Separation from Nuclear Wastes," American Chemical Society (ACS), Inorganic Chemistry, 2012, 52: 3473-3490, 18 pages.

Moyner et al., "The Application of Flow Diagnostics for Reservoir Management," SPE 171557, Society of Petroleum Engineers (SPE), SPE Journal, Apr. 2015, 18 pages.

Mutua et al., "Surface Modification of Hollow Glass Microspheres," Materials Sciences and Applications, 3:856-860, Dec. 2012, 5 pages.

Nagarajan, "Molecular Packing Parameter and Surfactant Self-Assembly: The Neglected Role of the Surfactant Tail," Langmuir 2002, 18:1 (18-38), 8 pages.

Najm et al., "Comparison and Applications of Three Different Maximum Horizontal Stress Predictions," SPWLA 61st Annual Logging Symposium, Jun. 2020.

Nasr-El-Din et al., "Investigation and Field Evaluation of Foamed Viscoelastic Surfactant Diversion Fluid Applied During Coiled-Tubing Matrix-Acid Treatment," SPE-99651-MS, Society of Petroleum Engineers (SPE), presented at the SPE/ICOTA Coiled Tubing Conference & Exhibition, the Woodlands, Texas, Apr. 4-5, 2006, 14 pages.

Nasr-El-Din et al., "Lessons Learned and Guidelines for Matrix Acidizing With Viscoelastic Surfactant Diversion in Carbonate Formations," SPE-102468-MS, Society of Petroleum Engineers (SPE), presented at the SPE Annual Technical Conference and Exhibition, San Antonio, Texas, Sep. 24-27, 2006, 11 pages.

Nehmer, "Viscoelastic Gravel-Pack Carrier Fluid," SPE-17168-MS, Society of Petroleum Engineers (SPE), presented at the SPE Formation Damage Control Symposium, Bakersfield, California, Feb. 8-9, 1988, 10 pages.

Nettesheim et al., "Influence of Nanoparticle Addition on the Properties of Wormlike Micellar Solutions," Langmuir 2008, 24:15 (7718-7726), 9 pages.

Nguyen and Abousleiman, "Poromechanics Response of Inclined Wellbore Geometry in Chemically Active Fractured Porous Media," Journal of Engineering Mechanics, 135:11, Nov. 2005, 14 pages.

Ning et al., "The measurement of Matrix and Fracture Properties in Naturally Fractured Cores," SPE-25898, Society of Petroleum Engineers (SPE), presented at the SPE Rocky Mountain Regional/Low Permeability Reservoirs Symposium, Apr. 26-28, 1993, 15 pages.

Norman et al., "Temperature-Stable Acid-Gelling Polymers: Laboratory Evaluation and Field Results," SPE-10260-PA, J Pet Technol, Nov. 1984, 36(11): 2011-2018.

Nwonodi et al., "A Scheme for Estimating the Magnitude of the Maximum Horizontal Stress for Geomechanical Studies," Nigeria Annual International Conference and Exhibition, Aug. 2020.

Okiongbo et al., "Changes in Type II Kerogen Density as a Function of Maturity: Evidence from the Kimmeridge Clay Formation," Energy Fuels, 2005, 19: 2495-2499, 5 pages.

Oliver and Pharr, "An improved technique for determining hardness and elastic modulus using load and displacement sensing indentation experiments," Journal of Materials Research, 7:6, Jun. 1992, 20 pages.

Oliver and Pharr, "Measurement of hardness and elastic modulus by instrumented indentation: Advances in understanding and refinements to methodology," Journal of Materials Research, 19:1, Jan. 2004, 18 pages.

Ortega et al., "The Effect of Particle Shape and Grain-Scale Properties of Shale: A Micromechanics Approach," International Journal for Numerical and Analytical Methods in Geomechanics, 34: 1124-1156, 2010, 33 pages.

Ortega et al., "The Effect of the Nanogranular Nature of Shale on their Poroelastic Behavior," Acta Geotechnica, 2: 155-182, 2007, 28 pages.

Ortega et al., "The Nanogranular Acoustic Signature of Shale," Geophysics, 74:3 (D65-D84), May-Jun. 2009, 20 pages.

Osman and Pao, "Mud Weight Prediction for Offshore Drilling," 8 pages.

Ottesen, "Wellbore Stability in Fractured Rock," IADC/SPE 128728, International Association of Drilling Contractors (IADC), Society of Petroleum Engineers (SPE), presented at the 2010 IADC/SPE Drilling Conference and Exhibition, Louisiana, Feb. 2-4, 2010, 8 pages.

Pakdaman et al., "Experimental and numerical investigation into the methods of determination of mode I static fracture toughness of rocks." Theoretical and Applied Fracture Mechanics 100, Jan. 2019, 154-170, 17 pages.

Palisch et al., "Determining Realistic Fracture Conductivity and Understanding Its Impact on Well Performance—Theory and Field Examples," SPE-106301-MS, Society of Petroleum Engineers (SPE), presented at the SPE Hydraulic Fracturing Technology Conference, College Station, Texas, Jan. 29-31, 2007, 13 pages.

Pandey et al., "Fracture Stimulation Utilizing a Viscoelastic-Surfactant Based System in the Morrow Sands in Southeast New Mexico," SPE-102677-MS, Society of Petroleum Engineers (SPE), presented at the International Symposium on Oilfield Chemistry, Houston, Feb. 28-Mar. 2, 2007, 8 pages.

Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.

Parker et al., "Laser Drilling: Effects of Beam Application Methods of Improving Rock Removal," SPE 84353, Society of Petroleum Engineers (SPE), SPE Annual Technical Conference and Exhibition, Oct. 5-8, 2003, 7 pages.

paroscientific.com [online], "Overview & product selection guide," no date, retrieved Oct. 13, 2021 from URL<http://paroscientific.com/products.php>, 2 pages.

Passey et al., "From Oil-Prone Source Rock to Gas-Producing Shale Reservoir—Geologic and Petrophysical Characterization of Unconventional Shale-Gas Reservoirs," SPE 131350, Society of Petroleum Engineers (SPE), presented at the CPS/SPE International Oil & Gas Conference and Exhibition, Jun. 8-10, 2010, 29 pages.

Patel et al., "Analysis of US Hydraulic Fracturing Fluid System and Proppant Trends," SPE 168645, Society of Petroleum Engineers (SPE), presented at the SPE Hydraulic Fracturing Technology Conference, Feb. 4-6, 2014, 20 pages.

Petoud et al., "Brilliant SM, Eu, Tb, and Dy Chiral Lanthanide Complexes with Strong Circularly Polarized Luminescence," Journal for the American Chemical Society (JACS), 129: 77-83, Dec. 15, 2006, 7 pages.

petrowiki.org [online], "Fluid flow in naturally fractured reservoirs," retrieved from URL <https://petrowiki.org/Fluid_flow_in_naturally_fractured_reservoirs>, available on or before Jul. 16, 2015, retrieved on Nov. 11, 2019, 12 pages.

Podio et al., "Dynamic Properties of Dry and Water-Saturated Green River Shale under Stress," SPE 1825, Society of Petroleum Engineers (SPE), presented at the SPE 42nd Annual Fall Meeting, Oct. 1-4, 1967, Society of Petroleum Engineers Journal, Jun. 11, 1968, 16 pages.

Pojanavaraphan et al., "Solution Cross-Linked Natural Rubber (NR)/Clay Aerogel Composites," Macromolecules, Feb. 22, 2011, 44:4 (923-931), 9 pages.

Pollard et al., "Fundamentals of Structural Geology," Cambridge University Press, Sep. 1, 2005, 291, 3 pages.

Pollock and Hammiche, "Micro-thermal analysis: techniques and applications," Journal of Physics D: Applied Physics, 34.9 (R23-R53), 2001, 31 pages.

Poon et al., "An Analysis of Nanoindentation in Linearly Elastic Solids," International Journal of Solids and Structures, 45:24 (6018-6033), Dec. 1, 2008, 16 pages.

Qin et al., "Applicability of nonionic surfactant alkyl polyglucoside in preparation of liquid CO2 emulsion," Journal of CO2 Utilization, 2018, 26: 503-510, 8 pages.

Raghavan et al., "Highly Viscoelastic Wormlike Micellar Solutions Formed by Cationic Surfactants with Long Unsaturated Tails," Langmuir 2001, 17:2 (300-306), 7 pages.

Rajbanshi et al., "Sulfate Separation from Aqueous Alkaline Solutions by Selective Crystallization of Alkali Metal Coordination

(56) References Cited

OTHER PUBLICATIONS

Capsules," American Chemical Society Publications (ACS), Crystal Growth and Design, 2011, 11: 2702-2706, 5 pages.

Rawat et al., "Case Evaluating Acid Stimulated Multilayered Well Performance in Offshore Carbonate Reservoir: Bombay High," OTC-25018-MS, Offshore Technology Conference (OTC), presented at the Offshore Technology Conference-Asia, Kuala Lumpur, Mar. 25-28, 2014.

ResTech, "Development of laboratory and petrophysical techniques for evaluating shale reservoirs," GRI-95/0496, Gas Research Institute, Apr. 1996, 306 pages.

Ribeiro and Sharma, "Fluid Selection for Energized Fracture Treatments," SPE 163867, Society of Petroleum Engineers (SPE), presented at the SPE Hydraulic Fracturing Technology Conference, Feb. 4-6, 2013, 11 pages.

Richard et al., "Slow Relaxation and Compaction of Granular Systems," Nature Materials, 4, Feb. 2005, 8 pages.

Rodriguez et al., "Imagining techniques for analyzing shale pores and minerals," National Energy Technology Laboratory, Dec. 2, 2014, 44 pages.

Rostami et al., "DABCO tribromide immobilized on magnetic nanoparticle as a recyclable catalyst for the chemoselective oxidation of sulfide using H2O2 under metaland solvent-free condition," Catal. Commun. 2014, 43: 16-20, 20 pages.

Rotaru et al., "Performances of clay aerogel polymer composites for oil spill sorption: Experimental design and modeling," Separation and Purification Technology, Jul. 11, 2014, 133:260-275, 16 pages.

Rowan et al., "Dynamic Covalent Chemistry," Angewante Chemie International Edition, 41: 898-952, Mar. 15, 2002, 55 pages.

Rydzy et al., "Stressed Permeability in Shales: Effects of Matrix Compressibility and Fractures—A Step Towards Measuring Matrix Permeability in Fractured Shale Samples," SCA2016-027, presented at the International Symposium of the Society of Core Analysts held in Snowmass, Colorado, USA, Aug. 21-26, 2016, 12 pages.

Ryoo et al., "Water-in-Carbon Dioxide Microemulsions with Methylated Branched Hydrocarbon Surfactants," Industrial & Engineering Chemistry Research 2003, 42:25 (6348-6358), 11 pages.

Sagisaka et al., "Effect of Fluorocarbon and Hydrocarbon Chain Lengths in Hybrid Surfactants for Supercritical CO2," Langmuir 2015, 31:27 (7479-7487), 36 pages.

Sagisaka et al., "A New Class of Amphiphiles Designed for Use in Water-in-Supercritical CO2 Microemulsions," Langmuir 2016, 32:47 (12413-12422), 44 pages.

Sagisaka et al., "Nanostructures in Water-in-CO2 Microemulsions Stabilized by Double-Chain Fluorocarbon Solubilizers," Langmuir 2013, 29:25 (7618-7628), 11 pages.

Sagisaka et al., "Water-in-CO2 Microemulsions Stabilized by Fluorinated Cation-Anion Surfactant Pairs," Langmuir, Feb. 2019, 35(9):3445-3454.

Samuel et al., "A New Solids-Free Non-Damaging High Temperature Lost-Circulation Pill: Development and First Field Applications," SPE-81494-MS, Society of Petroleum Engineers (SPE), presented at the Middle East Oil Show, Bahrain, 9-12 Jun. 9-12, 2003, 12 pages.

Samuel et al., "Polymer-Free Fluid for Fracturing Applications," SPE-59478-PA, Society of Petroleum Engineers (SPE), SPE Drill & Compl 1999, 14:4 (240-246), 7 pages.

Samuel et al., "Polymer-Free Fluid for Hydraulic Fracturing," SPE-38622-MS, Society of Petroleum Engineers (SPE), presented at the SPE Annual Technical Conference and Exhibition, San Antonio, Texas, Oct. 5-8, 1997, 7 pages.

Samuel et al., "Viscoelastic Surfactant Fracturing Fluids: Application in Low Permeability Reservoirs," SPE-60322-MS, Society of Petroleum Engineers (SPE), presented at the SPE Rocky Mountain Regional/Low-Permeability Reservoirs Symposium and Exhibition, Denver, 12-15 Mar. 12-15, 2000, 7 pages.

Santarelli et al., "Drilling through Highly Fractured Formations: A Problem, a Model, and a Cure," Society of Petroleum Engineers (SPE), presented at the 67th Annual Technical Conference and Exhibition of the Society of Petroleum Engineers, Washington D.C., Oct. 4-7, 1992, 10 pages.

Sayed and Al-Muntasheri, "A Safer Generation of Wettability Alteration Chemical Treatments," SPE-184566-MS, Society of Petroleum Engineers (SPE), presented at the SPE International Conference on Oilfield Chemistry, Apr. 3-5, 2017, 25 pages.

Schubert et al., "The Microstructure and Rheology of Mixed Cationic/Anionic Wormlike Micelles," Langmuir 2003, 19:10 (4079-4089), 11 pages.

Selvin et al., "Principles and biophysical applications of lanthanide-based probes," Annual Review of Biophysics and Biomolecular Structure, Jun. 2002, 31:275-302, 28 pages.

Semmelbeck et al., "Novel CO2-Emulsified Viscoelastic Surfactant Fracturing Fluid System Enables Commercial Production from Bypassed Pay in the Olmos Formation of South Texas," SPE-100524-MS, Society of Petroleum Engineers (SPE), presented at the SPE Gas Technology Symposium, Calgary, May 15-17, 2006, 8 pages.

Sepulveda et al., "Oil-Based Foam and Proper Underbalanced-Drilling Practices Improve Drilling Efficiency in a Deep Gulf Coast Well," SPE 115536, Society of Petroleum Engineers (SPE), presented at the 2008 SPE Annual Technical Conference and Exhibition in Denver, Colorado, Sep. 21-24, 2008, 8 pages.

Serra, "No Pressure Transient Analysis Methods for Naturally Fractured Reservoirs," (includes associated papers 12940 and 13014), Journal of Petroleum Technology, Dec. 1983, 35:12, Society of Petroleum Engineers, 18 pages.

Serres-Piole et al., "Water tracers in oilfield applications: Guidelines," Elsevier Ltd., Journal of Science and Engineering, Nov. 2012, 98-99:22-39, 18 pages.

Shafer et al., "Protocols for Calibrating NMR Log-Derived Permeabilities," International Symposium of the Society of Core Analysts, Aug. 21, 2005, 15 pages.

Shahid et al., "Natural-fracture reactivation in shale gas reservoir and resulting microseismicity," SPE 178437, Society of Petroleum Engineers (SPE), Journal of Canadian Petroleum Technology, Nov. 2015, 54:06, 10 pages.

Shashkina et al., "Rheology of Viscoelastic Solutions of Cationic Surfactant. Effect of Added Associating Polymer," Langmuir 2005, 21:4 (1524-1530), 7 pages.

Shi et al., "Superhydrophobic silica aerogels reinforced with polyacrylonitrile fibers for adsorbing oil from water and oil mixtures," RSC Advances, Jan. 1, 2017, 7:7 (4039), 7 pages.

Shin et al., "Development and Testing of Microcompression for Post Irradiation Characterization of ODS Steels," Journal of Nuclear Materials, 2014, 444:43-48, 6 pages.

Shook et al., "Determining Reservoir Properties and Flood Performance from Tracer Test Analysis," SPE 124614, Society of Petroleum Engineers (SPE), presented at SPE Annual Technical Conference and Exhibition, Oct. 4-7, 2009, 19 pages.

Shukla et al., "Nanoindentation Studies on Shales," ARMA 13-578, American Rock Mechanics Association (ARMA), presented at the 47th US Rock Mechanics/Geomechanics Symposium, Jun. 23-26, 2013, 10 pages.

Siddig et al., "A review of different approaches for water-based drilling fluid filter cake removal," Journal of Petroleum Science and Engineering, Apr. 2020.

Sierra et al., "Woodford Shale Mechanical Properties and the Impacts of Lithofacies," ARMA 10-461, American Rock Mechanics Association (ARMA), presented at the 44th US Rock Mechanics Symposium and 5th US-Canada Rock Mechanics Symposium, Jun. 27-30, 2010, 10 pages.

Singh et al., "Facies classification based on seismic waveform," presented at the 5th Conference & Exposition on Petroleum Geophysics, Jan. 15-17, 2004, 456-462, 7 pages.

Siskin et al., "Reactivity of organic compounds in hot water: geochemical and technological implications," Science, Oct. 11, 1991, 254, 8 pages.

Slatt et al., "Merging Sequence Stratigraphy and Geomechanics for Unconventional Gas Shales," The Leading Edge, Special Section: Shales, Mar. 2011, 8 pages.

(56) References Cited

OTHER PUBLICATIONS

Slatt et al., "Outcrop/Behind Outcrop (Quarry), Multiscale Characterization of the Woodford Gas Shale," in Breyer, Shale Reservoirs—Giant Resources for the 21st Century: AAPG Memoir, 2011, 97: 1-21, 22 pages.
Sone et al., "Mechanical Properties of Shale-Gas Reservoir Rocks—Part 2: Ductile Creep, Brittle Strength, and Their Relation to the Elastic Modulus," Geophysics, Sep.-Oct. 2013, 78:5 (D393-D402), 10 pages.
Sone et al., "Mechanical Properties of Shale-Gas Reservoir Rocks—Part 1: Static and Dynamic Elastic Properties and Anisotropy," Geophysics, Sep.-Oct. 2013, 78:5 (D381-D392), 13 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 136: 6838-6841, 4 pages.
Soni, "LPG-Based Fracturing: An Alternative Fracturing Technique in Shale Reservoirs," IADC/SPE-170542-MS, Society of Petroleum Engineers (SPE), IADC/SPE Asia Pacific Drilling Technology Conference, Aug. 25-27, 2014, 7 pages.
Stewart et al., "Use of a Solids-Free Viscous Carrying Fluid in Fracturing Applications: An Economic and Productivity Comparison in Shallow Completions," SPE-30114-MS, Society of Petroleum Engineers (SPE), presented at the SPE European Formation Damage Control Conference, Hague, the Netherlands, May 15-16, 1994, 14 pages.
Stiles et al., "Surface-enhanced Raman Spectroscopy," Annual Review of Analytical Chemistry, Mar. 18, 2008, 1:601-26, 29 pages.
Sullivan et al., "Optimization of a Viscoelastic Surfactant (VES) Fracturing Fluid for Application in High-Permeability Formations," SPE-98338-MS, Society of Petroleum Engineers (SPE), presented at the SPE International Symposium and Exhibition on Formation Damage Control, Lafayette, Louisiana, Feb. 15-17, 2006, 8 pages.
Sulzer Technical Review, "Pushing the Boundaries of Centrifugal Pump Design," Oil and Gas, Jan. 2014, 2 pages.
Tabatabaei et al., "Well performance diagnosis with temperature profile measurements," SPE 147448, Society of Petroleum Engineers (SPE), in SPE Annual Technical Conference and Exhibition, Oct. 30-Nov. 2, 2011, published Jan. 2011, 16 pages.
Taheri et al., "Investigation of rock salt layer creep and its effects on casing collapse," International Journal of Mining Science and Technology, 2020, 9 pages.
Tang, et al., "Impact of Stress-Dependent Matrix and Fracture Properties on Shale Gas Production," Energies, Jul. 2017, 10(7):996.
Tarokh et al., "Scaling of the fracture process zone in rock." International Journal of Fracture 204.2, Nov. 2016, 191-204, 14 pages.
Tathed et al., "Hydrocarbon saturation in Bakken Petroleum System based on joint inversion of resistivity and dielectric dispersion logs," Fuel, Dec. 2018, 233: 45-55, 11 pages.
Taylor et al., "Laboratory Evaluation of In-Situ Gelled Acids for Carbonate Reservoirs," SPE-71694-MS, Society of Petroleum Engineers (SPE), presented at the SPE Annual Technical Conference and Exhibition, New Orleans, Sep. 30-Oct. 3, 2001, 10 pages.
Thomas et al., "Fractured reservoir simulation," SPE-9305-PA, Society of Petroleum Engineers (SPE), SPE Journal, 23:1, Feb. 1983, 13 pages.
Tian et al., "Off-Resonant Gold Superstructures as Ultrabright Minimally Invasive Surface-Enhanced Raman Scattering (SERS) Probes," American Chemical Society (ACS), Chemistry of Materials (CM), Jul. 2015, 27: 5678-5684, 7 pages.
Timur, "Effective Porosity and Permeability of Sandstones Investigated Through Nuclear Magnetic Resonance Principles," Society of Petrophysicists and Well-Log Analysts, presented at the SPWLA 9th Annual Logging Symposium, Jun. 23-26, 1968, 18 pages.
Tinsley and Williams, "A new method for providing increased fracture conductivity and improving stimulation results," SPE-4676-PA, Society of Petroleum Engineers (SPE), Journal of Petroleum Technology, vol. 27, Issue 11, pp. 1317-1325, 1975, 7 pages.
Tran et al., "The effects of filter-cake buildup and time-dependent properties on the stability of inclined wellbores," SPE Journal, Aug. 2011, 16(04):1010-1028.
Trimmer et al., "Effect of pressure and stress on the water transport in intact and fractured gabbro and granite," Journal of Geophysical Research, vol. 85, Dec. 10, 1980, 13 pages.
Trippetta et al., "The seismic signature of heavy oil on carbonate reservoir through laboratory experiments and AVA modelling," Journal of Petroleum Science and Engineering, 2019, 177: 849-860, 12 pages.
Ulboldi et al., "Rock strength measurement on cuttings as input data for optimizing drill bit selection," SPE 56441, Society of Petroleum Engineers (SPE), presented at the 1999 SPE Annual Technical Conference and Exhibition, Oct. 3-6, 1999, 9 pages.
Uleberg and Kleppe, "Dual Porosity, Dual Permeability Formulation for Fractured Reservoir Simulation," TPG4150, Reservoir Recovery Techniques, Combined Gas/Water Injection Subprogram, 1996, 12 pages.
Ulm et al., "Material Invariant Poromechanics Properties of Shales," 2005, 8 pages.
Ulm et al., "The Nanogranular Nature of Shale," Acta Geotechnica, Springer, Jun. 15, 2006, 1:2, 12 pages.
Van Poollen et al., "Hydraulic Fracturing—Fracture Flow Capacity vs Well Productivity," SPE-890-G, Society of Petroleum Engineers (SPE), Petroleum Transactions AIME, 213:91-95, 1958, 5 pages.
Van Poollen, "Productivity vs Permeability Damage in Hydraulically Produced Fractures," presented at Drilling and Production Practice, New York, New York, paper 906-2-G, Jan. 1957, 8 pages.
Van Zanten et al., "Advanced Viscoelastic Surfactant Gels for High-Density Completion Brines," SPE-143844-MS, Society of Petroleum Engineers (SPE), presented at the SPE European Formation Damage Control Conference, Noordwijk, the Netherlands, Jun. 7-10, 2011, 7 pages.
Van Zanten, "Stabilizing Viscoelastic Surfactants in High-Density Brines," SPE-141447-PA, Society of Petroleum Engineers (SPE), SPE Drill & Compl 26:4 (499-505), 7 pages.
Vanlandingham, "Review of Instrumented Indentation," Journal of Research of the National Institute of Standards and Technology, Jul.-Aug. 2003, 108:4 (249-265), 17 pages.
Verhoeven et al., "Modelling Laser Induced Melting," Mathematical and Computer Modelling, vol. 37, Issue 3-4, 2003, 19 pages.
Vernik et al., "Ultrasonic Velocity and Anisotropy of Hydrocarbon Source Rocks," Geophysics, May 1992, 57:5 (727-735), 9 pages.
Vincent, "Examining our Assumptions—Have oversimplifications jeopardized our ability to design optimal fracture treatments," SPE-119143-MS, Society of Petroleum Engineers (SPE), presented at the SPE Hydraulic Fracturing Technology Conference, the Woodlands, Jan. 19-21, 2009, 51 pages.
Vincent, "Five Things you Didn't Want to Know about Hydraulic Fractures," presented at the International Conference for Effective and Sustainable Hydraulic Fracturing, ISRM-ICHF-2013-045, an ASRM specialized Conference, Australia, May 20-22, 2013, 14 pages.
Voltolini et al., "Anisotropy of Experimentally Compressed Kaolinite-illite-quartz Mixtures," Geophysics, Jan.-Feb. 2009, 74:1 (D13-D23), 11 pages.
Walters et al., "Kinetic rheology of hydraulic fracturing fluids," SPE 71660, Society of Petroleum Engineers (SPE), SPE Annual Technical Conference and Exhibition, Sep. 30-Oct. 3, 2001, 12 pages.
Wang and Samuel, "Geomechanical Modelling of Wellbore Stability in Salt Formations, 3D Geomechanical Modeling of Salt-Creep Behavior on Wellbore Casing for Presalt Reservoirs," SPE Drilling and Completion, 31(04): 261-272, Sep. 2013, 13 pages.
Wang et al., "A Feasibility Analysis on Shale Gas Exploitation with Supercritical Carbon Dioxide," Energy Sources, Part A: Recovery, Utilization, and Environmental Effects 2012, 34:15 (1426-1435), 11 pages.
Wang et al., "A New Viscoelastic Surfactant for High Temperature Carbonate Acidizing," SPE-160884-MS, Society of Petroleum Engineers (SPE), presented at the SPE Saudi Arabia Section Technical Symposium and Exhibition, Al-Khobar, Saudi Arabia, Apr. 8-11, 2012, 18 pages.

(56) References Cited

OTHER PUBLICATIONS

Wang et al., "A Numerical Study of Factors Affecting the Characterization of Nanoindentation on Silicon," Materials Science and Engineering: A, Feb. 25, 2007, 447:1 (244-253), 10 pages.
Wang et al., "Iron Sulfide Scale Dissolvers: How Effective Are They?" SPE 168063, Society of Petroleum Engineers (SPE), presented at the SPE Saudi Arabia Section Annual Technical Symposium and Exhibition, May 19-22, 2013, 22 pages.
Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 2004, 41:2 (245-253), 9 pages.
Wang et al., "Ultralow Electrical Percolation in Graphene Aerogel/Epoxy Composites," Chemistry of Materials, Sep. 7, 2016, 28:18 (6731-6741), 11 pages.
Warpinski, "Understanding Hydraulic Fracture Growth, Effectiveness, and Safety Through Microseismic Monitoring," Chapter 6, in Effective and Sustainable Hydraulic Fracturing, Intech, May 17, 2013, 14 pages.
Warren and Root, "The Behavior of Naturally Fractured Reservoirs," SPE 426, Society of Petroleum Engineers (SPE), SPE Journal, Sep. 1963, 3:3 (245-255), 11 pages.
Waters, "Frac Fluids on Organic Shales: What We Know, What We Don't, and What Can We Do About It," Society of Petroleum Engineers (SPE) Asia Pacific Hydraulic Fracturing Conference, Aug. 24-26, 2016, Beijing, China, 29 pages.
Wegst et al., "Bioinspired Structural Materials," Nature Materials, Jan. 2015, 14, 14 pages.
Weijermars et al., "Closure of open wellbores in creeping salt sheets" Geophysical Journal International, 196: 279-290, 2014, 12 pages.
Welton et al., "Anionic Surfactant Gel Treatment Fluid," SPE-105815-MS, Society of Petroleum Engineers (SPE), presented at the SPE International Symposium on Oilfield Chemistry, Houston, Feb. 28-Mar. 2, 2007, 8 pages.
Wenk et al., "Preferred Orientation and Elastic Anisotropy of Illite-Rich Shale," Geophysics, Mar.-Apr. 2007, 72:2 (E69-E75), 7 pages.
Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.
Wikipedia.org [online], "Viscometer," created on Mar. 2002, [retrieved on Aug. 30, 2021], retrieved from : URL <https://en.wikipedia.org/wiki/Viscometer>, 12 pages.
Williams et al., "Acidizing Fundamentals," Society of Petroleum Engineers of AIME, Jan. 1979, 131 pages.
Wilson and Aifantis, "On the Theory of Consolidation with Double Porosity," International Journal of Engineering Science, 1982, 20:9 (1009-1035), 27 pages.
Wilson et al., "Fracture Testing of Bulk Silicon Microcantilever Beams Subjected to a Side Load," Journal of Microelectromechanical Systems, Sep. 1996, 5:3, 9 pages.
Witten et al., "Structured Fluids: Polymers, Colloids, Surfactants," New York: Oxford University Press, 2010, 231 pages.
Wu et al., "A reusable biosensor chip for SERS-fluorescence dual mode immunoassay," Proc. SPIE 9543:954317-1, Third International Symposium on Laser Interaction with Matter, LIMIS 2014, May 4, 2015, 6 pages.
Wu et al., "A SERS-Assisted 3D Barcode Chip for High-Throughput Biosensing," Nano Micro Small Journal, Jun. 11, 2015, 11:23 (2798-2806), 9 pages.
Wu et al., "Extraction of kerogen from oil shale with supercritical carbon dioxide: Molecular dynamics simulations," the Journal of Supercritical Fluids, 107: 499-506, Jan. 2016, 8 pages.
Wurster et al., "Characterization of the fracture toughness of microsized tungsten single crystal notched specimens," Philosophical Magazine, May 2012, 92:14 (1803-1825), 23 pages.
Wurzenberger et al., "Nitrogen-Rich Copper(II) Bromate Complexes: an Exotic Class of Primary Explosives," Journal of Inorganic Chemistry, 2018, 57: 7940-7949, 10 pages.
Xu et al., "Anisotropic elasticity of jarosite: A high-P synchrotron XRD study," American Mineralogist, 2010, 95:1 (19-23), 5 pages.
Xu et al., "Measurement of two-photon excitation cross sections of molecular fluorophores with data from 690 to 1050 nm," Journal of the Optical Society of America B, Mar. 1996, 13:3, 11 pages.
Yaich et al., "A Case Study: The Impact of Soaking on Well Performance in the Marcellus," SPE-178614-MS, URTeC: 2154766, Society of Petroleum Engineers (SPE), Unconventional Resources Technology Conference (URTeC), presented at the Unconventional Resources Technology Conference, Jul. 20-22, 2015, 11 pages.
Yamada and Jones, "A review of pulse technique for permeability measurements," SPE Journal, 20:5, Oct. 1980, 2 pages.
Yan et al., "General multi-porosity simulation for fractured reservoir modeling," Journal of Natural Gas Science Engineering, 33, Jul. 2016, 16 pages.
Yang et al., "Nanoscale geochemical and geomechanical characterization of organic matter in shale," Nature Communications, Dec. 19, 2017, 8:2179, 9 pages.
Yang et al., "Viscoelastic Evaluation of Gemini Surfactant Gel for Hydraulic Fracturing," SPE-165177-MS, Society of Petroleum Engineers (SPE), presented at the SPE European Formation Damage Conference and Exhibition, Noordwijk, the Netherlands, Jun. 5-7, 2013, 5 pages.
Yoldas, "Alumina gels that form porous transparent Al2O2," Journal of Materials Science, 1975, 10: 1856-1860, 5 pages.
Yu et al., "Impact of Hydrolysis at High Temperatures on the Apparent Viscosity of Carboxybetaine Viscoelastic Surfactant-Based Acid: Experimental and Molecular Dynamics Simulation Studies," SPE-142264-PA, Society of Petroleum Engineers (SPE), SPE J. 2012, 17:4 (1119-1130), 12 pages.
Yu et al., "Propagation and Retention of Viscoelastic Surfactants Following Matrix-Acidizing Treatments in Carbonate Cores," SPE-128047-PA, Society of Petroleum Engineers (SPE), SPE J. 2011, 16:4 (993-1001), 9 pages.
Zamberi et al., "Improved Reservoir Surveillance Through Injected Tracers in a Saudi Arabian Field: Case Study," SPE 166005, Society of Petroleum Engineers (SPE), presented at SPE Reservoir Characterization and Simulation Conference and Exhibition, Sep. 16-18, 2013, 15 pages.
Zeilinger et al., "Improved Prediction of Foam Diversion in Matrix Acidizing," SPE-29529-MS, Society of Petroleum Engineers (SPE), presented at the Production Symposium, Oklahoma City, Oklahoma, Apr. 2-4, 1995, 13 pages.
Zemel, "Chapter 3: Interwell Water Tracers," Tracers in the Oil Field, 43:1, Elsevier Science, Jan. 13, 1995, 47 pages.
Zeszotarski et al., "Imaging and Mechanical Property Measurements of Kerogen via Nanoindentation," Geochimica et Cosmochimica Acta, Oct. 15, 2004, 68:20 (4113-4119), 7 pages.
Zhang et al., "Matrix permeability measurement from fractured unconventional source-rock samples: Method and application," J Contam Hydrol, 2020, 233:103663.
Zhang et al., "Solubility of P-Methylbenzene Sulfonic Acid in Pure and Modified Supercritical Carbon Dioxide," Journal of Chemical & Engineering Data, Jan. 2008, 53(2):600-602.
Zhao et al., "A New Fracturing Fluid for HP/HT Applications," SPE-174204-MS, Society of Petroleum Engineers (SPE), presented at the SPE European Formation Damage Conference and Exhibition, Budapest, Hungary, Jun. 3-5, 2015, 17 pages.
Zheng et al., "Relationships between permeability, porosity and effective stress for low-permeability sedimentary rock," International Journal of Rock Mechanics and Mining Sciences, 2015, 78:304-318.
Zhong et al., "Solubility of Stearic Acid in Supercritical CO2 with Cosolvents," The Journal of Supercritical Fluids, Jun. 1997, 10(2):113-118.
Zhou et al., "Upconversion luminescent materials: advances and applications," American Chemical Society (ACS), Chemical Reviews, Jan. 14, 2015, 115: 395-465, 71 pages.

(56) References Cited

OTHER PUBLICATIONS

Zielinska, "Swelling of EPDM rubbers for oil-well applications as influenced by medium composition and temperature," pecznienie uszczelnien z EPDM, Elastomery, Jan. 2016, 2:20, 12 pages.

Zielinski et al., "A Small-Angle Neutron Scattering Study of Water in Carbon Dioxide Microemulsions," Langmuir 1997, 13:15 (3934-3937), 4 pages.

Zimmerman and Bodvarsson, "Hydraulic Conductivity of Rock Fractures," transport in Porous Media, Jan. 1996, 23: 1-30, 31 pages.

Zoback, "Reservoir geomechanics," Cambridge University Press, 2010, Chapter 6: 196-197, 13 pages.

Zuo et al., "Polymer/Carbon-Based Hybrid Aerogels: Preparation, Properties and Applications," Materials, Oct. 9, 2015, 8:10 (6806-6848), 43 pages.

\* cited by examiner

ATTENUATED ACID FORMULATIONS FOR ACID STIMULATION

TECHNICAL FIELD

The present disclosure is directed to acid treatment formulations that slow the reactivity of the acid with carbonate formations.

BACKGROUND

The oil and gas industry uses acids to stimulate hydrocarbon reservoirs, for instance, in carbonate formations. The acids are selected based on their reactivity towards the rock matrix or the damage to be removed. In a successful treatment, the dissolution process leads to the formation of a highly conductive channel network, enhancing hydrocarbon production. Acid stimulation of carbonate reservoirs is routinely carried out in matrices, and acid fracturing treatments. Formations including calcite, dolomite, and the like, are typically stimulated using strong mineral acids, such as hydrochloric acid (HCl). This selection is primarily driven by its cost-effectiveness and proven success and efficiency towards dissolving calcium and magnesium-based carbonates. Moreover, the reaction products are readily soluble in water, which helps to prevent formation damage.

However, HCl has significant operational limitations that are detrimental to performance and cost. For example, HCl rapidly reacts with the rock matrix, particularly at elevated temperatures, and as a result, large volumes of acid are required to stimulate the pay zone. The fast reaction of the acid often prevents deeper penetration of live acid into the reservoir. Other drawbacks include undesired acid reactions occurring near the wellbore, causing corrosion and damage to drilling equipment, metal tubulars, and casing. Alternative strategies have been proposed over the years to address some of these limitations.

A number of strategies have been proposed for retarding the reaction rate between acid and the rock matrix. For example, encapsulation or emulsification of the acid can be used to create a temporary barrier between the acid and rock matrix. These techniques can include polymer-type shell or coating, acid-in-diesel emulsion, foaming of the acid, gelled systems, and the like. Changes in temperature, pressure, pH, or shear, among others, can be used to trigger release of the acid in the reservoir. Currently, the most used retarded acid system in the oil and gas industry is emulsification. Here, hydrochloric acid, with a concentration up to 28 wt. % (internal phase), is emulsified in a hydrocarbon (diesel) phase as the continuous phase.

Milder acids have been tested and used to slow the reaction rate of the acid with the rock matrix. These include organic acids, among others.

Acid retardation may also be performed by the introduction of salt solutes. In solutions with the salt solutes, the lack of water molecules increases steric hindrance in the fluid and limits the diffusion of protons. The amount of salt present in the composition can be adjusted to provide a desired acid retardation function.

In some tests, the acid is generated in situ at the point at which reaction is desirable. For example, by generating the downhole acid in a subterranean reservoir. Downhole, as opposed to generating acid on the earth's surface at wellsite and transferring it to a subterranean reservoir downhole.

The acid systems tested do overcome some of the challenges associated with using HCl. However, limitations still exist, particularly with respect to high friction pressures as observed for emulsified acid systems. Organic acids are often plagued by high cost, low dissolving power, and a limited solubility of reaction products.

SUMMARY

An embodiment described in examples herein provides a method for treating a carbonate reservoir with an attenuated acid formulation. The method includes mixing an acidic compound with a hygroscopic chemical to form the attenuated acid formulation and injecting the attenuated acid formulation into a carbonate formation.

DETAILED DESCRIPTION

This application provides methods and compositions for attenuating the reactivity of acid within a subterranean formation, by mixing hygroscopic chemicals with acid to form an attenuated acid formulation. Not to be bound by the explanation, the hygroscopic chemicals, such as glycols, will adsorb water from the acid formulation and slow down the dissociation of the acid thus controlling acid (proton) diffusion to the rock surface. This may reduce acid diffusivity, which will result in slower acid attack on the rock. The slower acid attack leads to increased acid penetration and increases the efficiency of the acid treatment. In various embodiments, the attenuated acid formulation composition is delivered to the formation in as a main acid treatment or alternated with other acid treatment systems.

The attenuated acid formulation is a single-phase aqueous-based fluid, with a viscosity close to that of water. For example, the viscosity may be between 1 cP and 49 cP, where 49 cP is the viscosity of triethylene glycol. In some embodiments, the viscosity is between about 1 cP and about 100 cP, or between about 1 cP and 30 cP. In some embodiments, the attenuated acid formulation does includes emulsifiers, foaming agents, or both. As shown in the examples, the acid reactivity profile with a carbonate rock matrix can be decreased through the addition of suitable hygroscopic solvent to the main acid system in volume ratio in the range of 1 to 50% of the total volume of the acid treatment. This is achieved by adding the solvent to the bulk acid, for example, 15 wt. %, 28 wt. %, 31 wt. %, 36 wt. %, HCl and the like, without the need for additional polymers or emulsification procedures.

In examples described herein, the hygroscopic solvents include monoethylene glycol, diethylene glycol, and triethylene glycol. The hygroscopic solvents may adsorb a portion of the free water available in the attenuated acid formation resulting in less water for acid dissociation and diffusion toward the rock surface. In turn, this may slow down the reaction between the acid and the rock matrix thereby allowing the live acid to penetrate deeper into the formation prior to neutralization. The deeper penetration will improve the rate of propagation of channels (wormholes) into the reservoir.

Figure 1:
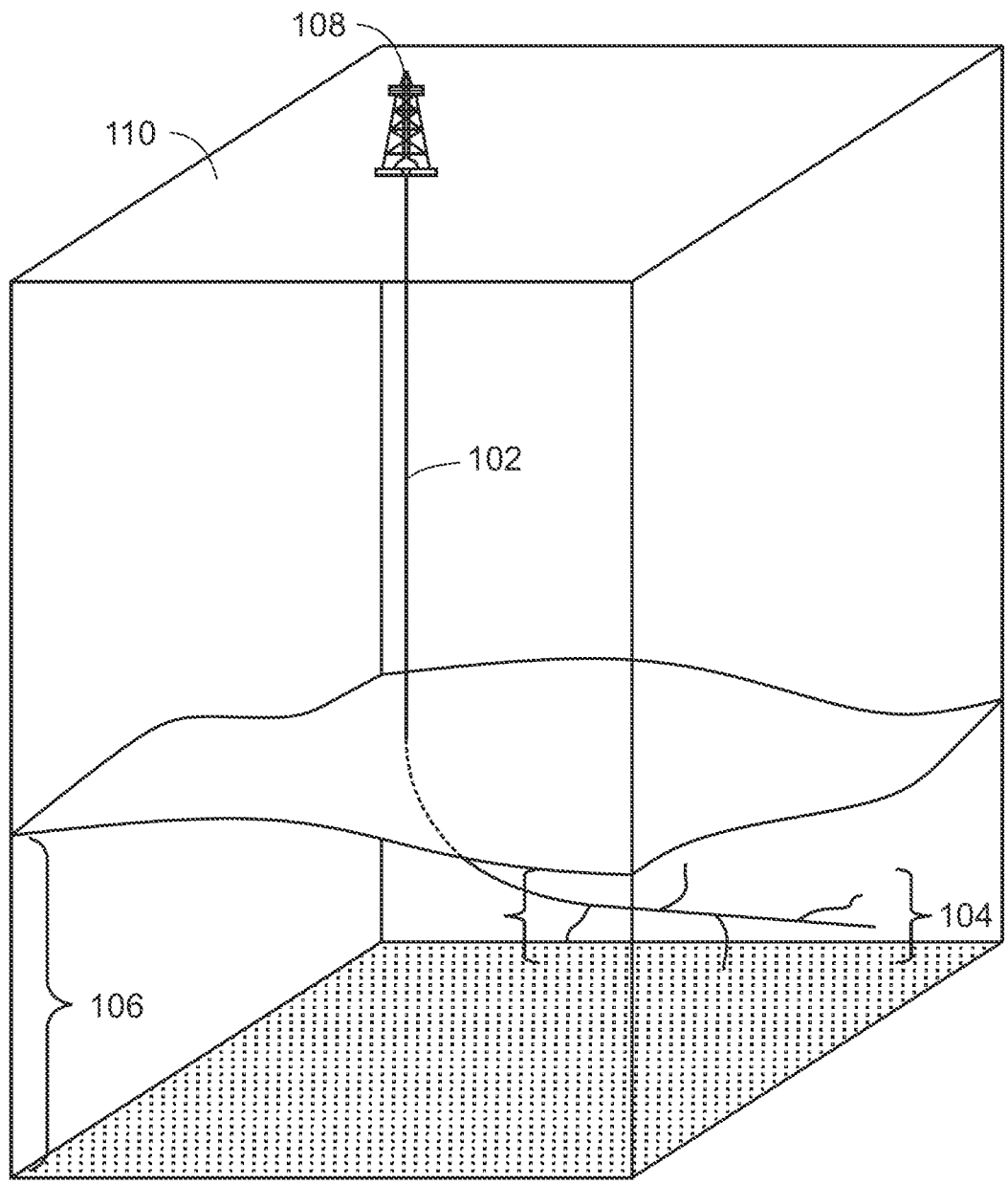
FIG. 1 is a schematic drawing of a wellbore illustrating the formation of longer cracks in a carbonate reservoir due to treatment with an attenuated acid.

FIG. 1 is a schematic drawing 100 of a wellbore 102 illustrating the formation of wormholes 104 in a carbonate reservoir 106 due to treatment with an attenuated acid formulation. The attenuated acid formulation is provided to the carbonate reservoir 106 through the wellbore 102, for example, directly or through a smaller tubular such as a coiled tubing line. Apparatus 108 at the surface 110, such as tanks, pumps, coiled tubing lines, and the like is used to provide the attenuated acid formulation. As described herein, acid treatment with strong mineral acids, such as HCl, may result in faster reaction with the carbonate reservoir 106 leading to less acid penetration. The attenuated acid formation provides further penetration during reaction, increasing the effectiveness of the acid treatment in forming the wormholes 104.

Figure 2:
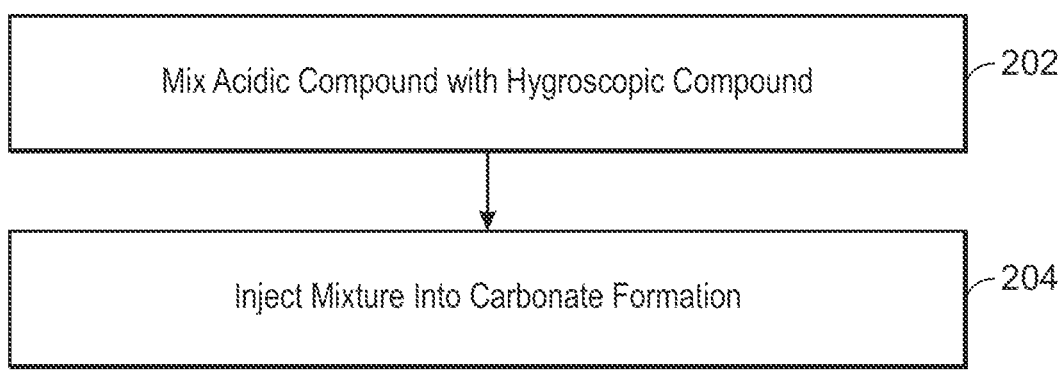
FIG. 2 is a process flow diagram of a method for treating a reservoir with a formulation that includes a hygroscopic compound to attenuate the reactivity of acid.

FIG. 2 is a process flow diagram of a method 200 for treating a reservoir with an attenuated acid formulation including an acid and a hygroscopic compound. The method begins at block 202 with the mixing of the acidic compound with a hygroscopic compound to form the attenuated acid formulation. In some embodiments, the attenuated acid formulation additives are to be mixed at the wellsite, for example, in recirculating tanks at 1 atmosphere and temperatures of 25° C. or greater.

The acid can be HCl, or methanesulfonic acid (MSA), among others. In an embodiment, the acid is HCl. Prior to mixing to form the attenuated acid formulation, the HCl may be at a concentration of less than or about 15 wt. %, less than or about 28 wt. % less than or about 31 wt. %, or less than or about 36 wt. %.

Any number of hygroscopic solvents may be used, for example, the hygroscopic solvent may be ethylene glycol, diethylene glycol, propylene glycol (or 1,2 propylene glycol or 1,2-propanediol), triethylene glycol, diglyme (or diethylene glycol dimethyl ether), 2-butoxyethanol (or EGBE or ethylene glycol monobutyl ether), dimethylformamide, propylene carbonate, 1,3 propylene glycol or 1,3-propanediol, diethylene glycol, 2(2-ethoxyethoxy)ethanol (or DEGEE or diethylene glycol monoethyl ether, carbitol, carbitol cellosolve), dipropylene glycol, 1,3 butanediol, dimethylene glycol or 2,3 butanediol, ethylene carbonate, 2(2-methoxyethoxy)ethanol (or diethyleneglycol monomethyl ether), dimethylemalonate, n-methyl-2-pyrrolidone, a mixture of ethylene glycol and water (35/65), a mixture of 60% propylene glycol in water, a mixture of500 ethylene glycol in water and monoethylene glycol (or ethylene glycol). Table 1 is listing of solvents that may be used

TABLE 1 list of hygroscopic solvents that can be used in the attenuated acid formulation.

| Chemical Name | Boiling Point, C. | Melting Point, C. |
| --- | --- | --- |
| Ethanol | 78.5 | −114.1 |
| Methanol | 64.4 | −98 |
| 2-methyl (1,3 propanediol) | 125 | −91 |
| 1-Butanol | 117.7 | −88.6 |
| 2(2-ethoxyethoxy)ethanol-DEGEE | 196 | −76 |

TABLE 1-continued list of hygroscopic solvents that can be used in the attenuated acid formulation.

| Chemical Name | Boiling Point, C. | Melting Point, C. |
| --- | --- | --- |
| 2-Butoxyethanol or EGBE | 171 | −70 |
| 2(2-methoxyethoxy)ethanol | 194 | −69 |
| Dimethylformamide | 153 | −60.4 |
| Propylene Glycol | 188 | −59 |
| EG/35% Water | | −52.8 |
| 1,3 Butanediol | 204 | −50 |
| Propylene Carbonate | 242 | −48.8 |
| 60% propylene Glycol in Water | | −48 |
| 50% EG in Water | | −36.8 |
| 1,3 Propylene Glycol | 213 | −27 |
| Ethylene Glycol | 195 | −13 |
| Diethylene Glycol | 106.2 | −10 |
| Triethylene glycol | 285 | −7 |
| Cesium Formate | >100 | −50 |
| Potassium Formate 50% | >100 | −50 |
| Cesium and Potassium Formate (50/50) | >100 | −50 |
| Diglyme or Diethylene glycol dimethyl ether | 162 | −68 |
| Diglyme or Diethylene glycol dimethyl ether dimethylemalonate | 162 | −68 |
| | 180 | −62 |
| N-Methyl-2-pyrrolidone | 202 | −24 |
| Dimethyl Succinate | 218 | −20 |
| Dipropylene Glycol | 230 | −20 |
| dimethylene glycol | 244 | −10.5 |
| 2,3 Butanediol | 177 | 19 |
| Ethylene Carbonate | 243 | 34 |
| 2,2 dimethyl -1,3-Dioxolane -4-methanol | 73 | |
| α-Methyl-γ-butyrolactone | 80 | |
| Urea | | |

In embodiments, the hygroscopic compound may be a hygroscopic solvent, for example, as described in Table 1. The hygroscopic solvent may form about 1 to about 50 vol. % of the total volume of the attenuated acid formulation, or about 10 to about 40 vol. %, or about 15 to about 30 vol. %. In some embodiments, the hygroscopic solvent forms about 20 to about 25 vol. % of the total volume of the attenuated acid formulation.

In some embodiments, the attenuated acid formulation may be combined with suitable inorganic and/or organic acids or acid-producing systems as a means of tailoring the acid reactivity with the rock matrix.

Further, friction losses resulting from the high viscosity of many acid systems, such as gelled and emulsified acids, during the delivery may increase costs and lower efficiency due to pressure losses. The attenuated acid formulations provided herein are generally low-viscosity systems, which facilitates pumping the formulations to a desired location with minimal pressure losses due to friction. In some embodiments, the attenuated acid formulation is mixed at the wellhead, no need for batch mixing and transportation and storage facilities, saving money and time.

While the attenuated acid formulation can be used as the acidizing system without further changes, other wettability alteration chemicals can be added easily to the solvent phase. For example, relatively low concentrations, for example, less than 10.0 vol. %, of a retarding agent, such as a fluorinated surfactant, can be added. The retarding agent can be added to the attenuated acid formulation at the wellsite in an on-the-fly fashion, e.g., as the attenuated acid formulation is mixed and pumped into the wellbore. The agent concentration can be tailored to deliver a targeted wormhole penetration depth, for example, a higher concentration of the agent will yield a higher retardation effect.

Other additives may be used. For example, in some embodiments, the attenuated acid formulation includes surfactants that help to provide surface repellency to acid. The surfactants can be anionic, cationic, or neutral in nature. For example, a fluorinated surfactant can be functionalized to include a hydrophilic head-group with chemical affinity and retention on the rock surface and functionalized hydrophobic tail, that contains long chain fluorinated alkyl groups, serving the purpose of repelling water or aqueous solutions, such as acids, as well as oleic phases, such as condensate or crude oil, from the rock surface thus creating a temporary barrier to delay acid reactivity.

Suitable fluorinated surfactant molecules can include but are not limited to fluoro-surfactants, fluoro-polymers, fluoro-polymeric surfactants. For example the fluorinated surfactant molecules can include non-ionic acrylic fluorinated copolymer, nonionic fluoro-surfactant partially fluorinated acrylic copolymer, nonionic fluorinated methacrylate polymer, anionic phosphate fluoro-surfactant. Any of these structures can be linear, branched, or cross-linked chemical species. Other fluorinated surfactants include NW100 Fluorinated Surfactant in water with concentration of greater than about 5.0 wt. % and less than about 20.0 wt. %, available from VerdeChem Technologies of Alberta, CA. WS-1200 available from 3M of St. Paul, MN. Zonyl® UR, a mixture of anionic phosphate fluoro-surfactants, a phosphate hydrophilic head and a fluorocarbon hydrophobic tail, available from Chemours of Wilmington, DE. Another material from Chemours that can be used is Zonyl TBS. Zonyl TBS is an anionic sulfonate fluorinated surfactant, whose structure is given by $R^F CH_2 CH_2 SO_3 Y$ where $R^F$ is $F(CF_2 CF_2)_{1-9}$ and Y is a mixture of hydrogen and ammonium.

Another fluorinated surfactant that can be used has the structure $R^f$—$SO_2N$—$R^1 \cdot M^+$ wherein $R^f$ is a $C_1$ to $C_{12}$ perfluoroalkyl group, $R^1$ is H, an alkyl group, a hydroxyalkyl group, an alkylamine oxide, an alkylcarboxylate group, or an aminoalkyl group, and $M^+$ is a cation. The acid may include hydrogen fluoride or an ammonium fluoride complex.

Another fluorinated surfactant that can be used has the formula $R^f$-Q-R1-$SO_3$-$M^+$ wherein $R^f$ is a $C_1$ to $C_{12}$ perfluoroalkyl group, $R^1$ is an alkylene of the formula—$C_n H_{2n}$ (CHOH)$_o C_m H_{2m}$—, wherein n and m are independently 1 to 6, and o is 0 or 1, and is optionally substituted by a catenary oxygen or nitrogen group; $M^+$ is a cation; and Q is —O—, or —$SO_2 NR^2$—, wherein $R^2$ is an H—, alkyl, aryl, hydroxyalkyl, aminoalkyl, or sulfonatoalkyl group, optionally containing one or more catenary oxygen or nitrogen heteroatoms. The fluoro-containing pendant group can be bonded to a primary, secondary or tertiary carbon These fluoro-polymers, fluoro-surfactants, or fluorinated polymeric surfactants can be linear, branched chain, star-shaped, or brush-like molecules. Further, surface modified nanoparticles may be used.

Notably, the functionality of the surfactant molecule can be tailored to increase adsorption and retention to the rock surface in addition to degree of repellency to best meet the application needs. Where used, surfactants are present in the fluids in an amount sufficient to prevent incompatibility with formation fluids and/or well bore fluids.

The surfactants may be used in a liquid or powder form. If included, a liquid surfactant may be added in an amount of from about 0.01 vol. %, to about 10 vol. %, or about 0.5 vol. % to about 5 vol. %, or about 1 vol. % to about 3 vol. %. If included, a powdered surfactants may be present in an amount in the range of from about 0.001 wt. % to 10 wt. %, from about 0.5 wt. % to about 5 wt. %, or about 1 wt. % to about 3 wt. %.

Examples of suitable surfactants are non-emulsifiers that are commercially available from Halliburton Energy Services, Inc., of Duncan, Oklahoma, under the tradenames "LOSURF-259™" nonionic non-emulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Oklahoma, under the tradename "NEA-96M™" Surfactant. In some embodiments, it is beneficial to add a surfactant to a viscosified fluid of a composition as described in this application as that fluid is being pumped down hole to help eliminate the possibility of foaming if so desired.

In some embodiments, a mutual solvents is used to help keep other additives in solution, such as, surfactants as described above. Suitable mutual solvents include, but are not limited to, Halliburton's MUSOL® Mutual Solvent, MUSOL® A Mutual Solvent, MUSOL® E Mutual Solvent, ethyleneglycolmonobutylether, propyleneglycolmonobutylether, water, methanol, isopropyl alcohol, alcohol ethers, aromatic solvents, other hydrocarbons, mineral oils, paraffins, and derivatives and combinations thereof, among others. If used, the mutual solvent may be included in an amount of from about 1 vol. % to about 20 vol. % or from about 5 vol. % to about 10 vol. %.

The solvent system and the added retarding agent and surfactants, if used, are not expected to lead to formation damage nor pose compatibility concerns with other oilfield chemistry additives. The use of the hygroscopic solvents and the control of acid diffusivity in both the well bore and the formation may provide additional benefits such as corrosion control in tubulars.

In addition to the retarding agent and surfactants, other additives such as friction reducers, may be added to the attenuated acid formulation to reduce friction pressure during pumping. This may allow the injection of attenuated acid formulation to be performed at a higher injection rate, further propagation of the acid inside the reservoir.

In some embodiments, the attenuated acid formulation is in the form of an emulsion. The emulsion is formed by the use on an emulsifying surfactant, such as nonionic surfactants including sorbitan esters, AF-61™ Emulsifier, and AF-70™ emulsifier, among others. In some embodiments, a surfactant is an oil external surfactant, for instance, AF-61™ Emulsifier and AF-70™ Emulsifier. For water external emulsions, surfactants that may be used include SEM-7™ Emulsifier, WS-36™ Dispersant, and WS-44™ Emulsifier. If a surfactant is used, generally an amount between 0.1 vol. % to 3 vol. % is sufficient to form the emulsion. In some embodiments, the emulsion can be mixed and then pumped. In some embodiments, the components can be pumped and then mixed down hole. In some embodiments, a surfactant is a viscoelastic surfactant.

The attenuated acid formulation may include one or more viscosifying agents. In some embodiments, the viscosifying agent is a polymer system, such as a cross-linked polymer system, where the crosslinker comprises zirconium or ferric metal clusters.

The attenuated acid formulation may include a gelling agent. Any gelling agent suitable for use in subterranean applications may be used in these fluids, including, but not limited to, natural biopolymers, synthetic polymers, cross-linked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino or amide groups. Suitable gelling agents include polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives and combinations of one or more of such polymers.

Further, synthetic polymers and copolymers may be used, alone or in combination with polysaccharides, biopolymers, or other polymers. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents are polymers and/or copolymers consisting of various ratios of acrylic, acrylamide, acrylamidomethylpropane sulfonic acid, quaternized dimethylaminoethylacrylate, quaternized dimethylaminoethylmethacrylate, mixtures thereof, and the like. In other exemplary embodiments, the gelling agent molecule may be depolymerized. The term "depolymerized," as used herein, generally refers to a decrease in the molecular weight of the gelling agent molecule. If used, a gelling agent may be present in the attenuated acid formulations in an amount from about 0.01 wt. % to about 5 wt. %, or about 0.5 wt. % to 4 wt. %, or about 2 wt. % to about 4 wt. % of the base fluid.

As some polymer gelling agents may be problematic under certain conditions in the formation, surfactants may be used as gelling agents. For example, when mixed with a fluid in a concentration above the critical micelle concentration, the molecules (or ions) of surfactants may associate to form micelles. The micelles may function, among other purposes, to stabilize emulsions, break emulsions, stabilize foam, change the wettability of a surface, solubilize certain materials, or reduce surface tension, among other functions. When used as a gelling agent, the molecules (or ions) of the surfactants associate to form micelles of a certain micellar structure, such as rod-like, wormlike, vesicles, and the like (which may be referred to as "viscosifying micelles"). Under certain conditions, for example, concentration, ionic strength of the fluid, and the like, the viscosifying micelles are capable of increasing the viscosity to a particular fluid or forming a gel. In some examples, viscosifying micelles may increase the viscosity of a fluid sufficiently that the fluid exhibits viscoelastic behavior, such as shear thinning properties. Further, because the viscosifying micelles may be sensitive to pH and hydrocarbons, the viscosity of these viscoelastic surfactant fluids may be reduced after introduction into the subterranean formation by the conditions on the formation. An example of a surfactant that may be useful for forming viscosifying micelles is Armovis EHS, Armovis EHS-W, Aromox APA-T, Aromox APA-TW, and Ethoquad O/12-PG from Nouryon. Chemically, these viscoelastic surfactants are oleyl methyl ammonium chloride ethoxlate, tallow amidoamine oxide, and zwitterionic surfactant such as erucamidopropyi hy droxypropylsultaine. The decrease in viscosity in the formation allows a substantial portion of the viscoelastic surfactant fluids to be produced back from the formation without the need for expensive remedial treatments. If used, the surfactants may be used in an amount of up to 10 wt. % of the attenuated acid formulation.

If a cross-linkable gelling agent is used, a cross linking agent can be included in the attenuated acid formulation, for example, to further increase viscosity. Cross-linking agents typically include a metal ion that is capable of cross-linking the molecules of the gelling agent. The crosslinking agents can be selected based on the functional groups on the gelling agent. Examples of suitable cross linking agents include, but are not limited to, zirconium compounds, such as zirconium lactate, zirconium lactate triethanolamine, zirconium carbonate, zirconium acetylacetonate, zirconium maleate, zirconium citrate, zirconium oxychloride, and zirconium diisopropylamine lactate; titanium compounds, such as titanium lactate, titanium maleate, titanium citrate, titanium ammonium lactate, titanium triethanolamine, and titanium acetylacetonate; aluminum compounds, such as aluminum lactate or aluminum citrate; and colemanite; antimony compounds; chromium compounds; iron compounds; copper compounds; zinc compounds; or a combination thereof.

An example of a suitable commercially available zirconium-based cross-linking agent is "CL-24™" cross linker from Halliburton Energy Services, Inc., Duncan, Oklahoma. An example of a suitable commercially available titanium-based crosslinking agent is "CL-39™" cross linker from Halliburton Energy Services, Inc., Duncan Oklahoma. An example of a suitable borate-based crosslinking agent is commercially available as "CL-22™" delayed borate cross linker from Halliburton Energy Services, Inc., Duncan, Oklahoma.

Divalent ions, such as calcium chloride and magnesium oxide, may be used as cross-linking compounds for some gelling agents. An example of a suitable divalent ion cross-linking agent is commercially available as "CL-30™" from Halliburton Energy Services, Inc., Duncan, Oklahoma. Another example of a suitable crosslinking agent is "CL-15," from Halliburton Energy Services, Inc., Duncan Okla. When included, the crosslinking agent is present in an amount sufficient to provide the desired degree of cross-linking. In some embodiments, the crosslinking agent is present in the attenuated acid formulation in an amount in the range of from about 0.01 wt. % to about 5 wt. %, or 0.05 wt. % to about 4 wt. %, or about 0.4 wt. % to about 2 wt. %.

In some embodiments, if a gelling agent, such as a cross-linked gelling agent, is used, a suitable breaker may be used to ultimately reduce the viscosity of the attenuated acid formulation, depending on the gelling agent and its interaction with the acid-generating compound, the generated acid, and the well bore conditions. Any breaker suitable for the subterranean formation and the gelling agent may be used. The amount of a breaker will depend on the amount of gelling agent present in the attenuated acid formulation The attenuated acid formulation may include bactericides to protect the subterranean formation, the fluid, or both from attack by bacteria. Such attacks may be problematic because they may lower the viscosity of the fluid, for example, resulting in poorer performance. Bacteria also can cause plugging by bacterial slime production and generate $H_2S$ from sulfur containing compounds, turning the formation sour. Any bactericides known in the art are suitable. Where used, the bactericides are present in an amount sufficient to destroy at least a substantial portion of the bacteria that may be present. Examples of bactericides that may be used include, but are not limited to, a 2,2-dibromo-3-nitrilopropionamide, commercially available under the tradename "BE-3 S™" biocide from Halliburton Energy Services, Inc., of Duncan, Oklahoma, and a 2-bromo-2-nitro-1,3-propanediol commercially available under the tradename "BE-6™"

biocide from Halliburton Energy Services, Inc., of Duncan, Oklahoma. In one embodiment, the bactericides are present in a provided composition in an amount in the range of from about 0.001 wt. % to about 0.003 wt. % by weight of the attenuated acid formulation. In certain embodiments, such bactericides may be present in a composition in an amount in the range of from about 0.01% to about 0.1% by volume.

The attenuated acid formulation may include other additives as desired. Examples of such additional additives include, but are not limited to, oxidizing agents, lost circulation materials, scale inhibitors, surfactants, clay stabilizers, corrosion inhibitors, paraffin inhibitors, asphaltene inhibitors, penetrating agents, clay control additives, iron control additives, reducers, oxygen scavengers, sulfide scavengers, emulsifiers, foaming agents, gases, derivatives thereof and combinations thereof, and the like. These may be selected to be compatible with the chemistry of the attenuated acid formulation.

In some embodiments, the attenuated acid formulation includes a foaming agent. Examples of foaming agents include but are not limited to: surfactants, such as water-soluble, nonionic, anionic, cationic, or amphoteric surfactants; carbohydrates, such as polysaccharides, cellulosic derivatives, guar or guar derivatives, Xanthan, carrageenan, starch polymers, gums, polyacrylamides, polyacrylates, betaine-based surfactants, viscoelastic surfactants, natural or synthetic clays; polymeric surfactants, such as partially hydrolyzed polyvinyl acetate, partially hydrolyzed modified polyvinyl acetate, block or copolymers of polyethylene, polypropylene, polybutylene or polypentene, proteins, and partially hydrolyzed polyvinyl acetate, polyacrylate and derivatives of polyacrylates, polyvinyl pyrrolidone and derivatives; N2; CO; CO2; air; and natural gas.

At block 204, the attenuated acid formulation is delivered to the formation, for example by a bull-heading or coiled tubing process. Upon injection into the wellbore, the attenuated acid formulation makes contact with the formation, allowing the hygroscopic solvent to adsorb part of the free water available. This may reduce the diffusion rate of protons to the rock surface, and calcium and magnesium ions from the rock surface into the liquid system. This mechanism may provide the lower activity of the attenuated acid formulation use to improve acid and wormhole penetration rate. The hygroscopic solvent can be injected as a part of the attenuated acid formulation. The treatment may be allowed to soak in the reservoir for up to 5 hours, or up to 10 hours, or up to 15 hours, or longer, to insure that all the acid injected reacted with formation and the acid is totally spent, for example, as determined by a pH increase from about 0 to about 4.

In some embodiments in which a fluorinated surfactant is used, an aqueous solution of the fluorinated surfactant and the attenuated acid formulation are introduced into the formation in separate stages. This may be done through the same or different tubing. The aqueous fluids to mix within the formation. In some embodiments, the aqueous solution of the fluorinated surfactant is introduced into the formation first.

EXAMPLES

The examples below show that the attenuated acid formulation described herein dissolved less limestone in the same exposure time, under static and ambient conditions, than the bulk acid as shown in Table 2. Furthermore, a lower volume of the attenuated acid formulation was required to form a wormhole through a core sample. This demonstrates that larger quantities of live acid can reach pay zones located deeper into the reservoir thereby increasing hydrocarbon production.

In the following examples, the abbreviation "g" stands for grams, the abbreviation "mL" stands for milliliters, and the abbreviation "ppm" stands for parts per million and can also be expressed as milligrams per liter.

Example 1. Core-plug Dissolution Experiments

The objective of this study was to determine the dissolution profile for a series of different attenuated acid formulations under analogous testing conditions. The parameters included ambient pressure and temperature, fluid volume (100 mL) and exposure time to acid (5 minutes). The acid formulations were prepared by mixing different glycols and hydrochloric acids (HCl) in ratios from 10/90 all the way up to 50/50, as shown in Tables 2-4.

In a typical experiment, a homogenous Indiana limestone core sample having a permeability between 4-8 mD was cut to have a diameter and length of 1.5" D x 0.5" L, respectively. One core sample was used for each individual test. The cores were dried in an oven at 248° F. overnight. Each of the dried cores was then saturated in DI-H$_2$O under vacuum for 12-24 h. The dry and saturated weight for the pre-treated core was recorded and porosity was calculated.

For each experiment, a saturated core was transferred to a 300 mL beaker containing 100 mL of the attenuated acid formulation (Listed in Tables 2, 3, and 4). For each experiment, the core sample was placed standing-up in the solution to ensure consistency across the series.

The weight of the saturated acidized core sample was measured for both the dry and saturated sample. From this, the percentage weight loss for each core was calculated and compared.

TABLE 2

Calculated weight loss of Indiana limestone core samples, post-acidizing, for the acid formulations containing the benchmark acid, i.e. 15 wt. % HCl, and 15 wt. % HCl in the presence of the noted additive-Rocks are exposed to acids for 5 minutes.

| Formulation | HCl (wt. %) | Additive Name | Additive Concentration (gpt) | Calcite Dissolved (%) |
|---|---|---|---|---|
| 1 | 15 | N/A | 0 | 45.7 |
| 2 | 15 | Diethylene Glycol | 10 | 29 |
| 3 | 15 | Diethylene Glycol | 25 | 19.5 |
| 4 | 15 | Diethylene Glycol | 50 | 5.5 |
| 5 | 15 | Mono ethylene Glycol | 10 | 30.4 |
| 6 | 15 | Mono ethylene Glycol | 25 | 20.4 |
| 7 | 15 | Mono ethylene Glycol | 50 | 7.0 |
| 8 | 15 | Triethylene Glycol | 10 | 27.4 |

TABLE 2-continued

Calculated weight loss of Indiana limestone core samples, post-acidizing, for the acid formulations containing the benchmark acid, i.e. 15 wt. % HCl, and 15 wt. % HCl in the presence of the noted additive-Rocks are exposed to acids for 5 minutes.

| Formulation | HCl (wt. %) | Additive Name | Additive Concentration (gpt) | Calcite Dissolved (%) |
|---|---|---|---|---|
| 9 | 15 | Triethylene Glycol | 25 | 18.3 |
| 10 | 15 | Triethylene Glycol | 50 | 7.6 |

TABLE 3

Calculated weight loss of Indiana limestone core samples, post-acidizing, for the acid formulations containing the benchmark acid 28 wt. % HCl, and 28 wt. % HCl in the presence of the noted additive-Rocks are exposed to acids for 5 minutes.

| Formulation | HCl (wt. %) | Additive Name | Additive Concentration (gpt) | Calcite Dissolved (%) |
|---|---|---|---|---|
| 1 | 28 | N/A | 0 | 57 |
| 2 | 28 | Diethylene Glycol | 10 | 34.7 |
| 3 | 28 | Diethylene Glycol | 25 | 28.4 |
| 4 | 28 | Diethylene Glycol | 50 | 4.6 |
| 5 | 28 | Mono ethylene Glycol | 10 | 40.1 |
| 6 | 28 | Mono ethylene Glycol | 25 | 30.4 |
| 7 | 28 | Mono ethylene Glycol | 50 | 6.3 |
| 8 | 28 | Triethylene Glycol | 10 | 35.8 |
| 9 | 28 | Triethylene Glycol | 25 | 33.8 |
| 10 | 28 | Triethylene Glycol | 50 | 12.3 |

TABLE 4

Calculated weight loss of Indiana limestone core samples, post-acidizing, for the acid formulations containing the benchmark acid 31 wt. % HCl, and 31 wt. % HCl in the presence of the noted additive-Rocks are exposed to acids for 5 minutes.

| Formulation | HCl (wt. %) | Additive Name | Additive Concentration (gpt) | Calcite Dissolved (%) |
|---|---|---|---|---|
| 1 | 31 | N/A | 0 | 67.2 |
| 2 | 31 | Diethylene Glycol | 10 | 40.4 |
| 3 | 31 | Diethylene Glycol | 25 | 29.7 |
| 4 | 31 | Diethylene Glycol | 30 | 28.0 |
| 5 | 31 | Mono ethylene Glycol | 35 | 22.7 |
| 6 | 31 | Mono ethylene Glycol | 40 | 18.6 |
| 7 | 28 | Mono ethylene Glycol | 45 | 12.6 |

Figure 3A:
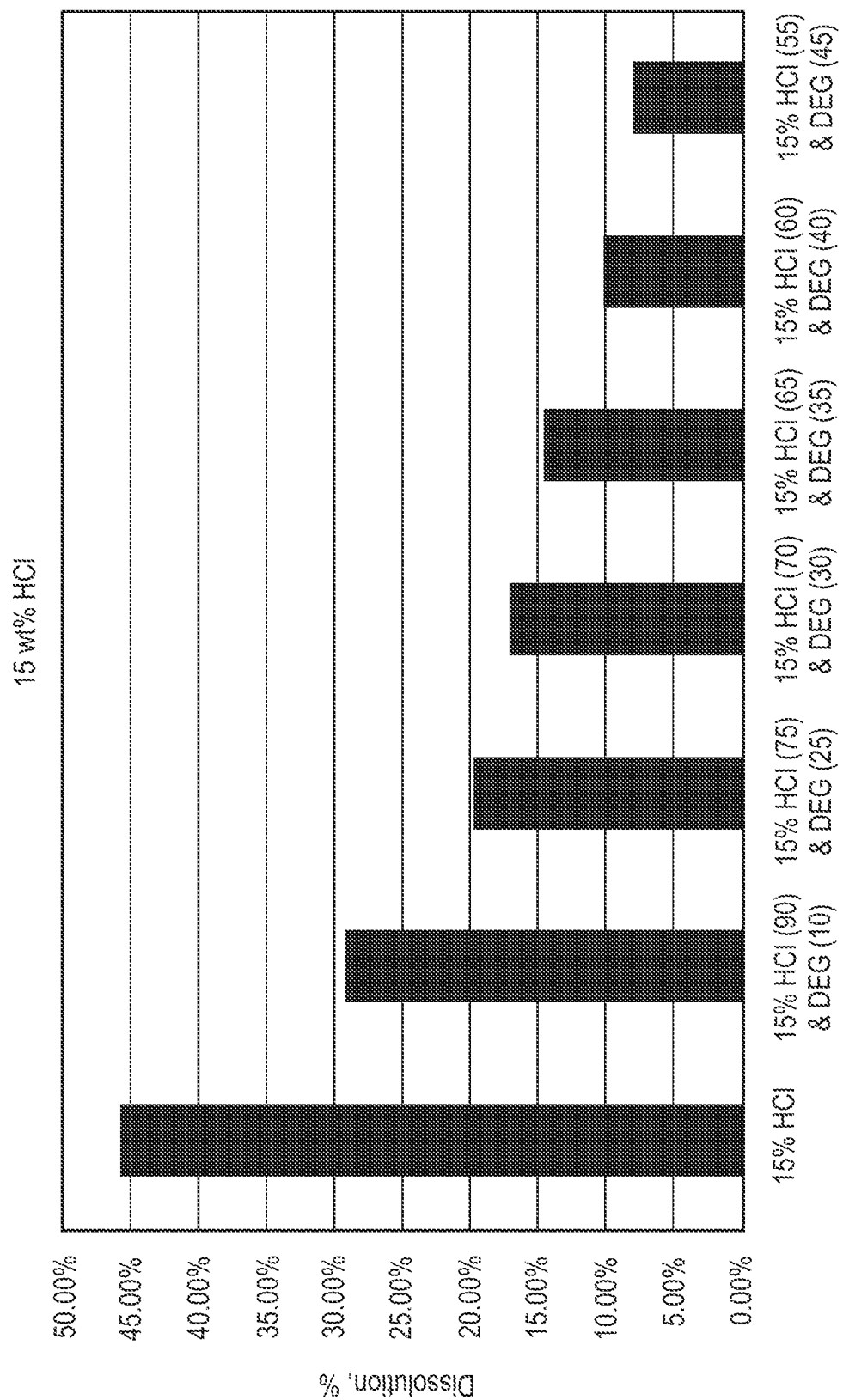
FIGS. 3A to 3C are plots of the calculated weight-loss of Indiana limestone core samples for acid formulations containing 15 wt. %, 28 wt. %, and 31 wt. % of hydrochloric acid (HCl).
Figure 3B:
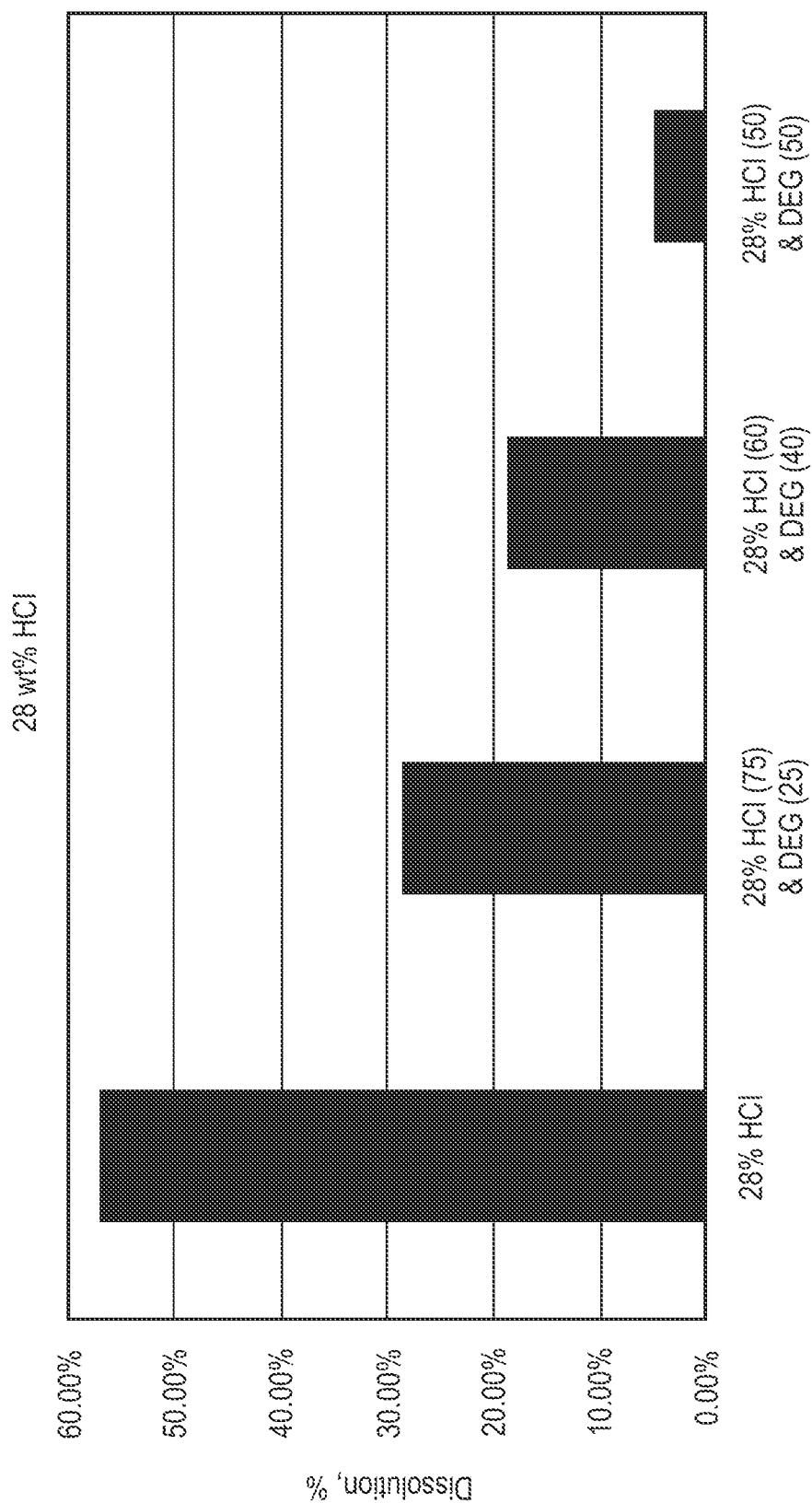
Figure 3C:
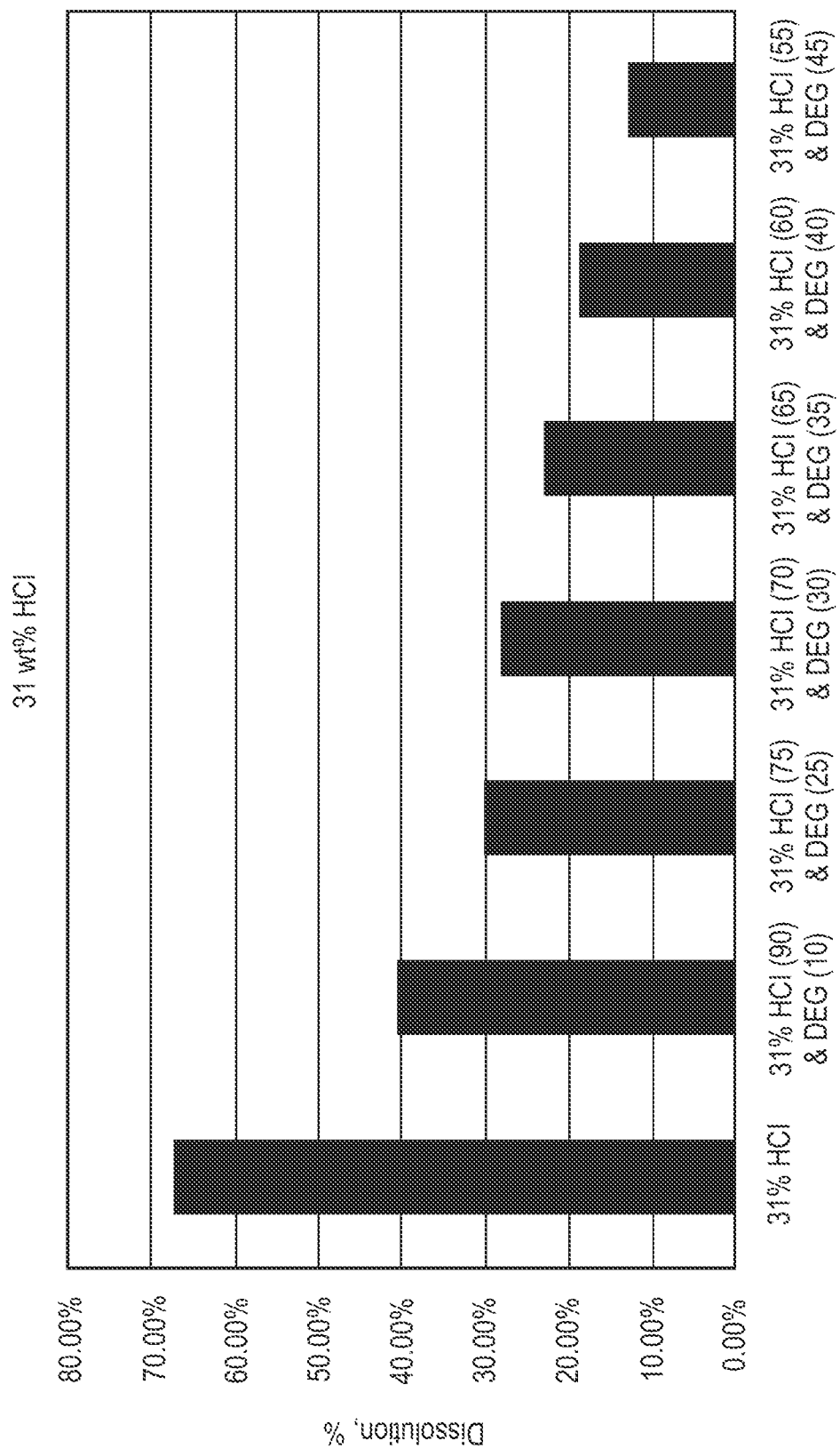
Figure 4A:
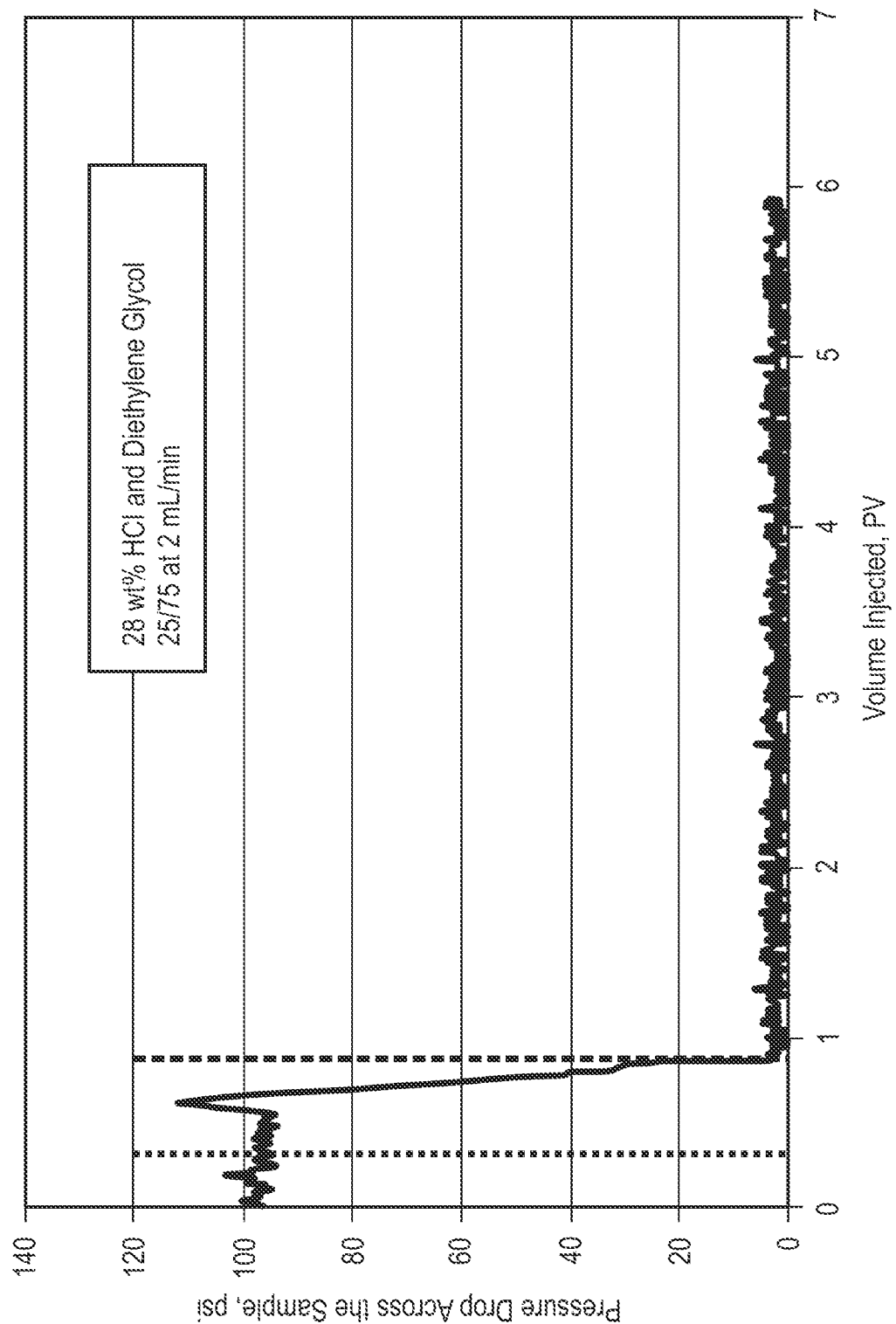
FIGS. 4A to 4D are plots of the pressure drop across core samples measured during acid injection.
Figure 4B:
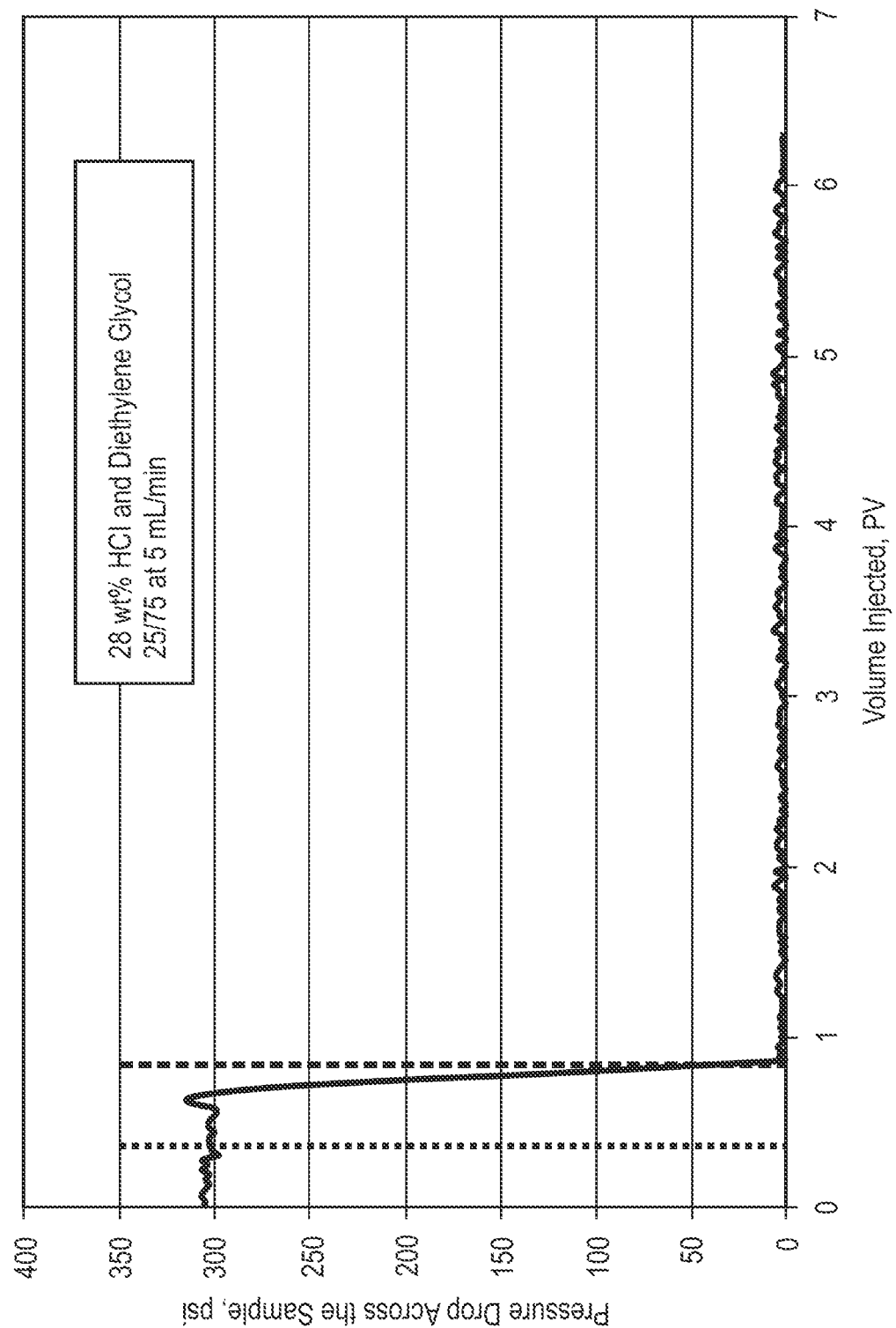
Figure 4C:
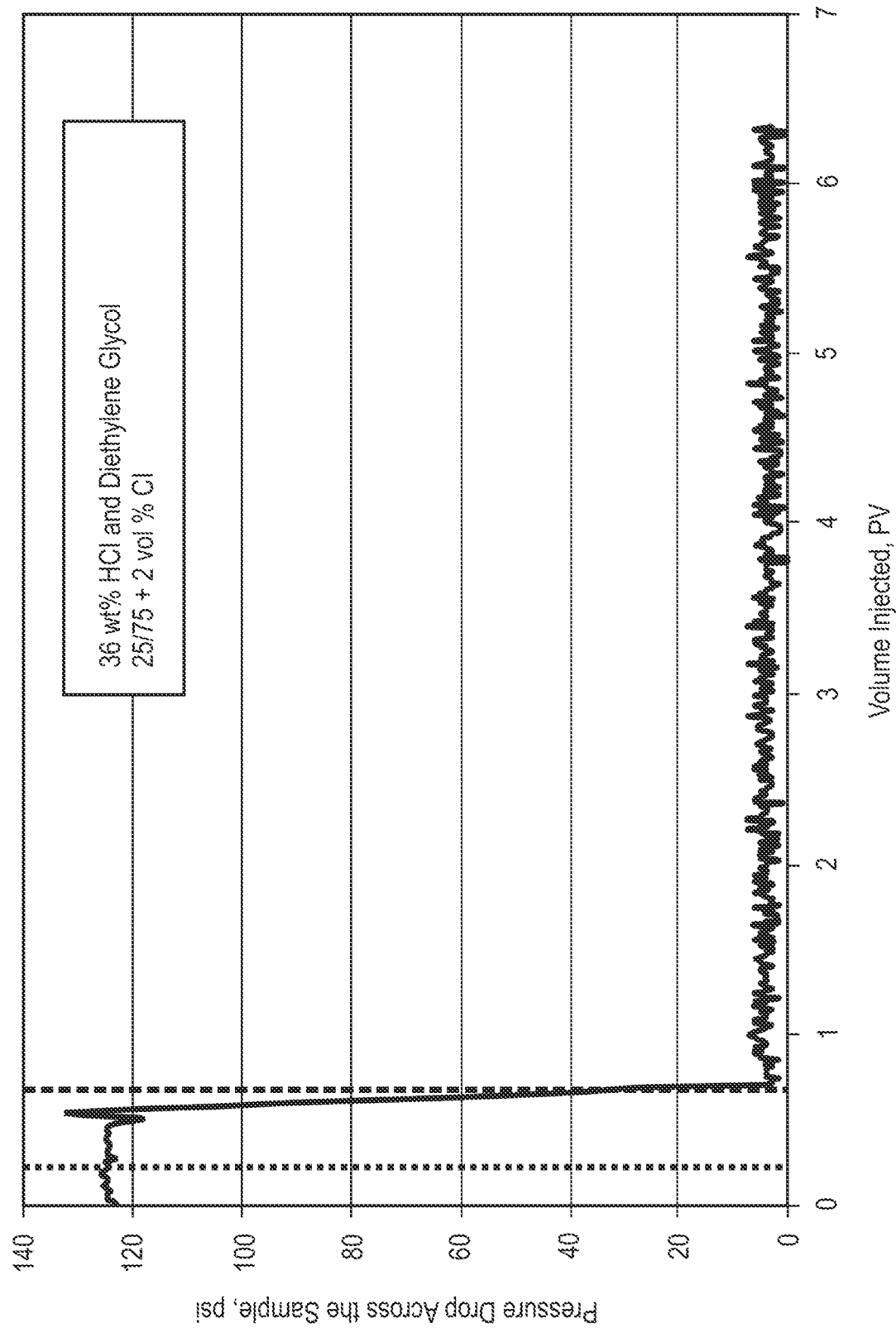
Figure 4D:
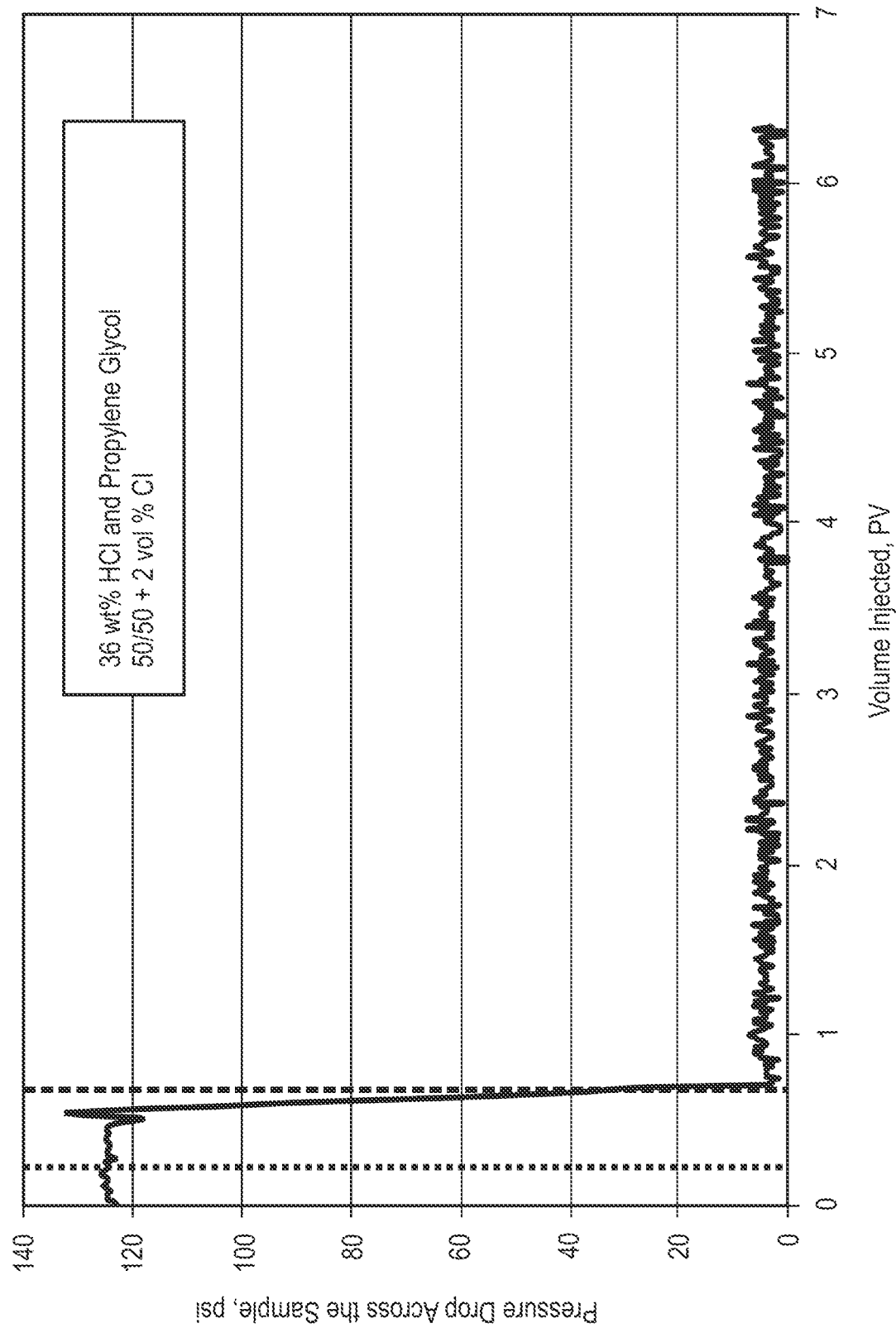

FIGS. 3A to 3C are plots of the calculated weight-loss of Indiana limestone core samples for various acid formulations containing 15 wt. %, 28 wt. %, and 31 wt. %. The calculated weight loss of Indiana limestone core samples, post-acidizing, for the acid formulations containing 15 and 28 wt. % HCl in the presence of the noted additive shows that the dissolution of rock in acid was also observed at both low and high concentration of the fluorinated surfactants.

Example 2. High Temperature/High Pressure Coreflow Experiment

Coreflow experiments are commonly performed in the oil and gas industry to evaluate and benchmark the performance of an assortment of oilfield reservoir stimulation fluids, including acid systems. Accordingly, a linear coreflow experiment was performed to validate that the retardation behavior observed under static, ambient temperature and pressure applied to reservoir conditions, for example, 300° F. and 3000 psi. Attenuated acid formulations containing 28 wt. % HCl and different volume fractions for diethylene glycol (or DEG) (ratios are 10, 25 and 50 vol. % of the total formulation) were selected to test the breakthrough.

For acidizing applications, the volume of acid required to dissolve a path in the core plug, for example, from the inlet to the outlet of the core sample, is one indication of success at the lab-scale. This value is commonly referred to as pore volume to breakthrough, $PV_{BT}$. Acid systems having higher acid-rock reactivity will be associated with higher $PV_{BT}$ values under analogous testing conditions and vice versa. Thus, lower $PV_{BT}$ values are desired because the expectation is that at the field-scale the result will correlate with increased stimulation of the treated zone. This results from the tendency of live acid to penetrate deeper into the reservoir, thereby increasing the relative permeability for oil and gas to be produced.

Based on the attenuation results, it was anticipated that attenuated acid formulations tested would require less acid to achieve breakthrough as compared to 28 and 36 wt. % HCl in the absence of DEG. As shown in Table 5 below, the acid volume needed to achieve breakthrough was reduced by 75% by adding the DEG to the 28 wt. % HCl. Even when compared to 26 wt. % HCl emulsified acid, the acid system used here showed around 50% reduction in the volume of acid need to achieve breakthrough. In other words, there was a 100% improvement in the acid penetration rate when using the HCl/DEG formulation.

TABLE 3

Summary of coreflood data collected for 12-inch outcrop Indiana limestone core samples treated with different acid systems at temperature, pressure and flow rate of 300° F., 3000 psi and 2 and 5 mL/min injection rate, respectively.

| Fluid ID | $PV_{BT}$ | Inj. Rate, mL/min | Core Length (inch) | Core Diameter (inch) |
| --- | --- | --- | --- | --- |
| 28 wt. % HCl | 1.1 | 5 | 12 | 1.5 |
| 26 wt. % Emulsified Acid | 0.55 | 5 | 12 | 1.5 |
| 28 wt. % HCl + DEG (75/25) | 0.23 | 5 | 12 | 1.5 |
| 28 wt. % HCl + DEG (75/25) | | 2 | 12 | 1.5 |
| 36 wt. % HCl + DEG (50/50) | 0.23 | 2 | 12 | 1.5 |
| 36 wt. % HCl + DEG (75/25) | 0.2 | 2 | 12 | 1.5 |
| 36 wt. % HCl + DEG (90/10) | 0.21 | 2 | 12 | 1.5 |

Core Preparation Procedures for Coreflood Studies.

Core samples having a porosity ranging from 14.3 to 16.3% were selected for this study. The absolute permeability for each DI-$H_2O$ saturated core sample was measured in a horizontal fashion using a high temperature, high-pressure (HT/HP) coreflood apparatus equipped with a 12" coreholder. The permeability was calculated by flowing DI-$H_2O$ through the core sample at various flow rates (e.g. ranging from 0.5 to 4 $cm^3$/min) until the flow stabilized. For each rate, the average differential pressure across the core (DP) was recorded and applied to Darcy's equation to determine the initial permeability.

Figure 5:
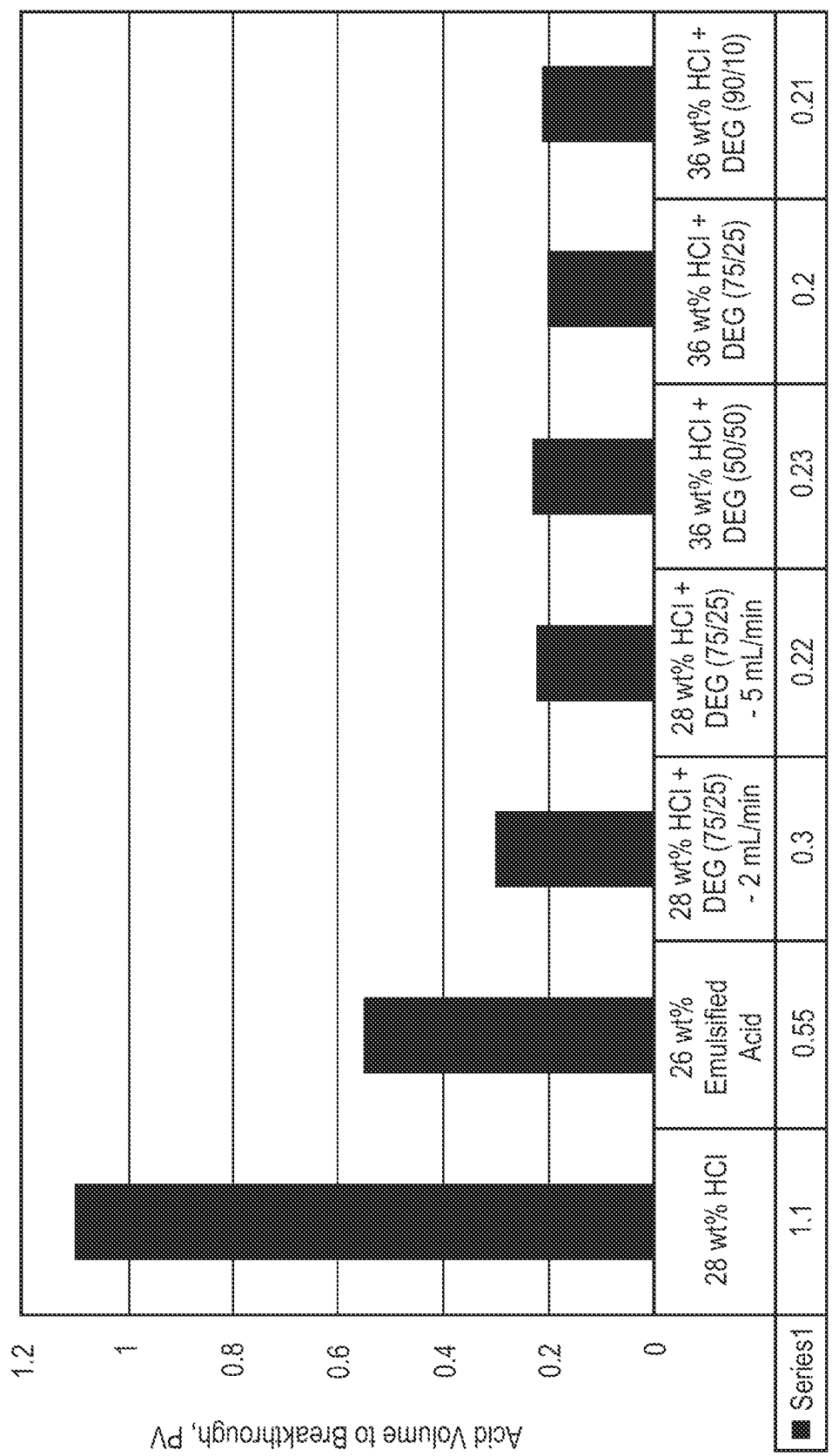
FIG. 5 is a plot of the acid volume to breakthrough for different compositions of attenuated acid solutions.

FIGS. 4A to 4D are plots of the pressure drop across core samples measured during acid injection. The pressure drop across the core sample measured during acid injection indicated acid breakthrough, from which the acid volume was measures. FIG. 5 is a plot of the acid volume to breakthrough for different compositions of attenuated acid solutions.

Embodiments

An embodiment described in examples herein provides a method for treating a carbonate reservoir with an attenuated acid formulation. The method includes mixing an acidic compound with a hygroscopic chemical to form the attenuated acid formulation, and injecting the attenuated acid formulation into a carbonate formation.

In an aspect, the acidic compound includes a mineral acid. In an aspect, the mineral acid includes hydrochloric acid, or methane sulfonic acid, or combinations thereof.

In an aspect, the acidic compound includes a compound that forms an acid in an aqueous solution. In an aspect, the acidic compound includes an alkylsulfonic acid. In an aspect, the alkylsulfonic acid is methanesulfonic acid (MSA).

In an aspect, the method includes mixing the acidic compound with the hygroscopic chemical to form the attenuated acid formulation on-the-fly as materials are injected into the formation.

In an aspect, the hygroscopic chemical is at least one of ethylene glycol, diethylene glycol, propylene glycol (or 1,2 propylene glycol or 1,2-propanediol), triethylene glycol, diglyme (or diethylene glycol dimethyl ether), 2-butoxyethanol (or EGBE or ethylene glycol monobutyl ether), dimethylformamide, propylene carbonate, 1,3 propylene glycol or 1,3-propanediol, diethylene glycol 2(2-ethoxyethoxy)ethanol (or DEGEE or diethylene glycol monoethyl ether, carbitol, carbitol cellosolve), dipropylene glycol, 1,3 butanediol, dimethylene glycol or 2,3 butanediol, ethylene carbonate, 2(2-methoxyethoxy)ethanol (or diethyleneglycol monomethyl ether), dimethylemalonate, n-methyl-2-pyrrolidone, a mixture of ethylene glycol and water (35/65), a mixture of 60% propylene glycol in water, a mixture of 50% ethylene glycol in water and monoethylene glycol (or ethylene glycol).

In an aspect, the acidic compound is a 15 wt. % solution of hydrochloric acid. In an aspect, the acidic compound is a 28 wt. % solution of hydrochloric acid. In an aspect, the acidic compound is a 31 wt. % solution of hydrochloric acid.

In an aspect, the hygroscopic chemical is diethylene glycol (DEG). In an aspect, the DEG makes up between 5 and 40 vol. % of the attenuated acid formulation. In an aspect, the DEG makes up between 20 and 25 vol. % of the attenuated acid formulation.

In an aspect, the hygroscopic chemical is monoethylene glycol (MEG). In an aspect, the MEG makes up between 5 and 40 vol. % of the attenuated acid formulation. In an aspect, the MEG makes up between 20 and 25 vol. % of the attenuated acid formulation.

In an aspect, the attenuated acid formulation dissolves between about 15 wt. % calcite and 30 wt. % calcite from a limestone core sample in about 5 minutes. In an aspect, the attenuated acid formulation dissolves between about 20 wt. % calcite and 25 wt. % calcite from a limestone core sample in about 5 minutes. In an aspect, the attenuated acid formulation achieves a pore volume to breakthrough ($PV_{BT}$) of less than 0.3.

In an aspect, the attenuated acid formulation includes a surfactant. In an aspect, the surfactant includes a fluorinated surfactant.

In an aspect, the attenuated acid formulation is an emulsion. In an aspect, the attenuated acid formulation is a foam.

In an aspect, the method includes viscosifying the attenuated acid formulation by a gelling agent.

In an aspect, the attenuated acid formulation includes a viscoelastic surfactant.

In an aspect, the attenuated acid formulation includes a crosslinkable gelling agent.

In an aspect, the method includes acidizing a carbonate matrix with the attenuated acid formulation, acid fracturing with the attenuated acid formulation, acidizing an open hole with the attenuated acid formulation, cleaning a wellbore with the attenuated acid formulation, cleaning scale with the attenuated acid formulation, increasing the permeability of injection wells with the attenuated acid formulation, cleaning up filter cake, or cleaning up drilling mud.

Other implementations are also within the scope of the following claims.

What is claimed is:

1. A method for treating a carbonate reservoir with an attenuated acid formulation, comprising:
   mixing an acidic compound with a hygroscopic chemical to form the attenuated acid formulation, wherein the acidic compound comprises a hydrochloric acid solution and the hydroscopic chemical comprises diethylene glycol, wherein the DEG comprises between 5 and 40 vol. % of the attenuated acid formulation; and
   injecting the attenuated acid formulation into a carbonate formation, wherein the pore volume for breakthrough ($PV_{BT}$) is less than 0.23 for an attenuated acid formulation comprising either a 28 wt. % or a 36 wt. % solution of HCl.

2. The method of claim 1, wherein the acidic composition further comprises methane sulfonic acid.

3. The method of claim 1, wherein the acidic compound comprises a compound that forms an acid in an aqueous solution.

4. The method of claim 1, wherein the acidic compound comprises an alkylsulfonic acid.

5. The method of claim 4, wherein the alkylsulfonic acid is methanesulfonic acid (MSA).

6. The method of claim 1, comprising mixing the acidic compound with the hygroscopic chemical to form the attenuated acid formulation on-the-fly as materials are injected into the formation.

7. The method of claim 1, wherein the DEG comprises between 20 and 25 vol. % of the attenuated acid formulation.

8. The method of claim 1, wherein the attenuated acid formulation comprises a surfactant.

9. The method of claim 8, wherein the surfactant comprises a fluorinated surfactant.

10. The method of claim 1, wherein the attenuated acid formulation is an emulsion.

11. The method of claim 1, wherein the attenuated acid formulation is a foam.

12. The method of claim 1, comprising viscosifying the attenuated acid formulation by a gelling agent.

13. The method of claim 1, wherein the attenuated acid formulation comprises a viscoelastic surfactant.

14. The method of claim 1, wherein the attenuated acid formulation comprises a crosslinkable gelling agent.

15. The method of claim 1, comprising:
   acidizing a carbonate matrix with the attenuated acid formulation;
   acid fracturing with the attenuated acid formulation;
   acidizing an open hole with the attenuated acid formulation;
   cleaning a wellbore with the attenuated acid formulation;
   cleaning scale with the attenuated acid formulation;
   increasing the permeability of injection wells with the attenuated acid formulation;
   cleaning up filter cake; or
   cleaning up drilling mud.

* * * * *